US010943097B2

(12) United States Patent
Aronson

(10) Patent No.: US 10,943,097 B2
(45) Date of Patent: *Mar. 9, 2021

(54) SCALABLE CONFIGURABLE UNIVERSAL FULL SPECTRUM CYBER PROCESS THAT UTILIZES MEASURE POINTS FROM SENSOR OBSERVATION-DERIVED REPRESENTATIONS OR ANALYTICALLY RICH SPARSE DATA SETS FOR MAKING CYBER DETERMINATIONS REGARDING OR UTILIZING SENSOR OBSERVATIONS OR SENSOR OBSERVATIONS SUBJECTS

(71) Applicant: Jeffry David Aronson, San Antonio, TX (US)

(72) Inventor: Jeffry David Aronson, San Antonio, TX (US)

( * ) Notice: Subject to any disclaimer, the term of this patent is extended or adjusted under 35 U.S.C. 154(b) by 307 days.

This patent is subject to a terminal disclaimer.

(21) Appl. No.: 15/981,785

(22) Filed: May 16, 2018

(65) Prior Publication Data
US 2018/0336400 A1    Nov. 22, 2018

Related U.S. Application Data

(60) Provisional application No. 62/507,128, filed on May 16, 2017.

(51) Int. Cl.
*G06K 9/00* (2006.01)

(52) U.S. Cl.
CPC ..... *G06K 9/00288* (2013.01); *G06K 9/00248* (2013.01); *G06K 9/00281* (2013.01); *G06K 9/00355* (2013.01); *G06K 9/00845* (2013.01)

(58) Field of Classification Search
CPC ........... G06K 9/00288; G06K 9/00248; G06K 9/00281; G06K 9/00355; G06K 9/00845
See application file for complete search history.

(56) References Cited

U.S. PATENT DOCUMENTS 5,689,241 A * 11/1997 Clarke, Sr. ............... A61B 5/18
340/575
6,144,022 A * 11/2000 Tenenbaum .......... B60S 1/0822
15/DIG. 15

(Continued)

OTHER PUBLICATIONS

Kukula et al., The Human-Biometric-Sensor Interaction Evaluation Method: Biometric Performance and Usability Measurements, Apr. 2010, IEEE Transactions on Instrumentation and Measurement, vol. 59, No. 4, pp. 784-791 (Year: 2010).*

*Primary Examiner* — Kenneth W Chang
(74) *Attorney, Agent, or Firm* — John A. Fortkort; Fortkort & Houston PC

(57) ABSTRACT

A scalable configurable universal full spectrum cyber process that utilizes measure points from sensor observation-derived representations or analytically rich sparse data sets for making selected cyber determinations regarding or utilizing sensor observations or sensor observation subjects. Utilizing necessary cyber resources and predetermined criteria for making selected cyber determinations regarding or utilizing the sensor observation or at least one sensor observation subject, the disclosed cyber process employs the use of measure points for accurately or reliably locating selected analytically rich indicators from sensor observation-derived representations, wherein appropriate informational representations or measurements regarding or utilizing the selected analytically rich indicators, the measure points or the sensor observation are assigned and stored in analytically rich sparse data sets where they may be utilized by the cyber process for making, in real time or at any time thereafter, selected cyber determinations regarding or utilizing sensor observations or sensor observation subjects.

27 Claims, 1 Drawing Sheet

(56) References Cited

U.S. PATENT DOCUMENTS

| | | | | |
|---|---|---|---|---|
| 6,304,187 | B1* | 10/2001 | Pirim | B60R 1/04 340/576 |
| 2004/0179201 | A1* | 9/2004 | Schneider | G01N 21/57 356/445 |
| 2005/0207622 | A1* | 9/2005 | Haupt | G06K 9/00711 382/118 |
| 2009/0003663 | A1* | 1/2009 | Webster | G06K 9/00885 382/119 |
| 2009/0087086 | A1* | 4/2009 | Eaton | G06K 9/38 382/164 |
| 2011/0093306 | A1* | 4/2011 | Nielsen | G06Q 10/0631 705/7.13 |
| 2013/0054184 | A1* | 2/2013 | Sakai | G01P 7/00 702/142 |
| 2014/0020089 | A1* | 1/2014 | Perini, II | G07C 9/37 726/19 |
| 2015/0310444 | A1* | 10/2015 | Chen | G06Q 20/3226 705/44 |

* cited by examiner

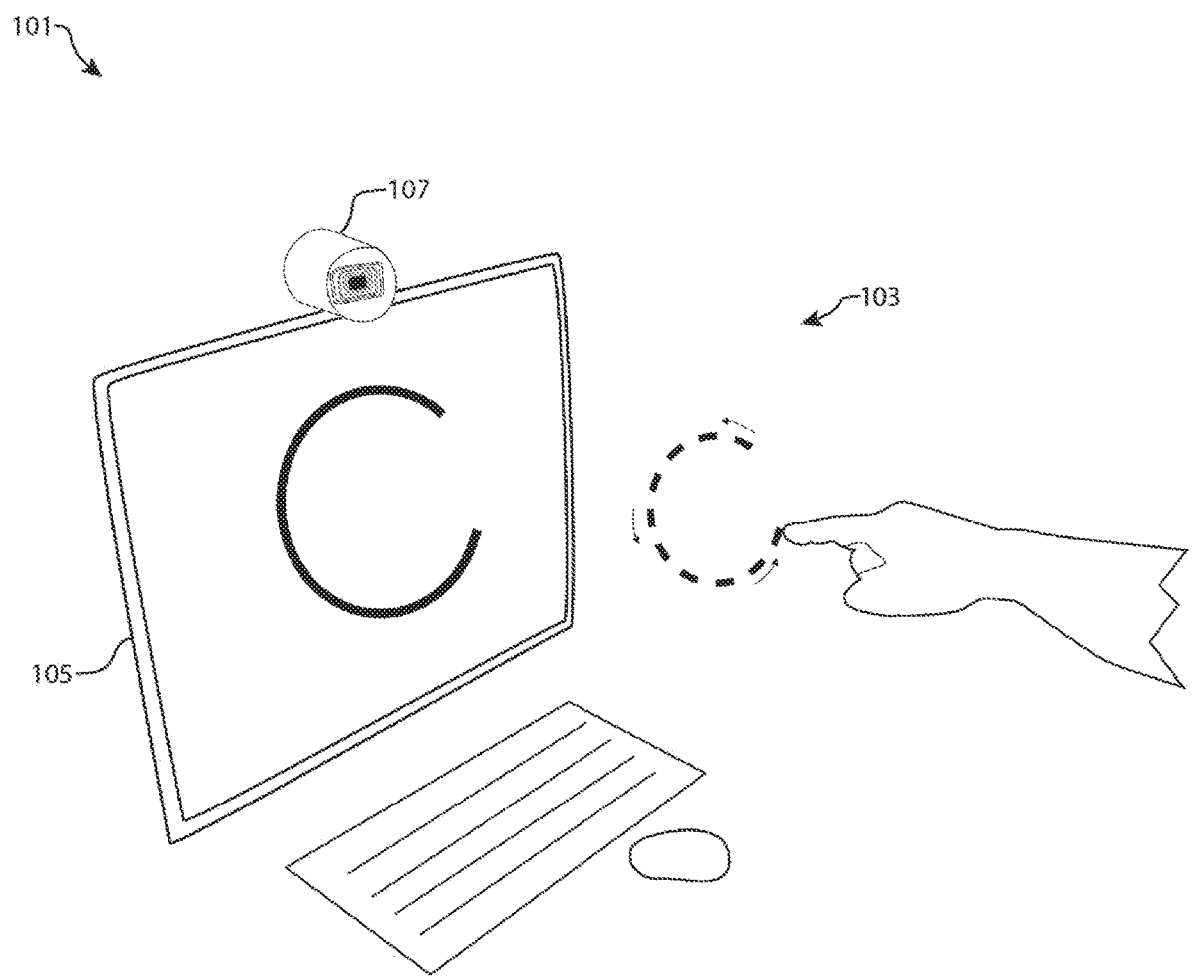

SCALABLE CONFIGURABLE UNIVERSAL FULL SPECTRUM CYBER PROCESS THAT UTILIZES MEASURE POINTS FROM SENSOR OBSERVATION-DERIVED REPRESENTATIONS OR ANALYTICALLY RICH SPARSE DATA SETS FOR MAKING CYBER DETERMINATIONS REGARDING OR UTILIZING SENSOR OBSERVATIONS OR SENSOR OBSERVATIONS SUBJECTS

CROSS-REFERENCE TO RELATED APPLICATIONS

This application claims the benefit of priority from U.S. provisional application No. 62/507,128, entitled "Scalable Universal Full Spectrum Cyber Determining Process That May Utilize Reference Points Located On Sensor Observation Derived Representations", having the same inventor, which was filed May 16, 2017, and which is incorporated herein by reference in its entirety.

FIELD OF THE DISCLOSURE

The present disclosure relates generally to cyber systems and processes, and more particularly to a scalable configurable universal full spectrum cyber process that may be configured to be utilized for making cyber determinations regarding or utilizing sensor observations or sensor observation subjects.

BACKGROUND OF THE DISCLOSURE

Prior art processes for making cyber determinations regarding or utilizing sensor observations or sensor observation subjects cannot answer the world's ever-increasing needs for a full spectrum of interoperable processes or procedures that quickly, efficiently, reliably and accurately provide real-time cyber determinations regarding one or more aspects, characteristics or features of sensor observations or sensor observation subjects.

A few examples of needs for cyber determinations regarding or utilizing sensor observations or sensor observation subjects that are not being met by prior art include: (a) making constant accurate or reliable cyber determinations regarding any one specific person's identity, (b) making numerous cyber determinations that may be utilized for autonomous operations of vehicles or other autonomous devices, (c) making accurate reliable cyber determinations that are utilized for making at least one medical diagnosis through utilization of all or any part of a full spectrum of health-related sensor observations, (d) making cyber determinations that any one specific person has imminent intent to do harm, (e) making cyber determinations regarding precisely what a person is looking at, or (f) making cyber determinations regarding any aspect of the state of a specific person's mental or physical health.

SUMMARY OF THE DISCLOSURE

Prior art processes or procedures do not answer current needs for accurate or reliable cyber processes or procedures that may be utilized for simply and efficiently making selected real time cyber determinations regarding or utilizing sensor observations or sensor observation subjects.

Further, prior art processes or procedures do not answer current needs for cyber processes or procedures that may be utilized for making a full spectrum of cyber determinations regarding or utilizing a full spectrum of aspects, characteristics or features of a full spectrum of sensor observations or a full spectrum of sensor observation subjects.

The disclosed scalable configurable universal full spectrum cyber process may be configured to utilize sensor observations for answering selected questions (making selected cyber determinations) regarding or utilizing sensor observations or sensor observation subjects. The disclosed cyber process may further be configured to utilize measure points to mark the locations of or structured areas where selected aspects, characteristics or features of analytically rich indicators are found on sensor observation-derived representations.

Once the questions have been selected that are to be answered utilizing the sensor observations, then determinations may be made regarding which aspects, characteristics or features of analytically rich indicators from sensor observation-derived representations may be used to accurately or reliably answer or aid in the answering of selected questions.

The cyber process disclosed herein may be configured to answer selected questions (make selected cyber determinations) regarding or utilizing sensor observations or sensor observation subjects through the disclosed cyber process's analysis of informational representations or measurements that have been derived from the processing of sensor observations. Using a video-formatted image sensor that is permanently installed and configured to observe the driver of a vehicle as an example, the disclosed cyber process may be configured to answer only one question regarding one sensor observation subject. In the case of this example, the question is: Has the driver of the vehicle fallen asleep?

The points or areas of the sensor observation-derived representations that may be utilized for answering selected questions are called analytically rich indicators. The disclosed cyber process may be configured to assign or utilize appropriate informational representations or measurements regarding or utilizing the pixels at the points where the measure points are located or the pixels from within structured areas that are located through utilization of measure points.

The cyber process disclosed herein may be configured to utilize only two measure points that are located on a video sensor observation-derived representation of the driver's face for continuously answering the above question as concisely and efficiently as possible. One measure point locates the image sensor observation-derived representation of the bottom center of the left upper eyelid and the second measure point locates the image sensor observation-derived representation of the top center of the lower eyelid of the same eye.

The disclosed cyber process may be configured to appropriately assign standard informational representations or measurements regarding or utilizing each of the two selected measure points. Each measure point may utilize informational representations or measurements from the original raw image sensor observation data set regarding the X (horizontal) and Y (vertical) line locations on the image's pixel grid of the measure points. The difference in the number of horizontal lines between the two measure points, if any, may be used to determine if the person's eyelids are closed for any number of sequential video images.

Should the horizontal lines on which the measure points were located both drop down together for a specified number of lines over a specified number of sequential video images, then the data regarding changes in the horizontal pixel grid lines on which the measure points are located may be utilized to make a determination that the driver's head has dropped a specific distance and at a specific rate of drop. Data regarding the distance and rate of drop of the driver's head along with data regarding the duration of time that the driver's eyelids have been closed may reliably be used for determining that the driver of the vehicle has fallen asleep.

The analytically rich sparse data set from the previous example regarding only two pixels from an over two million pixel 1080p video-formatted image may easily be used to answer the selected question: Has the driver of the vehicle fallen asleep? This is a simple question that prior art processes may not be able to continuously answer due, at least in part, to prior art's use of far more complex processes or procedures than are needed to answer this one simple question. Further, utilization of the processes or procedures of the disclosed cyber process reduce the original raw image sensor observation data set regarding over two million different pixels to a simple, concise and efficient analytically rich sparse data set that is comprised of raw image sensor observation data for only two pixels. This results in a one million to one data compression ratio.

There is a full spectrum of processes or procedures that may be utilized for making selected cyber determinations regarding or utilizing what has been observed at the exact point that a measure point has been located on a sensor observation-derived representation. In the case of this example, the disclosed cyber process may be configured to utilize an analytically rich sparse data set regarding only the two eyelid-representation-located measure points, wherein the disclosed cyber process may be configured to utilize the X or Y line locations on the image's pixel grid for making the selected determination as to whether or not the driver of a vehicle has fallen asleep.

The analytically rich sparse data sets may be configured to include informational representations or measurements from raw data sets or from derived data sets. Using video-formatted image sensor observations as an example, raw data sets may be configured to include only data in the original raw form as a part of a raw sensor observation data file. The raw image sensor observation data regarding any one pixel may typically include the X and Y line locations on the image's pixel grid, as well as the measure of the observed levels of red, green or blue light at each pixel where measure points are located.

The derived data sets from analytically rich sparse data sets are configured to include informational representations or measurements that were derived from the processing of raw sensor observation data from selected structured areas of sensor observation-derived representations that are located through the utilization of measure points.

As an example, the disclosed cyber process may utilize a measure point that locates a pulse point on a sensor observation-derived representation of a specific person's face. A scalable configurable grid (disclosed in further detail later in this document) may be utilized to structure a forty-one by forty-one pixel square with the measure point locating the pulse point at its center. Analysis of the sums of the measurements of observed levels of red, blue or green light from each column or each row of pixels from within the scalable configurable grid are made, and the sums from the columns or rows are utilized for making a selected cyber determination that the person's pulse has occurred.

In addition, utilizing a personal or private first series observation data set regarding the person who is the observation subject, the disclosed cyber process may be configured to use the sums from columns or rows of the scalable configurable grid for making accurate or reliable cyber determinations regarding the person's blood pressure.

Informational representations or measurements from raw data sets or derived data sets of analytically rich sparse data sets may be stored or utilized for making cyber determinations in real time or at any time thereafter. The cyber process disclosed herein may be configured to where completion of the creation of analytically rich sparse data sets will be the final operation of the processing of raw sensor observation data sets. At this point in the operations of the disclosed cyber process, the original raw data sets from sensor observations may be deleted or stored for further use.

The disclosed cyber process may be configured to utilize comparison of data sets from first series observations of known aspects, characteristics or features of observation subjects to data sets from second series observations of yet-to-be-determined aspects, characteristics or features of observation subjects.

To accurately or reliably utilize informational representations or measurements from analytically rich sparse data sets for making selected cyber determinations (answering selected questions), the processing of the first series observations and the processing of the second series observations of exactly the same subject must result in exactly the same standard informational representations or measurements. The disclosed cyber process may be configured to utilize the exact same standard processes or procedures for processing second series observations as were used to process the first series observations to which they will be compared. Further, the disclosed cyber process may be configured to utilize the exact same processes or procedures for all operations of processing second series observations as were utilized for all operations of processing first series observations.

Utilization of the two measure points from the previous example for determining that the driver of the vehicle is falling asleep is a best performing blend of an as simple, concise and efficient way possible to utilize video-formatted image sensor observations for determining that the driver of a vehicle is falling asleep.

The disclosed cyber process, through its utilization of measure points or analytically rich sparse data sets, may be configured to accurately or reliably make any cyber determinations selected from the group consisting of a full spectrum of cyber determinations regarding or utilizing sensor observations or sensor observation subjects. Further, the cyber process disclosed herein may be configured to do so using combinations of processes or procedures that enable the disclosed cyber process to be as simple, concise and efficient as it could possibly be in all areas of its operations.

In one aspect, a cyber process disclosed herein is provided which comprises:

providing a set of resources which includes (a) at least one computing device, (b) criteria selected from a group consisting of a full spectrum of criteria that may be utilized by the cyber process, (c) selected information, (d) selected necessary programming, and (e) any other necessary resources, wherein the at least one utilized computing device includes a tangible, non-transient memory device and an input/output device; and using the set of resources and at least one analytically rich sparse data set to make at least one selected cyber determination regarding or utilizing at least one sensor observation or at least one sensor observation subject;

wherein the analytically rich sparse data set includes processed data, wherein the processed data includes at least one selected informational representation or at least one measurement that has been derived from the processing of at least one first series sensor observation or at least one second series sensor observation, and wherein the processed data may be utilized for making the at least one selected cyber determination in real time or at one or more times thereafter, and wherein the cyber determination may be selected from a group consisting of a full spectrum of cyber determinations that may be made regarding or utilizing sensor observations or sensor observation subjects;

wherein the cyber process is scalable, in regard to included cyber process resources, to fall at any one point in a range of from a minimum to a maximum, wherein at the minimum the cyber process may be scaled to include only the cyber process resources that are needed for providing for the least complex, in regard to included necessary cyber process resources, of all cyber processes that are utilized for making cyber determinations regarding or utilizing sensor observations or sensor observation subjects, and wherein at the maximum said cyber process may be scaled to include all of the cyber process resources that are needed for making every cyber determination from a full spectrum of cyber determinations regarding or utilizing sensor observations or sensor observation subjects;

wherein the cyber process is configurable and may be configured in at least one way;

wherein the at least one cyber determination may be selected from a group consisting of a full spectrum of cyber determinations that may be made regarding or utilizing sensor observations or sensor observation subjects;

wherein the at least one cyber determination is utilized for at least one purpose selected from a group consisting of a full spectrum of purposes for which cyber determinations regarding or utilizing sensor observations or sensor observation subjects may be utilized;

wherein the cyber process may be configured to provide at least one member selected from a group consisting of (a) single cyber determinations regarding or utilizing sensor observations or sensor observation subjects, (b) intermittently provided cyber determinations regarding or utilizing sensor observations or sensor observation subjects, and (c) constantly provided cyber determinations regarding or utilizing sensor observations or sensor observation subjects;

wherein the selected information may be derived from one or more points in time, or over one or more periods of time;

wherein the selected information may be selected from a group consisting of a full spectrum of information that may be utilized by the cyber process, and wherein the full spectrum of information may include information that was derived from at least one sensor observation;

wherein the at least one sensor observation is made by at least one type of sensor selected from a group consisting of a full spectrum of types of sensors, and may be processed to provide at least one informational representation or at least one measurement regarding or utilizing at least one selected aspect, characteristic or feature of at least one analytically rich indicator from at least one sensor observation-derived representation;

wherein the at least one aspect, characteristic or feature of at least one analytically rich indicator from the at least one sensor observation-derived representation is selected from a group consisting of a full spectrum of sensor observable aspects, characteristics or features of analytically rich indicators from sensor observation-derived representations;

wherein the at least one cyber determination regarding the at least one analytically rich indicator from at least one sensor observation-derived representation is selected from a group consisting of a full spectrum of cyber determinations regarding or utilizing sensor observations or sensor observation subjects;

wherein the at least one sensor observation or sensor observation subject is selected from a group consisting of a full spectrum of sensor observations or sensor observation subjects;

wherein the at least one aspect of the at least one sensor observation or at least one sensor observation subject is selected from a group consisting of a full spectrum of sensor observable aspects the of sensor observations or sensor observation subjects; and wherein the cyber process further comprises utilizing, in any sequence, at least one part of at least one operation selected from the group consisting of (a) first series observation operations, wherein the cyber process is configured to utilize at least one first series sensor observation, wherein the at least one first series sensor observation or at least one subject of the at least one first series sensor observation has at least one previously determined aspect, the cyber process recognizing the at least one previously determined aspect regarding the at least one first series sensor observation or the at least one subject of the at least one first series observation, v cyber process assigning at least one appropriate informational representation or measurement regarding at least one recognized aspect of the at least one sensor observation or the at least one sensor observation subject, the at least one assigned informational representation or measurement being utilizable by the cyber process for making at least one selected cyber determination regarding or utilizing sensor observations or sensor observation subjects, the cyber process including at least one assigned informational representation or measurement from the at least one first series observation in at least one first series observation record, (b) second series observation operations, wherein the cyber process is configured to utilize at least one second series sensor observation, wherein the at least one second series sensor observation or the at least one subject of the at least one second series observation has at least one yet-to-be-determined aspect, the cyber process recognizing the at least one yet-to-be-determined aspect regarding the at least one second series sensor observation or the at least one subject of the at least one second series sensor observation, the cyber process assigning at least one appropriate informational representation or measurement regarding the at least one yet-to-be-determined aspect of the at least one sensor observation or the at least one sensor observation subject, the at least one assigned informational representation or measurement being utilizable by the cyber process for making at least one selected cyber determination regarding or utilizing sensor observations or sensor observation subjects, the cyber process including at least one assigned informational representation or measurement from the at least one second series observation in at least one second series observation record, (c) measure point operations, wherein the cyber process utilizes at least one measure point to locate at least one selected aspect of at least one analytically rich indicator from at least one sensor observation-derived representation of the at least one sensor observation or at least one sensor observation subject, wherein the cyber process assigns at least one informational representation or at least one measurement regarding at least one selected aspect of the analytically rich indicator, wherein the at least one informational representation or the at least one measurement may be stored or utilized for making at least one selected cyber determination regarding or utilizing the at least one sensor observation or the at least one sensor observation subject, (d) analytically rich sparse data set operations, wherein the cyber process utilizes at least one analytically rich sparse data set that is comprised of at least one raw data set or at least one derived data set, wherein the at least one raw data set from the at least one analytically rich sparse data set is comprised of at least one informational representation or at least one measurement selected from raw sensor observation data from at least one raw sensor observation data set, and the at least one derived data set from the at least one analytically rich sparse data set is comprised of at least one informational representation or at least one measurement that was derived from the processing of all or part of at least one raw sensor observation data set, wherein at least one informational representation or at least one measurement from the at least one raw data set or from the at least one derived data set of the at least one analytically rich sparse data set may be utilized by the cyber process for making at least one selected cyber determination regarding or utilizing at least one sensor observation or at least one sensor observation subject, (e) matching operations, wherein the cyber process matches at least one informational representation or measurement from at least one second series observation record with at least one comparable informational representation or measurement from at least one first series observation record, comparing operations, wherein the cyber process compares at least one informational representation or measurement from at least one second series observation record with at least one informational representation or measurement from at least one first series observation record, whereby the cyber process provides at least one cyber conclusion or makes at least one cyber determination from the comparison, (g) determining operations, wherein the cyber process utilizes the at least one conclusion from the at least one comparing operation, or the information, for making the at least one cyber determination regarding or utilizing the at least one sensor observation or the at least one sensor observation subject, and (h) reporting operations, wherein the cyber process makes at least one report regarding at least one aspect of at least one part of at least one cycle of operations of the cyber process.

In some embodiments of the disclosed cyber process, the cyber process is further configured to achieve at least one selected attainable level of accuracy goal for at least one cyber determination, and wherein the at least one attainable level of accuracy goal falls in a range extending from 0% accuracy up to, and including, 100% accuracy.

In some embodiments of the disclosed cyber process, the cyber process is further configured to provide for any possible level of participation by at least one person who is at least one subject of at least one sensor observation-derived cyber identity determination test, and wherein the any possible level of participation ranges from the at least one person being observable by at least one sensor but not consciously engaged in the at least one sensor observation-derived cyber identity determination test, to the at least one person being an observable, active and consciously engaged participant in the at least one sensor observation-derived cyber identity determination test.

In some embodiments of the disclosed cyber process, the cyber process is further configured to utilize at least one sensor observation for making at least one selected cyber determination regarding or utilizing the at least one sensor observation or at least one sensor observation subject, wherein the at least one sensor observation is made (a) at one or more points in time, or (b) over at least one period of time.

In some embodiments of the disclosed cyber process, the cyber process includes at least one sensor observation of at least one change that occurs to at least one sensor observable aspect of at least one observation subject over at least one period of time.

In some embodiments of the disclosed cyber process, the cyber process includes at least one person being the at least one observation subject, and wherein the at least one change that occurs to the at least one observation subject is at least one sensor observable change of at least one feature of the at least one person.

In some embodiments of the disclosed cyber process, the cyber process includes utilizing at least one feature of at least one person that is selected from a group consisting of the (a) head, (b) face, (c) mouth, (d) eyes, (e) eyebrows, (f) nose, (g) arms, (h) hands, (i) fingers, (j) legs, (k) feet, (l) neck, (m) torso, (n) skin, (o) heart, (p) stomach, (q) intestines, (r) liver, (s) kidneys, (t) lungs, (u) breath, (v) vascular system, (w) brain, (x) spinal cord, (y) neural system, (z) neural activity, (aa) skeleton, (bb) blood, (cc) odor, (dd) voice, (ee) direction of movement, and (ff) any other features of a person selected from a group consisting of a full spectrum of features of a person where sensor observable changes occur.

In some embodiments of the disclosed cyber process, the cyber process includes providing or utilizing the indicated measure of probability that exists of one specific yet-to-be-identified person being the same person as one specific known person, wherein the at least one cyber determination ranges from making at least one cyber determination that the one specific, yet-to-be-identified person absolutely is not the one specific known person, through making at least one cyber determination of any intermediate indicated measure of probability that exists of the one specific, yet-to-be-identified person is the one specific known person, to making at least one cyber determination that the one specific, yet-to-be-identified person absolutely is the one specific known person.

In some embodiments of the disclosed cyber process, the cyber process is further configured to include repeating operations wherein v cyber process selects at least one part of at least one first series observation of one specific known person for repetition by one specific, yet-to-be-identified person, wherein the one specific yet-to-be-identified person performs v at least one repetition, wherein the cyber process assigns appropriate informational representations or measurements regarding or utilizing at least one member selected from the group consisting of (a) the at least one observation, (b) v at least one repetition, and (c) at least one aspect of v one specific yet-to-be-identified person while the yet-to-be-identified person is performing the repetition, wherein the at least one second series observation record of the at least one repetition includes at least one informational representation or at least one measurement that was appropriately assigned by the cyber process, and wherein the cyber process utilizes the at least one second series observation record of the at least one repetition for making at least one selected cyber determination regarding or utilizing the at least one sensor observation of the yet-to-be-identified person.

In some embodiments of the disclosed cyber process, the cyber process is further configured for utilizing information, informational representations or measurements that are derived from at least one source other than at least one first series observation record, or at least one second series observation record.

In some embodiments of the disclosed cyber process, the cyber process is further configured to utilize at least one computing device, selected criteria, selected information, selected processes or procedures, and any other necessary resource, all of which being structured or utilized for the purpose of accurately granting or denying at least one person, or at least one cyber device, access to at least one member selected from the group consisting of: (a) at least one part of the cyber process, (b) at least one cyber resource that is being utilized by the cyber process, or (c) at least one resource that is utilizing the cyber process.

In some embodiments of the disclosed cyber process, the cyber process is further configured to manipulate, in any way possible, the operations of cyber process utilized resources, or the cyber process itself, wherein manipulating provides the cyber process with selection of possible utilizations, wherein the manipulating is utilized for at least one purpose, wherein the at least one purpose for utilizing the manipulating includes aiding in making at least one selected cyber determination regarding or utilizing the at least one sensor observation or the at least one sensor observation subject.

In some embodiments of the disclosed cyber process, the cyber process is further configured to include cyber process history, wherein the cyber process history includes at least one cyber process history record.

In some embodiments of the disclosed cyber process, the cyber process further includes at least one observation record that was derived from at least one source other than at least one first series observation operation that may be included as at least one first series observation record, or at least one observation record that was derived from at least one source other than at least one second series observation operation that may be included as at least one second series observation record.

In some embodiments of the disclosed cyber process, the cyber process is further configured to where all or part of the operations of the cyber process may be performed in any useable order or sequence.

In some embodiments of the disclosed cyber process, the cyber process is further configured to utilize at least one standard informational representation or measurement to represent at least one specific aspect of at least one operation of the cyber process.

In some embodiments of the disclosed cyber process, the cyber process is configured to utilize at least one measure point to locate at least one selected aspect of at least one analytically rich indicator from at least one sensor observation derived representation for making at least one selected cyber determination regarding or utilizing at least one sensor observation or at least one sensor observation subject, wherein the selection of the at least one aspect of the at least one analytically rich indicator that will be located by the at least one measure point may be made by at least one member selected from the group consisting of (a) at least one person, (b) at least one process, (c) at least one procedure, or (d) any combination thereof, wherein the at least one process or the at least one procedure being selected from a group consisting of a full spectrum of processes or procedures that may be utilized for selecting aspects of analytically rich indicators from sensor observation-derived representations that will be located through utilization of measure points.

In some embodiments of the disclosed cyber process, the cyber process further utilizes the at least one measure point for at least one purpose selected from a group consisting of a full spectrum of purposes for which measure points that locate selected aspects of analytically rich indicators from sensor observation-derived representations may be utilized;

wherein the full spectrum of purposes for which the measure points may be utilized includes utilization of at least one measure point for making at least one measurement;

wherein the at least one measurement that may be made through utilization of the at least one measure point may be selected from the group consisting of a full spectrum of measurements that may be made through utilization of measure points that locate selected aspects of analytically rich indictors from sensor observation-derived representations;

wherein the full spectrum of measurements that may be made through utilization of the at least one measure point may include at least one measurement selected from the group consisting of (a) measured distances between two or more measure points, (b) measured angles where two or more lines between measure points meet or intersect, (c) measured location of at least one measure point or aspect, (d) measured orientation of at least one measure point or aspect, (e) measured relationships between two or more measure points or aspects, (f) measured time at one or more measure points, (g) measured pressure at one or more measure points, (h) measured temperature at one or more measure points, (i) measured color at one or more measure points, (j) measured grey scale level at one or more measure points, (k) measured odor at one or more measure points, (l) measured presence at one or more measure points, (m) measured sound at one or more measure points, (n) measured electric energy at one or more measure points, or (o) measures of any other sensor observable measurable aspects of analytically rich indicators from sensor observation-derived representations that may be located through utilization of measure points.

In some embodiments of the disclosed cyber process, the cyber process may include at least one person as at least one subject of at least one sensor observation;

wherein at least one aspect of the at least one person may include at least one aspect selected from a group consisting of a full spectrum of sensor observable aspects, of people who are subjects of sensor observations;

wherein at least one measure point may be utilized to locate at least one selected aspect of at least one analytically rich indicator from at least one sensor observation-derived representation of at least one person who is at least one subject of at least one sensor observation;

wherein the at least one analytically rich indicator is selected from a group consisting of a full spectrum of analytically rich indicators from sensor observation-derived representations;

wherein the at least one measure point may be utilized for at least one purpose selected from a group consisting of a full spectrum of purposes for which measure points that locate selected aspects of analytically rich indicators from sensor observation-derived representations may be utilized;

wherein the full spectrum of analytically rich indicators from sensor observation-derived representations that may be located by measure points may include at least one analytically rich indicator from at least one sensor observation-derived representation of at least one person selected from group consisting of (a) scars, (b) marks, (c) tattoos, (d) fingerprint features, (e) axis points at joints, (f) tip of nose, (g) corners of eyes, (h) centers of pupils, (i) corners of mouth, (j) tips of fingers, (k) sweat glands, or (l) any other analytically rich indicators from sensor observation-derived representations of people.

In some embodiments of the disclosed cyber process, the cyber process includes making cyber determinations regarding or utilizing at least one measured location or at least one measured orientation of at least one sensor observation-derived representation of at least one aspect of a person on at least one sensor observation-derived representation of the person;

wherein the at least sensor observation-derived representation of the at least one aspect of the at least one person may be selected from a group consisting of a full spectrum of sensor observation-derived representations of aspect of people who are subjects of sensor observations;

wherein at least one measured location of or at least one measured orientation of the at least one representation of least one aspect of one person on the at least one sensor observation-derived representation of the at least one person may include, for example, the measured location of or the measured orientation of (a) at least one sensor-observation derived representation of at least one fingerprint feature on at least one sensor-observation derived representation of one finger of one person, (b) at least one sensor-observation derived representation of at least one tattoo on at least one sensor-observation derived representation of at least one arm of one person, (c) at least one sensor-observation derived representation at least one scar on at least one sensor-observation derived representation of least one leg of one person, (d) at least one sensor-observation derived representation of at least one mark on at least one sensor-observation derived representation of the neck of one person, (e) at least one sensor-observation derived representation of at least one sweat gland on at least one sensor-observation derived representation of the nose of one person, (f) at least one sensor-observation derived representation of at least one pulse point on at least one sensor-observation derived representation of the face of one person, (g) at least one sensor-observation derived representation of at least one peak on a peak and valley graph representation of the sounds of at least one person's voice, and (h) any other sensor observation-derived representations of aspects of a person selected from a full spectrum of sensor observation-derived representations of aspects of a person that are located on, or oriented on, sensor observation-derived representations of people who are subjects of sensor observations.

In some embodiments of the disclosed cyber process, the cyber process is further configured to utilize at least one measure point to locate at least one aspect of at least one analytically rich indicator from at least one sensor observation-derived representation, the at least one aspect of the at least one analytically rich indicator being the sensor observation-derived representation of the tip of at least one finger of at least one person;

wherein v at least one measure point that locates the at least one sensor-observation derived representation of at least one fingertip on the at least one sensor observation-derived representation may be utilized for at least one purpose selected from a group consisting of a full spectrum of purposes for which measure points that locate sensor observation-derived representations of fingertips on sensor observation-derived representations may be utilized;

wherein the full spectrum of purposes for which measure points that locate sensor observation-derived representations of tips of a person's fingers may be utilized includes utilization of the measure points as at least one component of at least one fingertip to cyber device interface for at least one cyber device;

wherein the at least one cyber device is selected from a group consisting of a full spectrum of cyber devices that may utilize the at least one reference point as at least one component of at least one human fingertip to cyber device interface.

In some embodiments of the disclosed cyber process, the cyber process is further configured to utilize at least one measure point to locate at least one sensor-observation derived representation of at least one aspect of at least one analytically rich indicator from at least one sensor observation-derived representation of at least one face of at least one person who is at least one subject of at least one sensor observation;

wherein the at least one measure point may be utilized for at least one purpose selected from a group consisting of a full spectrum of purposes for which measure points that locate sensor observation-derived representations of aspects of analytically rich indicators from sensor observation-derived representations of faces of people may be utilized;

wherein the full spectrum of purposes for which measure points that locate sensor observation-derived representations of aspects of analytically rich indicators from sensor observation-derived representations of faces of people may be utilized may include utilizing at least one measure point for at least one purpose selected from a group consisting of: (a) determining the identity of at least one yet-to-be-identified person, (b) authenticating the claimed identity of at least one yet-to-be-identified person, (c) determining the facial affect of at least one person, (d) determining the facial expression of at least one person, (e) determining the gaze of at least one eye of at least one person, (f) determining sensor (camera) angle, (g) determining sensor observation lighting circumstances, (h) determining the pose of at least one person, (i) determining the portion of at least one face that is being observed by at least one sensor, (j) determining at least one measure of the state of the mental or physical health of at least one person, (k) determining the pulse of at least one person, (l) determining the blood pressure of at least one person, (m) determining at least one relationship between at least one sensor and at least one measure point that is located on at least one sensor observation-derived representation of at least one face of at least one person, and (n) any other purpose selected from a full spectrum of purposes for which measure points that locate sensor observation-derived representations of selected aspects of analytically rich indicators from sensor observation-derived representations of faces of people may be utilized.

In some embodiments of the disclosed cyber process, the cyber process is further configured to enable the at least one measure point that locates at least one selected sensor observation-derived representation of at least one aspect of at least one analytically rich indicator from at least one sensor observation-derived representation of at least one person to be utilized as at least one component of at least one human to cyber device interface;

wherein the at least one human-to-cyber device interface, utilizing the at least one measure point, may be utilized for at least one purpose selected from a group consisting of a full spectrum of purposes for which human to cyber device interfaces that utilize measure points that locate selected sensor observation-derived representations of aspects analytically rich indicators from sensor observation-derived representations of people may be utilized.

In some embodiments of the disclosed cyber process, the cyber process is further configured to utilize at least one measure point that locates at least one sensor observation-derived representation of at least one axis point from at least one sensor observation-derived representation of at least one joint of at least one person;

wherein at least one measure point that locates said at least one axis point may be utilized for at least one purpose selected from a group consisting of a full spectrum of purposes for which sensor observation-derived representation of measure points that locate axis points from sensor observation-derived representations of joints of people may be utilized;

the full spectrum of purposes for which sensor observation-derived representation of measure points that locate axis points from sensor observation-derived representations of joints of people may be utilized includes making at least one cyber determination regarding at least one sensor observation-derived representation of at least one aspect of the geometry of the person at the at least one sensor observation-derived representation of at least one joint where the at least one axis point is located, or making at least one cyber determination regarding at least one relationship between the at least one measure point that locates the at least one sensor observation-derived representation of the at least one axis point and at least one sensor observation-derived representation of at least one other measure point or aspect of at least one analytically rich indicator from at least one sensor observation-derived representation.

In some embodiments of the disclosed cyber process, the cyber process is further configured to utilize at least one member selected from the group consisting of: (a) selected processes, (b) selected procedures, or (c) the cyber process itself, for making selected cyber determinations regarding the location to locate at least one selected measure point on at least one sensor observation-derived representation of at least one sensor observation or at least one sensor observation subject, wherein the processes, the procedures or the cyber process itself may be structured to make at least one cyber determination selected from a group consisting of (i) determining the point to locate at least one selected measure point on at least one sensor observation-derived representation of only one specific sensor observation or only one specific sensor observation subject, (ii) determining the point to locate at least one selected measure point on at least one sensor observation-derived representation of at least one sensor observation or at least one sensor observation subject that is at least one member of at least one specific group of sensor observations or sensor observation subjects, (iii) determining the point to locate at least one selected measure point on at least one sensor observation-derived representation of at least one non-specific sensor observation or at least one non-specific sensor observation subject, or (iv) determining the point to locate at least one selected measure point on at least one sensor observation-derived representation of at least one sensor observation or at least one sensor observation subject based upon any other circumstances selected from a group consisting of a full spectrum of circumstances for which processes, procedures or the cyber process itself may be structured for making cyber determinations regarding the point to locate selected measure points on sensor observation-derived representations of sensor observations or sensor observation subjects.

In some embodiments of the disclosed cyber process, the cyber process is further configured for making at least one cyber determination regarding at least one aspect of the geometry of at least one sensor observation-derived representation of at least one joint of at least one person;

wherein the at least one aspect of the geometry of said at least one sensor observation-derived representation of at least one joint of at least one person may be utilized for at least one purpose selected from a group consisting of a full spectrum of purposes for which aspects of the geometry of sensor observation-derived representations of joints of people may be utilized.

In another aspect, a cyber process disclosed herein is provided which comprises:

deriving information from at least one point in time or over at least one period of time from a spectrum of information that may include at least one observed feature of at least one subject of at least one sensor observation, thereby obtaining derived information, wherein the at least one sensor observation is a type of sensor observation selected from the group consisting of (a) visual sensor observations, (b) audible sensor observations, (c) thermal sensor observations, (d) olfactory sensor observations, (e) tactile sensor observations, and (e) any other types of sensor observations;

wherein the cyber process makes at least one selected cyber determination through the utilization of (a) at least one computing device, (b) criteria that may be utilized by the cyber process, (c) the information, and (d) any necessary programming or resources, wherein the cyber process provides at least one cyber determination type selected from the group consisting of (i) single cyber determinations, (ii) intermittently provided cyber determinations, and (iii) constantly provided cyber determinations;

wherein the at least one cyber determination is utilized for at least one purpose; and wherein the cyber process further comprises utilizing at least one part of at least one operation selected from the group consisting of (a) first series observation operations utilizing at least one sensor observation, wherein the at least one sensor observation or at least one subject of the at least one sensor observation has at least one previously determined aspect, the cyber process recognizing the at least one aspect, the at least one recognized aspect being utilizable by the cyber process for making at least one selected cyber determination, the cyber process assigning appropriate informational representations or measurements representing at least one known aspect of the at least one observation or the at least one observation subject, the cyber process including at least one of the informational representations or measurements in at least one first series observation record, (b) second series observation operations utilizing at least one sensor observation, wherein the at least one sensor observation or at least one subject of the at least one sensor observation has at least one yet-to-be-determined aspect, the cyber process recognizing the at least one yet-to-be-determined aspect, the cyber process assigning appropriate informational representations or measurements regarding the at least one yet-to-be-determined aspect of the at least one sensor observation or the at least one observation subject, wherein the cyber process including at least one of the informational representations or measurements in at least one second series observation record, (c) measure point operations, wherein the cyber process utilizes at least one measure point to locate at least one selected aspect of at least one analytically rich indicator from at least one sensor observation-derived representation of the at least one sensor observation or at least one sensor observation subject, wherein the cyber process assigns at least one appropriate informational representation or at least one measurement regarding the at least one selected aspect of the analytically rich indicator, wherein the at least one informational representation or the at least one measurement is stored or utilized for making at least one selected cyber determination regarding or utilizing the at least one sensor observation or the at least one sensor observation subject, (d) analytically rich sparse data set operations, wherein the cyber process utilizes at least one analytically rich sparse data set that includes at least one raw data set or at least one derived data set, wherein the at least one raw data set from the at least one analytically rich sparse data set is comprised of at least one informational representation or at least one measurement selected from at least one raw sensor observation data set, and wherein the at least one derived data set from the at least one analytically rich sparse data set is comprised of at least one informational representation or at least one measurement that was derived from the processing of all or part of at least one raw sensor observation data set, wherein at least one informational representation or at least one measurement from the at least one raw data set or from the at least one derived data set of the at least one analytically rich sparse data set may be utilized by the cyber process for making at least one selected cyber determination regarding or utilizing at least one sensor observation or at least one sensor observation subject, (e) matching operations, wherein the matching operations include matching at least one second series observation record of at least one informational representation or measurements regarding the at least one second series sensor observation or at least one subject from the at least one second series observation with at least one comparable informational representation or measurement regarding at least one comparable sensor observation or sensor observation subject from at least one first series observation record, (f) comparing operations, wherein the comparing operations include comparing informational representation or measurements from at least one second series observation record with informational representation or measurements from at least one comparable first series observation record, and providing at least one conclusion from the comparison, (g) determining operations, wherein the cyber process utilizes the at least one conclusion from the at least one comparing operation or information for making the at least one selected cyber determination, and (h) reporting operations, wherein the reporting operations include providing at least one report regarding at least one aspect of at least one part of at least one cycle of utilization of the cyber process.

(i) second series observation operation that may be included as at least one second series observation record.

(j) In some embodiments of the disclosed cyber process, the cyber process is further configured to where all or part of the operations of the cyber process may be performed in any useable order or sequence.

(k) In some embodiments of the disclosed cyber process, the cyber process is further configured to utilize at least one standard informational representation or measurement to represent at least one specific aspect of at least one operation of the cyber process.

In yet another aspect, a method for making a cyber determination based on sensor observations, comprising:

defining a set of sensor observations for a subject, wherein each member of the set of sensor observations has an associated set of location information which defines where the sensor observation is obtained;

establishing a set of N possible outcomes to be ascertained based on the set of sensor observations, where $N \geq 1$;

establishing a correlation between at least some members of the set of sensor observations and at least some members of the set of possible outcomes;

for $k \in [1, \ldots, N]$, forming a $k^{th}$ set of sensor observations by (a) setting a $k^{th}$ threshold value for the correlation between the set of sensor observations and a $k^{th}$ member of the set of possible outcomes, and (b) adding to the $k^{th}$ set of sensor observations at least one member of the set of sensor observations, such that all members of the $k^{th}$ set of sensor observations have a correlation with the $k^{th}$ member of the set of possible outcomes that exceeds the $k^{th}$ threshold value;

receiving a request to ascertain whether the $k^{th}$ outcome has been achieved;

obtaining a $k^{th}$ set of data by performing the $k^{th}$ set of sensor observations on the subject; and using the $k^{th}$ set of data to ascertain whether the $k^{th}$ outcome has been achieved.

In some embodiments of the disclosed cyber process, the cyber In some embodiments a method for making a cyber determination based on sensor observations In some embodiments, a method for making a cyber determination based on sensor observations, comprising establishing a correlation between at least some members of the set of sensor observations and at least some of the set of possible outcomes includes:

capturing a preliminary set of data with the at least some members of the set of sensor observations; and establishing a correlation between the preliminary set of data and the at least some of the set of possible outcomes.

In some embodiments, a method for making a cyber determination based on sensor observations, wherein the subject is human, and wherein establishing a correlation between at least some members of the set of sensor observations and at least some of the set of possible outcomes includes:

capturing a preliminary set of data with the at least some members of the set of sensor observations using other human subjects; and establishing a correlation between the preliminary set of data and the at least some of the set of possible outcomes.

In some embodiments, a method for making a cyber determination based on sensor observations, comprising establishing a correlation between at least some members of the set of sensor observations and at least some members of the set of possible outcomes includes determining a correlation coefficient between at least some of the set of sensor observations and at least some of the set of possible outcomes.

In yet another aspect, a method for making a cyber determination based on sensor observations, wherein the correlation coefficient is the Pierson product-moment correlation coefficient.

In some embodiments, a method for making a cyber determination based on sensor observations, wherein the threshold value is at least 0.8.

In some embodiments, a method for making a cyber determination based on sensor observations, wherein the threshold value is at least 0.9.

In some embodiments, a method for making a cyber determination based on sensor observations, wherein the threshold value is at least 0.95.

In some embodiments, a method for making a cyber determination based on sensor observations, wherein each of the set of sensor observations is a set of pixels in an image of the subject.

In some embodiments, a method for making a cyber determination based on sensor observations, wherein the subject is a human subject, wherein the image of the subject captures the face of the subject, and wherein each member of the set of sensor observations includes a set of pixels located on the face of the subject.

In some embodiments, a method for making a cyber determination based on sensor observations, wherein each set of pixels has exactly one member.

In some embodiments, a method for making a cyber determination based on sensor observations, wherein each of the set of sensor observations is a set of pixels observed at a location selected from the group consisting of the corners of the subject's eyes, the centers of the subject's pupils, the bottom centers of the subject's upper eyelids, the top centers of the subject's lower eyelids, the tip of the subject's nose, the centers of the subject's left and right jawlines, the corners of the subject's mouth, the top center of the subject's upper lip, and the bottom center of the subject's lower lip.

In some embodiments, a method for making a cyber determination based on sensor observations, wherein obtaining a $k^{th}$ set of data by performing the $k^{th}$ set of sensor observations on the subject includes obtaining a video of the subject, and performing the $k^{th}$ set of sensor observations on each member of a set of frames taken from the video.

In some embodiments, a method for making a cyber determination based on sensor observations, wherein the $k^{th}$ set of data includes measurements of changes in the location where the sensor observation is obtained relative to a reference point from a first member of the set of frames to a second member of the set of frames.

In some embodiments, a method for making a cyber determination based on sensor observations, wherein determining whether the $k^{th}$ outcome has been achieved includes determining whether the $k^{th}$ set of data is consistent with the $k^{th}$ outcome having been achieved.

In some embodiments, a method for making a cyber determination based on sensor observations, wherein determining whether the $k^{th}$ set of data is consistent with the $k^{th}$ outcome includes determining whether the $k^{th}$ set of data supports a confidence level of at least 95%.

In some embodiments, a method for making a cyber determination based on sensor observations, wherein determining whether the $k^{th}$ set of data is consistent with the $k^{th}$ outcome includes determining whether the $k^{th}$ set of data supports a confidence level of at least 98%.

In some embodiments, a method for making a cyber determination based on sensor observations, wherein determining whether the $k^{th}$ set of data is consistent with the $k^{th}$ outcome includes determining whether the $k^{th}$ set of data supports a confidence level of at least 99%.

In some embodiments, a method for making a cyber determination based on sensor observations, wherein the $k^{th}$ set of sensor observations has less than 100 members.

In some embodiments, a method for making a cyber determination based on sensor observations, wherein the $k^{th}$ set of sensor observations has less than 50 members.

In some embodiments, a method for making a cyber determination based on sensor observations, wherein the $k^{th}$ set of sensor observations has less than 25 members.

In some embodiments, a method for making a cyber determination based on sensor observations, wherein the $k^{th}$ set of sensor observations has at least 10 members and no more than 25 members.

In some embodiments, a method for making a cyber determination based on sensor observations, wherein the $k^{th}$ set of sensor observations has at least 15 members and no more than 20 members.

In some embodiments, a method for making a cyber determination based on sensor observations, wherein the set of sensor observations includes observations of a set of pixels as a function of time.

In some embodiments, a method for making a cyber determination based on sensor observations, wherein the set of sensor observations includes observations of a set of pixels across the frames of a video.

In some embodiments, a method for making a cyber determination based on sensor observations, wherein the subject is the driver of a vehicle, wherein the set of N possible outcomes includes the outcome of a driver falling asleep, and wherein the set of pixels includes a pixel located on the bottom center of the driver's upper eyelid.

In some embodiments, a method for making a cyber determination based on sensor observations, wherein the set of location information which defines at least one location on the subject where the sensor observation is obtained.

In some embodiments, a method for making a cyber determination based on sensor observations, wherein the set of location information which defines at least one location on a representation of the subject where the sensor observation is obtained.

In some embodiments, a method for making a cyber determination based on sensor observations, wherein the representation is selected from the group consisting of pictures of the subject and videos of the subject.

In some embodiments, a method for making a cyber determination based on sensor observations, wherein the sensor observations include a set of pixels and the color of each member of the set of pixels.

BRIEF DESCRIPTION OF THE DRAWING

FIG. 1 is an illustration of a particular, non-limiting embodiment of a cyber system and associated cyber process in accordance with the teachings herein.

DETAILED DESCRIPTION

The present disclosure pertains to a scalable configurable universal full spectrum cyber process that may be configured to be utilized for making cyber determinations regarding or utilizing sensor observations or sensor observation subjects. The disclosed process utilizes at least one computing device, predetermined criteria and necessary cyber resources, along with at least one member of the group consisting of: (a) sensor observations, (b) informational representations, and (c) measurements, for making cyber determinations selected from the group consisting of a full spectrum of cyber determinations regarding or utilizing sensor observations or sensor observation subjects.

The disclosed cyber process may be configured to make cyber determinations regarding or utilizing measure points that locate selected specific analytically rich indicators from sensor observation-derived representations.

The disclosed cyber process may be configured to make selected cyber determinations utilizing informational representations or measurements regarding or utilizing selected measure points or analytically rich indicators from sensor observation-derived representations.

Additionally, the disclosed cyber process may be configured to utilize sensor observation-derived analytically rich sparse data sets for making selected cyber determinations in real time or at any time thereafter.

Unless otherwise specified herein, throughout this entire disclosure, each of the following will apply:
(a) use of the singular form of any word, phrase or statement may indicate either the singular or the plural form of the word, phrase or statement, and use of the plural form of any word, phrase or statement may indicate either the singular or the plural form of the word, phrase or statement;
(b) the term "or" shall be construed as the logically inclusive "or". Hence, the statement "A or B" shall be true if: (a) only A is true, (b) only B is true, or (c) both A and B are true; the notation "A and/or B" explicitly refers to the logically inclusive "or";
(c) the disclosed cyber process is scalable and therefore may be scaled to include cyber process resources from any point in a range of included necessary cyber process resources, wherein at one end of the range the disclosed cyber process may be scaled to include only the cyber process resources that are necessary for making the least complex, in regard to included necessary cyber process resources, of all cyber determinations regarding or utilizing sensor observations or sensor observation subjects, and at the other end of the range the disclosed cyber process may be scaled to include every cyber process resource that is needed to make every cyber determination that may be selected from a full spectrum of cyber determinations regarding or utilizing sensor observations or sensor observation subjects;
(d) all aspects of the operations of, or resources that are utilized by, the disclosed cyber process may be configurable; therefore, the disclosed cyber process or the resources it utilizes may be configured for utilization in one or more ways;
(e) all aspects of the cyber process disclosed herein may be configured to be universally used across a full spectrum of processes, procedures or resources that provide for any part of the operations of making cyber determinations regarding or utilizing sensor observations or sensor observation subjects;
(f) the disclosed cyber process may be configured to provide for selection of criteria, wherein criteria may be selected from the full spectrum of criteria that may be utilized for making cyber determinations regarding or utilizing sensor observations or sensor observation subjects;
(g) the disclosed cyber process is a full spectrum process and may be configured to utilize any process, procedure or resource selected from a full spectrum of processes, procedures or resources that may be utilized for making cyber determinations regarding or utilizing sensor observations or sensor observation subjects. Further, the disclosed cyber process may be configured to provide for any cyber determination need selected from the full spectrum of needs for cyber determinations regarding or utilizing sensor observations or sensor observation subjects.

The present disclosure primarily addresses use of video-formatted image sensor observations of people; however, the cyber process disclosed herein may be configured to utilize any sensor selected from the group consisting of a full spectrum of sensors that provide sensor observation-derived representations of sensor observations or sensor observation subjects upon which measure points may be located, on or in the area of selected aspects, characteristics or features of analytically rich indicators. Further, the disclosed cyber process may be configured to utilize measure points located on any sensor observation-derived representation of any sensor observation or any sensor observation subject selected from a full spectrum of sensor observations or sensor observation subjects that may be utilized for making selected cyber determinations regarding or utilizing sensor observations or sensor observation subjects.

Definitions

The following terms, as used in the present disclosure, have the meanings indicated.

Absolutely unique: occurring at a ratio of one to the total (non-zero) number of first series observation files. Thus, for example, if there are 100 first series observation files, then an occurrence is absolutely unique if it occurs at a ratio of 1:100.

Adjusting factors: processes or procedures that are specifically configured to be utilized to enable the disclosed cyber process to accurately or reliably make selected cyber determinations when there are aspects, characteristics or features of second series observations or second series observation subjects that are not exact matches to the same aspects, characteristics or features from the first series observations or first series observation subjects with which they are being matched or compared.

Analytically rich: being usable by the disclosed cyber process for accurately or reliably making one or more selected cyber determinations regarding or utilizing sensor observations or sensor observation subjects. The terms "accurately" and "reliably", as used here, may vary from one application to another, but imply the existence of a statistical correlation between the indicator and the determination (or the outcome that forms the basis for the determination). This correlation may be described, for example, by a correlation coefficient, such as the Pierson product-moment correlation coefficient. Hence, in some applications, "analytically rich" may refer to a correlation of the foregoing type characterized by a Pierson product-moment correlation coefficient having a value of at least 0.8, at least 0.9 or at least 0.95.

Analytically rich indicators: indicators that are analytically rich.

Artificial intelligence/AI: the use of cyber resources that includes processes, procedures or necessary data for making cyber determinations and taking actions based upon the outcomes of the cyber determinations, all structured to accomplish goals that were selected for those cycles of operations of the AI resources.

Aspects: aspects, characteristics or features; aspects, characteristics or features of sensor observation-derived representations of sensor observations or sensor observation subjects.

Beginning cyber determinations: the first in a series of questions to be answered (determinations to be made) through the use of cyber resources.

Behavioral analysis: the use of analysis of sensor observed behavior of biological organisms or devices for answering selected questions (making selected cyber determinations).

Biological characteristics: any characteristics of biological organisms, including people, that may be sensor observed and reported upon.

Capture/capturing: the use of cyber resources for acquiring and recording cyber sensor observations.

Characteristics: at least one recognized characteristic regarding aspects or features of sensor observations or sensor observation-derived representations of sensor observations or sensor observation subjects; observed characteristics may be assigned appropriate standard informational representations or measurements.

Constant determinations: cyber determinations that occur at any frequency which provides for essentially continuous cyber determinations.

Criteria: a group of selectable options containing at least one member.

Cyber: utilizing non-biological processing of programming; the term includes anything (such as, for example, devices, programming, processes or files) that utilizes non-biological processing of programming in any way.

Cyber determinations: utilization of necessary cyber resources for answering questions.

Cyber portals: cyber devices that may be configured to perform at least one action selected from the group consisting of: (a) sending cyber interactions from a person who is using a cyber portal, (b) receiving cyber interactions that are sent to a cyber portal, (c) providing sensor observations of the person who is using a cyber portal for use in determining the identity of the person who is using the cyber portal or for use for any other purposes, (d) providing output that enables a person to perceive cyber interactions that are sent to a cyber portal, and (e) enabling a person to interact with cyber interactions that are sent to a cyber portal.

Cyber resources: at least one cyber asset or at least one cyber resource.

Digitation: use of at least one fingertip or any other part of a person's body that may be observed by sensors to communicate the person's intended interactions with cyber resources.

Determinations of identity: (a) cyber determinations of previously unknown identity, or (b) cyber determinations that authenticate claimed identity.

Enrolling: the initial collecting or processing of sensor observations of one specific enrollee, wherein the processing results in the assignment of the appropriate informational representations or measurements that make up the initial first series observation records (the cyber identity or identifiers) for the one specific enrollee; informational representations or measurements from enrollment will be utilized as at least one part of the data sets that make up the first series observation records of the one specific observation subject that is the enrollee.

Extreme analysis: the use of analysis of all or part of raw sensor observation data sets for answering selected questions (making selected cyber determinations); using a video-formatted image sensor observation as an example, raw sensor observation data sets may include the X and Y line locations on an image's pixel grid and measurements of observed levels of red, green or blue light for each pixel of any video image.

Final cyber determination: the last cyber determination in a series of cyber determinations; the cyber determination that is needed to answer at least one question that was requested or required to be answered; one or more intermediate cyber determinations may also be final cyber determinations, while one or more final cyber determinations may also be intermediate cyber determinations; as an example, when making a cyber determination regarding the identity of a person, it may be determined that the person has red hair during one of the intermediate cyber determinations that occur thousands or millions of intermediate cyber determinations before the final determination of identity is made; therefore, a final cyber determination regarding the color of the person's hair may be made as a part of one of the intermediate cyber determinations that are required to be made as a part of making at least one selected cyber determination regarding the one specific person's identity.

Frame: a single video-formatted image that may be a part of a sequential stream of video-formatted images.

Full spectrum: the complete set of possible choices for a given variable or option which includes the subset of available choices for any given variable or option; thus, for example, the full spectrum of cyber resources is the complete set of possible cyber resources, which includes all available cyber resources.

Identity determinations: cyber determinations regarding identity.

Indicators: recognized aspects, characteristics or features of sensor observations or sensor observation-derived representations that may be assigned appropriate informational representations or measurements which may then be stored or used for making selected cyber determinations.

Informational representations: appropriate designations or measurements that are assigned to observed aspects, characteristics or features of sensor observations or sensor observation subjects; standard informational representations.

Intermediate cyber determination: any cyber determinations that are utilized for answering selected questions that are not exclusively the initial cyber determination or the final cyber determination in a selected series of cyber determinations.

Known person: a person who is the known subject of at least one first series observation record.

Machine learning: the use of cyber resources to make at least one cyber determination that may then be utilized to improve upon or further refine the cyber determination results of at least one subsequent cyber determination; machine learning may be structured to utilize human-selected processes or procedures for specific circumstances, or it may be unstructured and use processes or procedures that are unknown to humans because they were selected by the unstructured machine learning process and performed with no record of how cyber the determinations were made.

Measure points: points from sensor observation-derived representations that are utilized as a reproducible structure from which measurements may be made or structured analysis may be done.

Point: the smallest definable location in cyberspace.

Physical analysis: the use of analysis of sensor-observable physical characteristics of sensor observation subjects for answering selected questions (making selected cyber determinations).

Physiological analysis: the use of analysis of sensor-observable physiological characteristics of sensor observation subjects for answering selected questions (making selected cyber determinations).

Real time: occurring at essentially the exact moment in time that a sensor observation is captured; occurring at a time that was so close to the time when a sensor observation was made that a person would not notice any latency.

Recognized: sensor observation-derived representations of aspects, characteristics or features of the sensor observations or of sensor observation subjects that are identified for further utilization.

Series: a group of at least one.

Smudges: sensor observed artifacts from previous points in time that remain as a part of what was observed at any one specific point in time; in the case of an image sensor, light from previous points in time (may be at increments of 1,000 points in time or more per second) may still be observed by the sensor for one or more sequential images that are captured; the artifacts of light may then be used for making selected cyber determinations regarding or utilizing what occurred during one or more increments of time before the one specific sequential image was captured; the artifacts may also be used for making cyber predictions or cyber determinations as to what will be observed at one or more points in time in the future; smudges may also be reflected or refracted light that alters the levels of observed colored light at pixels that adjoin or are in the area of the sources of refracted or reflected light.

Smudge analysis: the utilization of analysis of sensor observed smudges for answering selected questions (making selected cyber determinations).

Sparse data set: a sensor observation-derived data set that is less than 10% of the size of the raw unprocessed sensor observation data set that the sparse data set was derived from.

Tell: one or more analytically rich indicators from sensor observation-derived representations that may be utilized for accurately or reliably making one or more selected cyber determinations (answering one or more selected questions) regarding or utilizing sensor observations or sensor observation subjects.

Unique: occurring at a selected ratio other than the ratio of absolutely unique.

Unique biological characteristics: any single observable characteristic of a biological organism or any combination of observable characteristics of one biological organism (e.g., a biological fingerprint) that can be considered to be unique or absolutely unique to the one specific observed biological organism.

Visual analysis: the use of analysis of image sensor observations for answering selected questions (making selected cyber determinations).

Y: the vertical line location from a pixel grid.

Yet-to-be-identified person: one specific person who is the subject of a second series observation; one specific person who has not yet been determined utilizing predetermined criteria to be the same person as one specific known person.

X: the horizontal line location from a pixel grid.

Prior Art Problems

Prior art's inability to keep up with the world's needs for accurate or reliable real time cyber determinations regarding selected aspects, characteristics or features of sensor observations or sensor observation subjects is due in part to numerous problems or inefficiencies with prior art processes or procedures.

Prior art processes or procedures for making selected cyber determinations regarding or utilizing sensor observations or sensor observation subjects each have at least one, if not all, of the following problems or inefficiencies:

a. prior art processes require a great deal of analysis or comparison for making each selected cyber determination;
b. data sets from prior art processes may only be utilized to make one selected final cyber determination during each cycle of the operation of prior art processes;
c. data sets from prior art processes are large and therefore inefficient to store, manage or compare;
d. data sets from prior art processes are not interoperable and therefore the data sets from one prior art process cannot be universally used with other prior art processes;
e. prior art processes are structured where they must reprocess second series sensor observation raw data sets each time they are compared with a different first series sensor observation raw data set;
f. prior art processes are not structured to be universally usable across a full spectrum of sensor observation circumstances, wherein sensor observation circumstances include: lighting, pose, sensors utilized, positions of subjects relative to the sensors, movements of sensors or sensor observation subjects, temperature, wind conditions, items on or about sensor observation subjects, other subjects of the sensor observation, location, or any other sensor observation circumstances selected from a full spectrum of sensor observation circumstances;
g. prior art processes do not utilize all aspects, characteristics or features from sensor observations that the processes need for achieving the highest possible levels of accuracy when making cyber determinations regarding or utilizing sensor observations or sensor observation subjects;
h. prior art processes cannot be utilized for a full spectrum of types of sensor observations or for a full spectrum of sensor-observable aspects, characteristics or features of the sensor observations or sensor observation subjects;
i. prior art processes are not structured to be scalable or configurable;
j. prior art processes cannot provide 100% accurate cyber determinations regarding the exact identity of any one specific person who is a subject of a sensor observation;
k. prior art processes cannot be utilized to constantly make cyber determinations regarding the claimed identity of any one specific person who is a subject of a sensor observation;
l. prior art processes are not configurable for providing cyber determinations regarding or utilizing a full spectrum of aspects, characteristics or features of a full spectrum of sensor observations or a full spectrum of sensor observation subjects;
m. prior art processes cannot be structured to provide the best possible performance from any aspects of their operations;
n. prior art processes are not as concise as they can possibly be in any aspects of their operations;
o. prior art processes are not as efficient as they can possibly be in any aspects of their operations;
p. prior art processes are not as simple as they can possible be in any aspects of their operations;
q. prior art processes lack the structure that is needed for their operations to be as concise, efficient and simple as they could be in any or all areas of operations;
r. prior art processes do not have or use the universal processes and procedures that are needed to achieve the highest possible levels of interoperability for making cyber determinations regarding or utilizing sensor observations or sensor observation subjects;

s. prior art processes do not convert selected aspects, characteristics or features from sensor observation-derived representations into analytically rich sparse data sets that may be stored or used for making selected cyber determinations in real time or at any time thereafter;

t. prior art processes do not have or utilize analytically rich sparse data sets that enable the prior art processes to accurately or reliably make one or more selected cyber determinations without the need for significant complex processing or analysis of sensor observations, sensor observation subjects or sensor observation data sets;

u. prior art processes are not configured to make cyber determinations regarding many aspects, characteristics or features of sensor observations or sensor observation subjects;

v. prior art processes cannot provide the vast array of cyber determinations regarding or utilizing sensor observations or sensor observation subjects that should be used for a part of the operations of autonomous vehicles or autonomous devices;

w. prior art machine learning processes are not structured or configured to make selected cyber determinations and to also provide reports, when needed, regarding why the machine learning processes are not performing as intended;

x. prior art processes are not structured where they may use multiple sensors of multiple types in multiple environments or operational circumstances for making selected cyber determinations regarding selected aspects, characteristics or features of sensor observations or sensor observation subjects;

y. prior art processes for making cyber determinations regarding or utilizing video-formatted image sensor observations or observation subjects are structured where it is necessary to process the first series observation and the second series observation raw data files each time the disclosed cyber process compares a second series observation to a first series observation;

z. prior art processes cannot make a large number of selected cyber determinations regarding or utilizing aspects, characteristics or features of sensor observations or sensor observation subjects;

aa. prior art processes for making cyber determinations regarding or utilizing sensor observations or sensor observation subjects cannot easily be configured to make selected cyber determinations that utilize more than one sensor or more than one type of sensor;

bb. prior art processes for making cyber determinations regarding or utilizing sensor observations or sensor observation subjects are not structured where any part of the data that is derived from the processes may be interoperably used with one or more other processes for making cyber determinations regarding or utilizing sensor observations or sensor observation subjects;

cc. prior art machine learning processes are far from being as simple, concise and efficient as they can possibly be, in part because they fail to recognize and not repeat any useless intermediate cyber determinations that the machine learning process makes during each learning cycle of its operations;

dd. prior art processes for making cyber determinations regarding or utilizing sensor observations or sensor observation subjects do not separate the operations of processing the sensor observations from the operations of making cyber determinations regarding or utilizing the sensor observations or the sensor observation subjects;

ee. prior art processes do not create, for further utilization, analytically rich sparse data sets as the result of their sensor observation processing operations;

ff. prior art processes are not configured to use analytically rich sparse data sets for making selected cyber determinations regarding or utilizing sensor observations or sensor observation subject in real time or at any time thereafter;

gg. prior art processes may be configured to utilize raw video-formatted image sensor observations for all aspects of making selected cyber determinations regarding or utilizing sensor observations or sensor observation subjects, resulting in extremely large data sets; these data sets require very large amounts of storage and are difficult if not impossible to utilize for making selected cyber determinations at the highest percentages of accuracy; further, prior art utilizes data sets that are so large that enormous processing resources are needed for prior art to constantly provide cyber determinations regarding the identity of any one specific person (determinations that would be less than 100% accurate);

hh. prior art processes fail to derive, from the processing of sensor observations, the intermediate cyber determinations that are needed for making 100% accurate final cyber determinations regarding the correct identity of any one specific person; and ii. prior art processes each use their own exclusive processes or procedures for making cyber determinations regarding or utilizing sensor observations or sensor observation subjects; these processes or procedures may not be interoperably used with other prior art processes or procedures for making cyber determinations regarding or utilizing sensor observations or sensor observation subjects.

Prior art processes for making cyber determinations regarding or utilizing sensor observations or sensor observation subjects fall far short of providing a best performing blend of as simple, concise and efficient as possible. In many ways prior art processes provide the worst performing blend of as complex, bloated and inefficient as they could possibly be in some or in all aspects of their operations.

This worst performing blend is due, at least in part, to prior art's failure to employ the structure that is derived from the use of measure points that locate selected specific aspects, characteristics or features of analytically rich indicators from sensor observation-derived representations. Doing so would allow for extreme analysis to be made of the sensor observation-derived representations at the points where measure points are located or in structured areas that are located through utilization of measure points. Prior art's operations are complex in part because prior art is not configured to utilize measure points for making cyber determinations regarding or utilizing sensor observations or sensor observation subjects.

The methodologies for utilizing analysis of an entire image-based sensor observation are much more complex and are computationally more intensive by magnitudes of thousands or millions than the methodologies that are utilized for making cyber determinations by performing extreme analysis of the points or areas where measure points are located on sensor observation-derived representations.

Cybersecurity and Privacy

At the heart of most cybersecurity failures is the complete inability of computers or cyber resources to constantly and accurately authenticate, from cyberspace, the claimed identity of any one specific person prior to allowing that one specific person or the cyber devices of that one specific person to first gain initial access and then be allowed continued access to cyber resources. Utilizing a cyber process such as the disclosed cyber process to accurately and constantly authenticate one specific person's identity as a prerequisite to that person gaining initial and continued access to cyber resources is an indispensable part of ending the cybersecurity failures that now plague humankind.

The key to accurately or reliably authenticating any one specific person's identity from cyberspace is the utilization of sensor observations of unique visual, biological, physiological or behavioral aspects, characteristics or features of the person whose identity is being claimed.

The disclosed cyber process may be configured to be utilized to provide cyber determinations regarding the identity of any one specific person (identity tests). These identity tests may be utilized to accurately grant only the one specific known person access to his or her own personal or private cyber resources, thereby absolutely preventing all others from gaining access.

The cyber process disclosed herein may be configured to utilize sensor observations of unique visual, biological, physiological or behavioral aspects, characteristics or features of a known person for making selected cyber determinations regarding the identity of any one specific person. The disclosed cyber process does so by means of accurately or reliably locating selected measure points on video-formatted image sensor observation-derived representations of the person's face. In this process informational representations or measurements are appropriately assigned to represent at least one member selected from the group consisting of: (a) each measure point's X or Y line locations on the image's pixel grid, (b) the measured levels of red, green or blue light that are observed at the specific pixel where each measure point is located, or (c) the measured levels of red, green or blue light that are observed at selected pixels from structured areas that are located through utilization of measure points. The assigned informational representations or measurements may be stored as a part of first series observation records or second series observation records. The appropriately assigned informational representations or measurements from the first or second series records may be utilized for accurately or reliably making selected cyber determinations regarding the identity of the person in real time, or at any time thereafter.

The disclosed cyber process was conceived as a means for constantly providing accurate authentication of any one specific person's claimed identity while he or she is using cyberspace resources. As you will learn in more detail, seventeen measure points that locate specific selected aspects, characteristics or features of analytically rich indicators from sensor observation-derived representations of a person's face may be used to accurately or reliably test a specific person's identity. Through proper utilization of the disclosed process it will be impossible for any impostor to pass the cyberspace identity test of any other person.

An accurate or reliable real time, constantly performed identity test for any one specific person is a powerful utility that has not been made available by prior art processes. The disclosed cyber process may be configured to provide identity tests that utilize a unique combination of visual, biological, physiological or behavioral aspects, characteristics or features of any one specific person for accurately or reliably making selected determinations regarding the identity of the one specific person, a unique combination that can never be replicated by impostors.

The disclosed cyber process may be configured to provide accurate or reliable constant testing of the identity of any one specific person through the disclosed cyber process's utilization of: (a) each of the seventeen measure points' X or Y line locations on the image's pixel grid, or (b) the observed levels of red, green or blue light from each of seventeen measure points. This same information will be derived from the processing of each sequential image of a video-formatted image sensor observation of the person's face.

Sensor observation-derived informational representations or measurements enable the disclosed cyber process to quickly or efficiently make accurate or reliable cyber determinations regarding the identity of the one specific person. Should constant determinations regarding the identity of a specific person be required, and the sensor observations are 30 frames per second (fps) video-formatted image sensor observations, then the disclosed cyber process may be configured to accurately or reliably make 30 cyber determinations regarding the identity of the one specific person, per second, in real time.

The news of the day, as I was writing the cybersecurity and privacy part of this disclosure, was about Tim Cook, CEO of Apple Corp. Mr. Cook talked about how Facebook and many other technology businesses sell collected data about specific people as a product that others may use to make any number of cyber determinations regarding any number of aspects or characteristics about any one specific user of Facebook's services from whom the data was derived. In doing so, Facebook and other technology businesses large and small essentially sell the privacy of their users. I'm not quite sure why the use of computing resources has evolved to the point where data from any one specific person's use of cyber resources may, and has been, utilized to accurately predict what the specific person may do, thereby stripping away the one specific person's right to privacy Mr. Cook also spoke of how privacy has been lost and will never come back. I don't think Mr. Cook was right! I've been working for many years on a patented collection of cyber architecture, devices, processes or procedures that when utilized will enable every person on the planet to have a very high degree of privacy when utilizing any or all cyberspace resources.

The key to enabling a very high degree of privacy when utilizing any or all cyberspace resources is to constantly test, as a condition of gaining initial access or continued access, any one specific person's identity while he or she uses cyberspace resources of any type. Utilizing a version of the disclosed cyber process that has been configured to be used as an identity test, any one specific person may configure all or any part of his or her cyber resources to always prevent all others from gaining access.

As new secure cyber environments are established, it will then be possible for any one specific person to configure his or her use of cyber resources so that the person has complete privacy or security for all or any part of his or her own cyber resources or cyber activities that others now easily access and utilize to invade the privacy of one's thoughts or actions.

Cybersecurity failures and the stripping away of each person's personal privacy rights are not the only perils that now plague us from cyberspace. We are also beleaguered by misinformation or disinformation that is delivered throughout cyberspace with malicious intent. Malicious cyber activities including cyber bullying, foreign nations influencing election outcomes and divisive fictitious materials that are posted on social media. These threats are all enabled by each person's complete lack of accountability for his or her own activities in cyberspace. The cyber process disclosed herein, as configured for use as an accurate or reliable constantly performed cyberspace identity test for any one specific person, may be utilized to accurately or reliably hold any one specific person accountable for each one of his or her own cyberspace activities or resources.

One of the greatest concerns of those who are skilled in the art of providing easy to use biologically-based cyber identity tests for any one specific person is that the utilized informational representations comprising the cyber identity of the one specific person may be stolen and then used fraudulently or maliciously. The disclosed cyber process may be configured to provide cyber identity tests for any one specific person that no impostor may pass.

Perhaps the most important task we will utilize computers for will be to provide constant accurate or reliable cyber determinations regarding any one specific person's identity both prior to and during the entire time that the one specific person is using important cyber resources of any type. The disclosed cyber process, as configured to be utilized for an easy-to-use, constantly performed, up to 100% accurate cyber identity test for any one specific person may be utilized to easily: (a) put an abrupt end to all cybersecurity failures, and (b) make any one specific person accountable for his or her cyber resources or his or her activities in cyberspace.

A technologically interconnected world capable of providing every possible cyber resource humanity could ever want or need can only be built upon the foundation of a secure and safe interconnected cyber environment or ecosystem. Constant utilization of accurate or reliable cyber determinations regarding the identity of any one specific person will be an indispensable part of establishing and maintaining a secure and safe cyber environment or ecosystem.

Proper utilization of sensor observation-derived cyber identity tests as disclosed herein (identity tests for any one specific person that may be highly accurate, including being 100% accurate) may for the first time enable the world to enjoy the benefits of a secure, safe and private technologically interconnected cyber environment or ecosystem.

Advantages of the Disclosed Cyber Process

In light of the foregoing, the disclosed cyber process may be configured to fill unanswered needs that presently exist with prior art—unanswered needs for cyber determinations regarding or utilizing sensor observations or sensor observation subjects which include:

(a) constantly providing cyber determinations, regarding whether a specific known person and a specific yet-to-be-identified person are the same person at any attainable level of accuracy, including 100% accuracy;

(b) utilizing any number of sensor-observable analytically rich indicators of identity of one specific known person or one specific yet-to-be-identified person for making cyber determinations regarding the identity of the one specific yet-to-be-identified person;

(c) utilizing sensor observations of people who are not consciously engaged participants in cyber determination of identity tests;

(d) providing at least one member selected from the group consisting of: (i) single cyber determinations of identity, (ii) intermittently provided cyber determinations of identity, and (iii) constantly provided cyber determinations of identity, regarding people who are sensor observation subjects;

(e) utilizing sensor observations of a yet-to-be-identified person performing a repetition of selected portions of previously captured sensor observations of a known person as a part of a cyberspace identity test;

(f) utilizing sensor observation-derived informational representations or measurements for making cyber determinations regarding or utilizing sensor observations or sensor observation subjects;

(g) utilizing observed analytically rich indicators regarding known subjects of sensor observations or yet-to-be-identified subjects of sensor observations for making cyber determinations regarding the identity of any one specific person;

(h) utilizing measure points from sensor observation-derived representations for making cyber determinations regarding or utilizing sensor observations or sensor observation subjects;

(i) providing or utilizing standard processes, procedures, measurements, designations, informational representations or definitions for accurately or consistently representing any aspect of the operations of the disclosed cyber process's utilization of sensor observations for making selected cyber determinations regarding or utilizing sensor observations or sensor observation subjects;

(j) providing absolute security or privacy for any information or resources that are utilized by the disclosed cyber process or that are utilizing the disclosed cyber process;

(k) utilizing any useful criteria for observing, recognizing, locating measure points, assigning appropriate informational representations or measurements, storing data, measuring, matching, comparing, determining, reporting or any other operation of the disclosed cyber process's utilization of sensor observations for making selected cyber determinations regarding or utilizing sensor observations or sensor observation subjects;

(l) utilizing observations that are not made by the disclosed cyber process for making selected cyber determinations regarding or utilizing sensor observations or sensor observation subjects;

(m) utilizing useful information of any type from any source for making selected cyber determinations regarding or utilizing sensor observations or sensor observation subjects;

(n) utilizing useful information that was derived from sensor observations for making selected cyber determinations regarding or utilizing sensor observations or sensor observation subjects;

(o) utilizing appropriately assigned standard informational representations or measurements regarding or utilizing measure points, or defined areas of sensor observation-derived representations that are located utilizing measure points, for making selected cyber determinations regarding or utilizing sensor observations or sensor observation subjects;

(p) utilizing informational representations or measurements regarding measure points, sensor observations or sensor observation subjects for making selected cyber determinations regarding or utilizing sensor observations or sensor observation subjects;

(q) utilizing matching of informational representations or measurements from second series observation records with comparable informational representations or measurements from first series observation records for making selected cyber determinations regarding or utilizing sensor observations or subjects of sensor observations; and (r) being scalable, in regard to included cyber resources, to be at any one point in a range from a minimum to a maximum, wherein at the minimum the disclosed cyber process includes only the cyber process resources that are needed for making the least complex (in regard to included necessary cyber process resources) of all cyber determination needs, and wherein at the maximum the disclosed cyber process includes all of the cyber process resources that are needed for making every cyber determination from a full spectrum of cyber determinations regarding or utilizing sensor observations or sensor observation subjects.

The following list includes a portion of the resources or features from a full spectrum of resources or features that the disclosed cyber process may be configured to provide:

(a) cyber determinations regarding or utilizing some or all subjects selected from a full spectrum of subjects of sensor observations that are utilized for making cyber determinations regarding or utilizing sensor observations or sensor observation subjects;

(b) cyber determinations regarding or utilizing some or all aspects selected from a full spectrum of aspects of cyber determinations regarding or utilizing sensor observations or sensor observation subjects;

(c) cyber determinations that fill some or all needs from a full spectrum of needs for cyber determinations regarding or utilizing sensor observations or sensor observation subjects;

(d) cyber determinations regarding or utilizing sensor observations or sensor observation subjects that are provided at one or more attainable levels of accuracy which may include 100% accuracy;

(e) cyber determinations that may utilize some or all resources from a full spectrum of available resources that may be utilized for making cyber determinations regarding or utilizing sensor observations or sensor observation subjects;

(f) cyber determinations regarding or utilizing sensor observations or sensor observation subjects that may utilize some or all information from a full spectrum of available useful information;

(g) cyber determinations that may utilize some or all sensor observations from a full spectrum of available useful sensor observations regarding or utilizing sensor observations or sensor observation subjects;

(h) cyber determinations that may utilize some or all sensor-observable analytically rich indicators selected from a full spectrum of sensor-observable analytically rich indicators regarding or utilizing sensor observations or sensor observation subjects;

(i) cyber determinations regarding or utilizing sensor observations or sensor observation subjects that may incorporate utilization of some or all criteria selected from a full spectrum of selections of useful criteria;

(j) cyber determinations regarding or utilizing sensor observations or sensor observation subjects that utilize: (i) standard processes, (ii) standard procedures, (iii) standard informational representations, (iv) standard measurements, or (v) standard definitions, for accurately or consistently representing any aspect, characteristic or feature of the disclosed cyber process or its operations;

(k) cyber determinations regarding or utilizing sensor observations or sensor observation subjects that may be made (i) one single time, or (ii) intermittently, or (iii) constantly;

(l) for use of the disclosed cyber process for the purpose of testing identity prior to granting or denying people or cyber devices access to the disclosed cyber process itself, cyber resources that are being utilized by the disclosed cyber process, or cyber resources that are utilizing the disclosed cyber process;

(m) security or privacy, which may include absolute security or privacy, for some or all cyber resources or activities that are utilizing or are being utilized by the cyber process disclosed herein;

(n) for utilization of sensor observations of any one specific person for the purpose of making selected cyber determinations regarding the identity of the one specific person wherein the one specific person who is a subject of a sensor observation may be at any one point in a range of, from being in the presence of sensors but not being consciously engaged in the determination of identity observations, to being in the presence of sensors and being consciously engaged and participating in the determination of identity observations;

(o) scalability as related to included necessary cyber process resources, wherein the disclosed cyber process may be specifically configured to include only the cyber process resources that are necessary to provide for selected cyber determination needs at any point in a range. At the smallest end of the range, the disclosed cyber process may be configured to provide for the smallest of all cyber determination needs for included necessary cyber process resources, and at the largest end of the range the disclosed cyber process may be configured to provide all of the cyber process resources that are necessary for making a full spectrum of cyber determinations regarding or utilizing sensor observations or sensor observation subjects;

(p) for ease of use in any or all phases of all the disclosed cyber process's operations for the making of selected cyber determinations regarding or utilizing sensor observations or sensor observation subjects;

(q) persistence in attempting to achieve selected goals or any part thereof when making cyber determinations regarding or utilizing sensor observations or sensor observation subjects;

(r) for utilization of observed visual, biological, physiological or behavioral aspects, characteristics or features from analytically rich indicators from sensor observation-derived representations of a yet-to-be-identified person or known people when making cyber determinations regarding the identity of any one specific person;

(s) for alteration of operations of the disclosed cyber process itself or any resources that are being utilized by the disclosed cyber process for any purpose, including the purpose of aiding to achieve possible-to-attain-goals for making selected cyber determinations regarding or utilizing sensor observations or sensor observation subjects;

(t) for utilization of useful information that was derived from any source for making selected cyber determinations regarding or utilizing sensor observations or sensor observation subjects;

(u) for utilization of appropriately assigned informational representations or measurements regarding or utilizing measure points from sensor observation-derived representations for making selected cyber determinations regarding or utilizing sensor observations or sensor observation subjects;

(v) for utilization of unique combinations of simultaneously occurring observed analytically rich indicators for making selected cyber determinations regarding or utilizing subjects of sensor observations; or (w) for utilization of combinations of observed analytically rich indicators regarding observations or observation subjects that were observed over one or more periods of time, or at one or more points in time for providing selected cyber determinations regarding or utilizing sensor observations or sensor observation subjects.

At present we live in a technologically interconnected world where the vast spectrum of available cyber resources is ever widening. Over time our technologically interconnected world appears to be destined to provide every possible cyber resource that humanity could ever want or need. Included in those cyber resources, and in accordance with the teachings herein, will be a scalable configurable universal full spectrum cyber process that utilizes measure points from sensor observation-derived representation or analytically rich sparse data sets for making selected cyber determinations regarding or utilizing sensor observations or sensor observation subjects.

The disclosed cyber process may be configured to make sensor observation-derived cyber determinations regarding the identity of any one specific person. The disclosed cyber process may also be configured to make selected cyber determinations regarding or utilizing sensor observations or any other sensor observation subjects. The disclosed cyber process may be configured to assign appropriate informational representations or measurements regarding or utilizing measure points that locate selected aspects, characteristics or features of analytically rich indicators from sensor observation-derived representations. The assigned informational representations or measurements may be stored as parts of analytically rich sparse data sets where they may be utilized for making the presently needed 100% accurate cyber determinations regarding the identity of any one specific person in real time or at any selected times in the future.

In addition, the disclosed cyber process may be configured to provide any other cyber determinations regarding or utilizing sensor observations or sensor observation subjects that our world could ever want or need. A further discussion of these universal concepts has been disclosed in:

(a) co-pending U.S. patent application Ser. No. 15/483,970 (Aronson), filed Apr. 10, 2017, entitled "Scalable Configurable Universal Operating System", having the same inventor, which is incorporated herein by reference in its entirety; which application is a continuation-in-part application of U.S. patent application Ser. No. 15/236,337 (Aronson), filed Aug. 12, 2016, issued as U.S. Pat. No. 9,660,996 on May 23, 2017, entitled "Point-of-Cyber-Access Cyber System", having the same inventor, which is incorporated herein by reference in its entirety; which application is a continuation-in-part application of U.S. patent application Ser. No. 14/447,283 (Aronson), filed on Jul. 30, 2014, issued as U.S. Pat. No. 9,479,507 on Oct. 25, 2016 (Aronson), entitled "Single-Point-of-Access Cyber System", having the same inventor, which is incorporated herein by reference in its entirety; which application is a continuation application of U.S. patent application Ser. No. 13/702,537 (Aronson), filed on Oct. 19, 2011, issued as U.S. Pat. No. 8,832,794 on Sep. 9, 2014 (Aronson), entitled "Single-Point-of-Access Cyber System", having the same inventor, which is incorporated herein by reference in its entirety, and (b) co-pending U.S. patent application Ser. No. 15/456,542 (Aronson), filed Mar. 12, 2017, entitled "Scalable Universal Full Spectrum Cyber Determining Process", having the same inventor, which is incorporated herein by reference in its entirety, which application is a continuation-in-part application of U.S. patent application Ser. No. 15/071,075 (Aronson), filed Mar. 15, 2016, issued as U.S. Pat. No. 9,635,025 on Apr. 25, 2017 (Aronson), entitled "Scalable Universal Full Spectrum Cyber Determining Machine", having the same inventor, which is incorporated herein by reference in its entirety; which application is a continuation-in-part application of U.S. patent application Ser. No. 14/857,445 (Aronson), filed Sep. 17, 2015, issued as U.S. Pat. No. 9,319,414 on Apr. 19, 2016 (Aronson), entitled "Scalable Full Spectrum Cyber Determination Process", having the same inventor, which is incorporated herein by reference in its entirety; which application is a continuation-in-part application of U.S. patent application Ser. No. 14/316,196 (Aronson), filed Jun. 26, 2014, issued as U.S. Pat. No. 9,166,981 on Oct. 20, 2015 (Aronson), entitled "Full Spectrum Cyber Identification Determination Process", having the same inventor, which is incorporated herein by reference in its entirety; which application is a continuation of U.S. patent application Ser. No. 13/784,277 (Aronson), filed Mar. 4, 2013, issued as U.S. Pat. No. 8,769,649 on Jul. 1, 2014 (Aronson), entitled "Full Spectrum Cyber Identification Determination Process", having the same inventor, which is incorporated herein by reference in its entirety; which application is a continuation of U.S. patent application Ser. No. 13/688,925 (Aronson), filed Nov. 29, 2012, issued as U.S. Pat. No. 8,434,136 on Apr. 30, 2013 (Aronson), entitled "Full Spectrum Cyber Identification Determination Process", having the same inventor, which is incorporated herein by reference in its entirety.

As the spectrum of available cyber resources continues to grow larger and larger, so does the need for concise efficient accurate processes or procedures that utilize sensor observations for accurately or reliably making selected cyber determinations regarding or utilizing aspects, characteristics or features of sensor observations or sensor observation subjects.

As we rely more and more on computing-based resources, one of the fundamental requirements for many of those resources is fully automated operation for as many operations as possible. In many cases, the computing-based resources need to rely on automated cyber determinations regarding an occurrence in the physical world to accurately or reliably make selected cyber determinations in real time or at any time thereafter. The disclosed cyber process may be configured to achieve the operational goal of being a best performing blend of as simple, concise and efficient as it can possibly be throughout all of its operations, processes or procedures. The disclosed process may be configured to achieve this operational goal, in part, through utilization of measure points that locate selected aspects, characteristics or features of analytically rich indicators from sensor observation-derived representations of sensor observation or sensor observation subjects. Use of target sets of measure points from sensor observation-derived representations provides the structure that is needed to accurately or reliably make cyber determinations regarding or utilizing sensor observations or sensor observation subjects.

Further, structure that is provided by use of measure points or target sets of measure points enables interoperable use of the disclosed process, procedures or components thereof across multiple types of computing processes, systems or environments. Utilization of measure points provides the structure and common elements that are needed to: (a) standardize, (b) unify, and (c) synchronize, the operations of the different processes or procedures of the disclosed cyber process whenever or wherever they are performed.

Much of the present disclosure will teach of utilization of measure points that are utilized for locating aspects, characteristics or features from video-formatted image sensor observation-derived representations of a person or a person's face; however, measure points may be utilized to locate aspects, characteristics or features from any type of sensor observation-derived representation that may be observed utilizing any type of sensor selected from a full spectrum of possible sensors. Further, the disclosed process may be configured to utilize more than one (simultaneously or not simultaneously occurring) sensor observation of one or more sensor observation subjects, and do so utilizing one or more types of sensors.

The disclosed cyber process may be configured to include utilization of processes or procedures for making selected cyber determinations regarding or utilizing sensor observations or sensor observation subjects. The disclosed cyber process may include utilization of at least one member selected from the group consisting of:

(a) processes or procedures for selecting the analytically rich indicators from sensor observation-derived representations that may be utilized for making selected cyber determinations;

(b) processes or procedures for selecting the analytically rich indicators from sensor observation-derived representations that will be located through utilization of measure points;

(c) processes or procedures for determining the measure points that will be included as members of standard target sets of measure points, wherein the target sets of measure points may each be configured to be utilized for making selected cyber determinations regarding or utilizing selected sensor observations or selected sensor observation subjects under specific or varying sensor observation circumstances;

(d) processes or procedures for accurately or reliably locating measure points from target sets on sensor observation-derived representations;

(e) processes or procedures for assigning appropriate informational representations or measurements regarding or utilizing at least one member selected from the group consisting of: (i) measure points, (ii) sensor observations, and (iii) sensor observation subjects;

(f) processes or procedures for storing informational representations or measurements regarding or utilizing at least one member selected from the group consisting of: (i) measure points, (ii) sensor observations, and (iii) sensor observation subjects;

(g) processes or procedures for utilizing informational representations or measurements regarding at least one member selected from the group consisting of: (i) measure points, (ii) sensor observations, and (iii) sensor observation subjects, for making selected cyber determinations; and (h) any other processes or procedures that may be utilized for making selected cyber determinations regarding or utilizing sensor observations or sensor observation subjects.

Operating in any usable order or sequence, and utilizing all or any part of at least one of the following, the disclosed cyber process may be configured to:

(a) utilize useful sensor observations or useful information from any source;

(b) determine or utilize the level of cyber determination accuracy that has been achieved;

(c) determine or utilize a measure of adequacy of available resources;

(d) utilize cyber resources to capture first series observations or second series observations;

(e) determine which observed aspects, characteristics or features of analytically rich indicators from sensor observation-derived representations will be located through utilization of measure points;

(f) determine which measure points will be included in standard targeted sets of measure points;

(g) locate measure points from standard target sets of measure points at selected analytically rich indicators from sensor observation-derived representations;

(h) assign appropriate concise informational representations or measurements regarding: (i) the point or points where measure points are located, or (ii) structured areas where measure points are utilized to locate selected analytically rich indicators regarding aspects, characteristics or features from sensor observation-derived representations;

(i) utilize informational representations or measurements regarding analytically rich indicators at the points where measure points are located for making cyber determinations regarding or utilizing sensor observations or sensor observation subjects;

(j) utilize informational representations or measurements regarding observed analytically rich indicators from within the confines of selected structured areas that are located through the utilization of measure points; and (k) store informational representations or measurements regarding measure points or observed analytically rich indicators, wherein the stored informational representations or measurements may be used for making selected cyber determinations in real time or at any time thereafter.

The disclosed cyber process may be configured to provide cyber determinations that utilize any process or any procedure or any combination thereof selected from the full spectrum of processes or procedures that may be utilized for at least one member selected from the group consisting of: (a) making cyber determinations regarding or utilizing sensor observations, (b) appropriately assigning or utilizing measurements regarding or utilizing measure points, (c) assigning or utilizing appropriate informational representations or measurements to aspects, characteristics or features of observed analytically rich indicators from sensor observation-derived representations, or (d) utilizing informational representations or measurements that were derived from the processing of sensor observations for making selected cyber determinations regarding or utilizing sensor observations or sensor observation subjects.

Through the incredible speed and power of the operations of cyber resources, any large number of criteria may collectively or selectively be utilized for any aspect of the operations of the disclosed cyber process.

Every aspect of the operation of the disclosed cyber process may be configured to utilize predetermined criteria. Criteria selected from a group consisting of a full spectrum of criteria may be predetermined by a person, or criteria may be predetermined as an integral part of the operations of the cyber resources that are being utilized, or criteria may be predetermined as a part of the operations of the disclosed cyber process, or criteria may be predetermined utilizing any other means for selecting criteria, or any combination thereof. Selection of anything may also constitute selecting criteria.

Criteria are selected choices of who, when, where, what, why or how as each relates to any aspect of the operations of the disclosed cyber process. Providing a choice of any possible criteria and any criteria being possible may well be the most important feature that many cyber resources have to offer. The cyber process disclosed herein may take full and best advantage of this particular cyberspace feature by being configured to provide any user with a choice of selection of available criteria regarding any aspects of his or her utilization of the disclosed cyber process.

The cyber process disclosed herein may be configured to make cyber determinations by comparing informational representations or measurements regarding or utilizing yet-to-be-determined aspects, characteristics or features of second series observations or second series observation subjects with informational representations or measurements regarding or utilizing known aspects, characteristics or features of comparable first series observations or first series observation subjects.

Informational representations or measurements regarding any one specific first series observation subject represent the cyberspace identifiers for the aspects, characteristics or features that make up the cyberspace identity for the one specific first series observation subject. Informational representations or measurements regarding any one specific second series observation subject represent the cyberspace identifiers for the yet-to-be-determined aspects, characteristics or features that make up the cyberspace identity of the one specific second series observation subject.

The cyber process disclosed herein may be at least one member selected from the group consisting of: (a) configured as a single self-contained process, (b) configured to utilize interconnected resources, (c) configured to be utilized as an integral or remote resource of devices or systems, (d) configured to utilize all or part of the resources of devices or systems, (e) configured to be utilized in virtual environments or physical environments or any combination thereof, (f) configured to be utilized by stationary devices or mobile devices or any combination thereof, (g) configured to be utilized by devices that are located in one or more locations, and (h) configured to utilize or be utilized by resources that are interconnected in any way.

Utilization of measure points for accurately or reliably locating aspects, characteristics or features of analytically rich indicators from sensor observation-derived representations is not the only combination of processes or procedures that the disclosed cyber process may be configured to utilize for making cyber determinations regarding or utilizing sensor observations or sensor observation subjects. The disclosed cyber process may be configured to make cyber determinations regarding or utilizing sensor observations or sensor observation subjects through utilization of any process or procedure selected from the group consisting of the full spectrum of processes or procedures that may be utilized for making cyber determinations regarding or utilizing sensor observations or sensor observation subjects.

The disclosed cyber process may be configured to achieve a goal of providing a best performing blend of as simple, concise and efficient as possible when making cyber determinations regarding or utilizing sensor observations or sensor observation subjects. This may be accomplished through the cyber determining process's use of informational representations or measurements regarding or utilizing measure points that locate analytically rich indicators from sensor observation-derived representation.

The disclosed cyber process may be configured to provide a best performing blend of as simple, concise and efficient as possible utilization of sensor observation-derived informational representations or measurements by utilizing the smallest possible number of informational representations or measurements regarding the smallest possible number of targeted observed aspects, characteristics or features of the smallest possible number of analytically rich indicators from the sensor observation-derived representations as are needed for making the smallest number of intermediate cyber determinations possible when making selected cyber determinations regarding or utilizing sensor observations or sensor observation subjects.

The disclosed cyber process may be configured to utilize unprocessed raw sensor observation-derived data sets that may range from being the least complex in regard to overall size or complexity of unprocessed raw data to being extremely complex regarding overall size or complexity of unprocessed raw data. An outdoor light sensor observation would be an example of a very small and simple set of data from a sensor observation, wherein the disclosed cyber process may be configured to assign appropriate informational representations or measurements regarding the specific time the sensor observation indicated a specific threshold high level of light first occurs, and other informational representations or measurements may be appropriately assigned when the light sensor observation indicates a threshold low level of light first occurs.

Video-formatted image sensor observations would be an example of very large and complex unprocessed raw data sets. For example, a 1080P video-formatted image sensor may be configured to provide at least thirty sequential two-million pixel images per second, with each of the two-million pixels from each image having standard raw informational representations or measurements regarding the one specific pixel which include informational representations or measurements regarding the specific horizontal line location and the specific vertical line location of each pixel on the image's pixel grid, and measurements regarding the levels of red, green or blue light that are observed at each pixels from each image.

The disclosed cyber process may be configured to assign or utilize appropriate informational representations or measurements regarding or utilizing analytically rich indicators or measure points from sensor observation-derived representations. The assigned informational representations or measurements may be configured where they may be used universally by the disclosed cyber process or by any other processes or procedures that make or utilize cyber determinations regarding or utilizing sensor observations or sensor observation subjects.

The disclosed cyber process may be configured to be utilized as a part of a self-contained device or system. The self-contained device or system may be further configured to send pre-processed sensor observation-derived informational representations or measurements to integral or remote physical or virtual cyber devices.

The disclosed cyber process may be configured to be utilized with: (a) at least one member selected from a group consisting of a full spectrum of sensors, (b) at least one member selected from a group consisting of a full spectrum of sensor observation subjects, or (c) at least one member selected from a group consisting of a full spectrum of sensor observation circumstances.

The disclosed cyber process may be configured to utilize any sensors selected from a full spectrum of sensors that may be utilized for making cyber observations regarding or utilizing sensor observations or sensor observation subjects. The full spectrum of sensors may include at least one member selected from the group consisting of: (a) light sensors that sense any spectra of light selected from a full spectrum of sensor-observable spectra of light, (b) odor sensors, (c) temperature sensors, (d) pressure sensors, (e) electric energy sensors, (f) image sensors that sense any spectra of light selected from a full spectrum of sensor-observable spectrums of light, (g) odor sensors, (h) chemical sensors, and (i) any other types of sensor that may be utilized for capturing sensor observations that may be utilized for making selected Any operations of the disclosed cyber process, or any portions thereof, may be performed in any usable order or sequence.

The end goal of the disclosed cyber process's use of the same standard processes or procedures throughout all operations is to have the exact same outcome for any exact same observation regardless of whether the observation was a first series observation or a second series observation, and regardless of when the observation was made or when it was processed utilizing the standard processes or procedures of the disclosed cyber process.

Additionally, based upon selected criteria, the disclosed cyber process may be configured to be persistent in attempting to make selected cyber determinations. As an example, should a determination based upon conclusions from comparing informational representations or measurements regarding measure points or observed analytically rich indicators from a first aspect, characteristic or feature of a sensor observation-derived representation of one specific person's face not result in the disclosed cyber process making a selected cyber determination of identity, then the disclosed cyber process may be configured to continue comparing or determining operations until the selected determination has been made, or there are no further comparable first series observation records to compare with second series observation records.

The cyber process disclosed herein may be configured to utilize useful information from any source for making cyber determinations regarding or utilizing sensor observations or sensor observation subjects. Perhaps the most powerful of all useful information that may be utilized by the disclosed cyber process, when making determinations regarding the identity of any one specific person, would be information as to exactly who the one specific yet-to-be-identified person may be. If the information that the disclosed cyber process utilizes is accurate, then comparison of only one specific person's first series observation records to the second series observation records of the one specific yet-to-be-identified person is all that would be needed to reliably make the selected cyber determination regarding the identity of the one specific yet-to-be-identified person.

The disclosed cyber process may be configured to interact with cyber resources that are being utilized by the disclosed process to alter the operations of those resources for any purpose, including for the purposes of capturing any possible sensor observations or providing any useful variations of the operations of utilized cyber resources.

In the past, I have employed an operational goal of utilizing a best performing blend of as simple, as concise and as efficient as possible in all areas of operations of the devices or processes I invent, design or build. Most recently, I applied my operational goal to the task of utilizing sensor observations for making selected cyber determinations regarding or utilizing sensor observations or sensor observation subjects. In doing so, I found that proper utilization of analytically rich sparse data sets regarding selected aspects, characteristics or features of sensor observations or sensor observation subjects is a very powerful tool to use for accurately or reliably making cyber determinations regarding or utilizing sensor observations or sensor observation subjects.

As an example, using a 1080p video-formatted image sensor observation of a person's face, a standard target set of seventeen measure points may be accurately or reliably located on each sequential frontal image of a person's face. Selected locations for measure points include corners of eyes, centers of pupils, bottom centers of upper eyelids, top centers of lower eyelids, tip of nose, centers of left and right jawlines, corners of mouth, top center of upper lip, and bottom center of lower lip. Each of these measure points will be located on one specific horizontal line and one specific vertical line from the image pixel grid of the sensor observation-derived representation of the person's face. The horizontal and vertical line locations of each measure point is the measure point's exact and precise location on the image sensor observation-derived representation.

In addition, the disclosed cyber process may be configured to utilize informational representations or measurement regarding the levels of red, green or blue light that were observed at each of the pixels where the seventeen measure points are located.

Utilizing analytically rich sparse data sets regarding pixel grid locations or measured observed levels of red, green or blue light for only the seventeen pixels where the selected measure points are located will make it possible to make a multitude of selected cyber determinations regarding the person who is the subject of the sensor observation.

The foregoing principles may be further appreciated with respect to FIG. 1, which illustrates a first particular, non-limiting embodiment of utilization of one configuration of the disclosed cyber process in accordance with the teachings herein. As seen therein, a system 101 is provided which comprises a computer 103 equipped with an image display 105 and a video formatted image sensor 107. The computer 103 has installed, in a tangible, non-transient memory device associated therewith, a computer program which implements the processes or procedures of a version of the disclosed cyber process that has been configured to be utilized as a human fingertip to computer interface. Accordingly, the computer 103 utilizes the raw sensor observation data set from the video image sensor's observations of the person's fingertip to locate one measure point at the pixel, from the image sensor observation-derived representations, that is at the center of each sensor observation-derived representations of the person's fingertip 109. The disclosed cyber process utilizes the X and Y locations, on the image's pixel grid, of the pixel where the one measure point is located, as a reference that is utilized for similarly locating a cursor on the computer's image display screen. The location of the cursor may be updated, from video image to sequential video image, when there is a change in the location of the measure point on the image's pixel grid. The person may make a selection at the location of the cursor by moving their fingertip closer to, and then farther away from the computer's image sensor. Changes in measurements of observed levels of red, green or blue light, at the pixel where the measure point is located, from video image to sequential video image, will enable the disclosed cyber process to determine the person wishes to make a selection where the cursor is located on the computer's image display screen. In the particular application depicted, this technique is being utilized to allow the user's finger to be used as a mouse or stylus for drawing purposes, although it will be appreciated that the same or similar techniques may be utilized for a wide variety of other purposes.

The analytically rich data set that is derived from each sequential image of the sensor observation of the person's fingertip includes only the XY locations, on the image's pixel grid and the measurements of observed levels of red, green or blue light for the one pixel from the image sensor-derived representation where the measure point at the center of the sensor observation-derived representation of the person's fingertip is located.

One of the key components of the disclosed cyber process's operational goal is best performance. Best performance may preferably be defined as the best possible performance or results that utilization of cyber processes or procedures, or combinations thereof, may achieve. Operations of the disclosed cyber process where best performance may be utilized as an operational goal may include at least one operation selected from the group consisting of: (a) determining which analytically rich indicators from sensor observation-derived representations will be utilized to simply or efficiently answer selected questions, (b) determining the selection of points or areas from analytically rich indicators from sensor observation-derived representations that will be located through utilization of measure points, (c) capturing first or second series sensor observations, (d) processing sensor observations, (e) locating selected measure points on sensor observation-derived representations, (f) assigning appropriate informational representations or measurements regarding or utilizing selected aspects, characteristics or features of sensor observations or sensor observation subjects, (g) utilizing measure points that have been located on sensor observation-derived representations, (h) providing structured storage of informational representations or measurements regarding or utilizing: (i) sensor observations, (ii) subjects of sensor observations, and (iii) measure points; (i) utilizing appropriate informational representations or measurements regarding or utilizing sensor observation-derived representations for making selected cyber determinations regarding or utilizing sensor observations or sensor observation subjects, (k) standardization of at least one member selected from the group consisting of: (i) processes, (ii) procedures, (iii) selection of processes or procedures to utilize, (iv) processing of sensor observations, (v) storing data, (vi) utilizing data, (vii) processing of raw data sets from analytically rich sparse data sets, (viii) processing of derived data sets from analytically rich sparse data sets, (ix) assignment or utilization of definitions, (x) utilization of units of measure, (xi) making adjustments for differences between first series observations and second series observations, (xii) making cyber determinations; or (l) any other aspect of the operations of the disclosed cyber process selected from a group consisting of a full spectrum of other aspects of operations of the disclosed cyber process, and (m) any combination thereof.

The disclosed cyber process may be configured to make cyber determinations regarding or utilizing sensor observations or sensor observation subjects by matching or comparing informational representations or measurements regarding or utilizing yet-to-be-determined aspects, characteristics or features of second series observations or second series observation subjects with comparable informational representations or measurements regarding or utilizing known aspects, characteristics or features of first series observations or first series observation subjects. The percentage of accuracy that is attained when the disclosed cyber process is utilized for making cyber determinations is related, at least in part, to the percentage of accuracy that is attained when selecting each of the standard processes or procedures that are utilized for each part of the operations of the cyber process disclosed herein.

The cyber process disclosed herein may be configured to achieve highest percentages of accuracy for making cyber determinations regarding or utilizing sensor observations or sensor observation subjects through its utilization of standard processes or standard procedures for selecting the specific standard target sets of measure points to locate on specific sensor observation-derived representations.

The disclosed cyber process may be configured to process second series observations with the exact same standard processes or standard procedures that were utilized for processing first series observations with which they will be compared.

The disclosed cyber process may be configured to achieve a goal of having the exact same outcome occur every time the exact same observation is processed as a part of any first series observations or as a part of any second series observations.

Inherent in the use of standard processes or standard procedures is the concept of same outcome. A first series observation is made of a person under a specific set of observation circumstances. Standard processes or standard procedures may be utilized to assign standard appropriate informational representations or measurements regarding or utilizing the sensor observations or a sensor observation subject. When the same sensor observation subject is observed by a different sensor at a different time under a different set of observation circumstances, the use of the exact same standard processes or standard procedures for assigning appropriate informational representations or measurements regarding the second series sensor observation subject along with standard adjustments that are made to compensate for differences in observation circumstances should result in matching informational representations or measurements regarding the subject from the first series observation and the same subject from the second series observation.

The disclosed cyber process may be configured to assign or utilize standard measurements, standard designations, standard informational representations or standard definitions to represent observations, subjects of observations, observed indicators, measure points, measurements or any other aspect, characteristic or feature of the operations of the disclosed cyber process.

The cyber process disclosed herein may be configured to achieve highest possible percentages of accuracy when making cyber determinations regarding or utilizing sensor observations or sensor observation subjects through the use of standard processes or standard procedures that have been trained, taught or configured to accurately or consistently locate standard target sets of measure points on sensor observation-derived representations of only one specific person or only one specific observation subject. Prior art processes typically will be trained or taught utilizing a number of different observation subjects that are similar or are from a group such as people's faces or cats. The disclosed cyber process may be configured to include standard processes or standard procedures that are trained, taught or configured to locate standard target sets of measure points on sensor observation-derived representations of only one specific person or only one other specific subject of an observation. Use of personally trained, taught or configured processes or procedures for locating measure points on sensor observation derived representations of the one specific person is a necessary part of making cyber determinations regarding or utilizing the one specific person at the highest possible percentages of accuracy or reliability.

Operations of the disclosed cyber process where standard processes or standard procedures should be utilized for making cyber determinations regarding or utilizing sensor observations or sensor observation subjects at highest possible percentages of accuracy include at least one member selected from the group consisting of: (a) determining which aspects, characteristics or features of analytically rich indicators from sensor observation-derived representations will be located through utilization of measure points, (b) determining which selected cyber determinations for which the standard target sets of measure points will be utilized and under which specific observation circumstances, (c) determining which measure points will be included in each standard target set of measure points, (c) determining the points on sensor observation-derived representations where selected measure points will be located, (d) appropriately assigning or utilizing standard informational representations or measurements regarding or utilizing aspects, characteristics or features of sensor observations or sensor observation subjects, (e) determining information regarding the sensors that were utilized for making observations, (f) determining matches between informational representations or measurements from second series observations and informational representations or measurements from comparable first series observations, (g) utilizing informational representations or measurements that were derived from the processing of first series observations or second series observations for making cyber determinations, (h) utilizing standard definitions regarding or utilizing all aspects of operations of the disclosed cyber process, and (i) utilizing standard units of measure or methods of making measurements for making all measurements regarding or utilizing sensor observations or sensor observation subjects.

The cyber process disclosed herein may be configured to utilize non-standard processes or procedures. However, the informational representations or measurements regarding or utilizing sensor observation or sensor observation subjects that were derived utilizing the non-standard processes or procedures would need to be either an exact match or be translated or adjusted to match the standard process or procedure-derived informational representations or measurements that would have been assigned to the observed aspects, characteristics or features of the sensor observation-derived representation of the sensor observation or sensor observation subjects.

The operational goal of the disclosed cyber process may be applied to every aspect of the process's operations. One aspect of the process's operations is the processing of sensor observations for the purpose of making one or more cyber determinations. Typically, the processing of sensor observations may be broken down into three areas of operations, making initial cyber determinations, making intermediate cyber determinations and making final cyber determinations. In some cases, all or any part of what was determined when making initial cyber determinations may result in the making of at least one final determination. Further, the making of any one or more intermediate cyber determinations may also result in the making of one or more final cyber determinations. In addition, prior cyber determinations that have been made may be utilized for making selected subsequent intermediate or final cyber determinations wherein the previous cyber determinations were made in order to enable the making of one or more subsequent cyber determinations.

When utilizing the disclosed cyber process's operational goal for the operations of processing sensor observations, the disclosed cyber process may be configured to utilize the smallest number of intermediate cyber determinations possible for the making of selected final cyber determinations.

Further, applying the disclosed cyber process's operational goal to data sets that are derived from the processing of sensor observations, the disclosed cyber process's data and data sets will be configured to be as concise, efficient, and simple as they can possibly be. Therefore, the disclosed cyber process may preferably be configured to provide or utilize analytically rich sparse data sets wherein the data from these data sets may be as analytically rich as is needed to make selected cyber determinations, and sparse to the point where if there was any less data, it would not be possible to make the selected cyber determinations and there will be no data that is not needed for making selected cyber determinations.

The disclosed cyber process may be configured to report the results of one or more final cyber determinations that are made while making initial cyber determination or intermediate cyber determinations. Further, data that is derived from initial or intermediate cyber determinations may be analytically rich regarding it being usable for accurately or reliably making one or more additional selected cyber determinations.

The disclosed cyber process may be configured to make cyber determinations regarding or utilizing sensor observations or sensor observation subjects. The disclosed cyber process is not configured for using any sensor observation for making any cyber determination. Instead, it is configured for making selected cyber determinations utilizing specific available sensor observations. Operations of the disclosed cyber process begin with selection of which cyber determinations are to be made utilizing selected specific sensor observations. Examples of cyber determinations that may be selected to be made utilizing image sensor observations of a person's face may include: (a) what is a person's identity, (b) what is a person's hair color, (c) what is a person's eye color, (d) precisely what is a person looking at on a computer display screen, (e) what is a person's facial expression, (f) what is a person's mental or physical state of health, (g) does a person have an imminent intent to do harm, (h) what is a person's pulse rate, or (i) what is a person's blood pressure.

The cyber determinations to be made utilizing one or more specific selected sensor observations may be selected by: (a) processes, (b) procedures, (c) people, or (d) any combination thereof. The disclosed cyber process may be configured to meet one or more specific needs for cyber determinations that are necessary parts of other processes or procedures. In these cases, the cyber determinations to be made have already been selected and the disclosed process may be utilized for making cyber determinations regarding which sensor observations of which sensor observation subjects under which sensor observation circumstances will be needed to reliably make the selected cyber determinations.

The cyber process disclosed herein utilizes measure points that locate analytically rich indicators on sensor observation-derived representations of sensor observations or sensor observation subjects. Analytically rich indicators from sensor observation-derived representations are sensor-observable aspects, characteristics or features of sensor observations or sensor observation subjects that may be assigned appropriate informational representations or measurements. In the disclosed cyber process, the informational representations or measurements may be stored or used for making selected cyber determinations in real time or at any time thereafter. In making a cyber determination using video-formatted image sensor observations of a person's face, it is only necessary to utilize two analytically rich indicators for making a cyber determination that a vehicle's driver is falling asleep. The first analytically rich indicator is a point that locates the bottom center of one of the driver's upper eyelids; the other analytically rich indicator is a point that locates the top center of the lower eyelid at the same eye. Measure points may be located at both analytically rich indicators where the measured distance between the two measure points may be utilized to make determinations that the vehicle driver's eyelids are closed. Should the driver's eyelids be determined to be closed for a specified duration of time or longer, then the disclosed cyber process may be configured to reliably determine that the vehicle's driver is falling asleep or has fallen asleep Analytically rich indicators are any sensor-observable aspect, characteristic or feature from sensor observation-derived representations of sensor observations or sensor observation subjects that may be located through utilization of measure points and reliably used alone or in conjunction with other measure points located analytically rich indicators for making selected cyber determinations.

Examples of analytically rich indicators from sensor observation-derived facial images of a person that may be utilized by the disclosed cyber process include: (a) corners of eyes, (b) centers of pupils, (c) tip of nose, (d) corners of mouth, (e) top center of upper lip, (f) bottom center of lower lip, (g) tip of chin, (h) center edges of jawline, (i) top center of eyebrows, (j) outer edges of eyebrows, (k) inner edges of eyebrows, (l) pulse points, (m) scars, (n) marks, or (o) tattoos.

Measure points are structured points that locate specific selected aspects, characteristics or features of analytically rich indicators from sensor observation-derived representations. Measure points and aspects, characteristics or features of analytically rich indicators may be selected because informational representations or measurements regarding or utilizing the exact point where measure points are located, or structured areas that are located through utilization of measure points, are selected to be utilized as a part of the operations of the disclosed cyber process for making selected cyber determinations regarding or utilizing sensor observations or sensor observation subjects.

Measure points may be utilized for any purpose selected from a group consisting of a full spectrum of purposes for which measure points that are located on analytically rich indicators from sensor observation-derived representations may be utilized.

Informational representations or measurements regarding or utilizing selected measure points may be utilized by the disclosed cyber process for making determinations regarding or utilizing at least one member selected from the group consisting of: (a) the locations of selected measure points, (b) a measure point's measured relationship with at least one other measure point, (c) aspects, characteristics or features from a sensor observation-derived representation that are at the exact point where a measure point is located, (d) aspects, characteristics or features from sensor observation-derived representations that are observed in structured areas that are located through the utilization of measure points, (e) aspects, characteristics or features from sensor observation-derived representations that are separated by lines between two or more measure points, (f) sensor observation-derived representations of odors, (g) sensor observation-derived representations of pressures, (h) sensor observation-derived representations of temperatures, and (i) any other sensor observation-derived representations of aspects, characteristics or features from sensor observations or sensor observation subjects where measure points may be located and utilized for making selected cyber determinations regarding or utilizing sensor observations or sensor observation subjects.

Measure points may be utilized by the disclosed cyber process for providing the structure, continuity or common elements that are needed to standardize or unify the different operations of the disclosed cyber process when they are performed at different times or under different or the same observation circumstances. Through use of the standardization or structure that is enabled by utilization of measure points, the disclosed cyber process may be configured to utilize exactly the same standard processes or procedures for making the exact same cyber determinations regarding or utilizing the exact same sensor observation or sensor observation subject when the disclosed cyber process and its resources are being utilized for making selected cyber determinations regarding or utilizing sensor observations or sensor observation subjects at different times or under same or different observation circumstances.

The disclosed cyber process may be configured to utilize measure points to locate aspects, characteristics or features of analytically rich indicators from sensor observation-derived representations of any type. When using sensor observation-derived representations from temperature sensor observations, locating measure points on the sensor observation-derived representation is straightforward; therefore, complex processes or procedures are not needed to consistently locate measure points on temperature sensor observation-derived representations at 100% accuracy. However, making cyber determinations that utilize video-formatted image sensor observations of a person's face may require utilization of complex combinations of standard processes or standard procedures to consistently locate and utilize selected measure points at the highest percentages of accuracy.

When measure points have been located on image sensor observation-derived representations, a number of cyber determinations may be made utilizing raw image sensor observation data regarding a measure point's X or Y line locations on an image's pixel grid or measurements of observed levels of red, green and blue light at the pixels that are located at the exact points on the sensor observation-derived representations where measure points are located.

Measure points may be utilized for at least one purpose selected from the group consisting of a full spectrum of purposes for which measure points that locate aspects, characteristics or features of analytically rich indicators from sensor observation-derived representations may be utilized.

A full spectrum of purposes for which measure points may be utilized for making cyber determinations regarding or utilizing sensor observations or sensor observation subjects may include at least one member selected from a group consisting of: (a) providing points from which to measure, where measurements may include temperatures, pressures, colors, odors, chemical compositions, distance between two measure points, degrees of angles between two or more lines between measure points that cross or meet, locations on sensor observation-derived representations or any other measurements selected from the full spectrum of measurements that utilize measure points that locate aspects, characteristics or features of analytically rich indicators from sensor observation-derived representations, (b) locating, on image sensor-derived representations, the corners—boundaries of scalable configurable grids, (c) locating, on image sensor-derived representations, differences between adjoining pixels that may indicate edges or other selected aspects, characteristics or features of analytically rich indicators from sensor observation-derived representations, (d) identifying from sensor observation-derived representations where aspects, characteristics or features from analytically rich indicators that would be located by measure points from standard target sets of measure points were not observed, (e) locating faces on image sensor-derived representations, or (f) any other purpose selected from the group consisting of a full spectrum of purposes for which measure points that locate aspects, characteristics or features of analytically rich indicators from sensor observation-derived representations may be utilized In some circumstances, determining what aspects, characteristics or features from a sensor observation-derived representation may be reliably used to make one or more selected cyber determinations regarding or utilizing sensor observations or sensor observation subjects may be quite difficult.

Determinations regarding which observed analytically rich indicators from sensor observation-derived representations will be located through utilization of measure points may be made by at least one member selected from the group consisting of: (a) people, (b) processes, (c) procedures, or (d) any combinations thereof.

When the cyber process disclosed herein has been configured to be utilized to make some selected cyber determinations, it may be quite easy for a person to determine where one or more measure points may be located on sensor observation-derived representations. As an example, the disclosed cyber process may be configured to use a video-formatted image sensor that is permanently affixed to a vehicle in a position where it can be used to constantly provide observations of the face of the driver of the vehicle. The disclosed cyber process may be configured to utilize two measure points that were selected by a person for making a determination (from a previous example) that the driver of a vehicle is falling asleep or has fallen asleep.

The person chooses to utilize only two measure points, one located at the bottom center of the sensor observation-derived representation of the upper eyelid of the left eye and the other located at the top center of the sensor observation-derived representation of the lower eyelid of the same eye. Measurements of the distance, in numbers of horizontal lines on the image's pixel grid, if any, may be utilized for making an intermediate cyber determination that the person who is the driver of the vehicle has his or her eyes closed. The duration of time the person's eyes are closed may also be used to determine that the person is falling asleep or has fallen asleep. And, should the head of the person who is the driver of the vehicle drop in a certain manner in conjunction with the eyes being closed, then the horizontal line locations of both measure points on the image's pixel grid will drop down a certain distance over a certain period of time. The person's selection of the two specific measure points enabled the operations of the disclosed cyber process to utilize a simple, concise and efficient combination of sensor-observed behaviors that were compressed to a few standard informational representations or measurements which may accurately or reliably be utilized to make the selected cyber determination that the driver of the vehicle is falling asleep.

Guidelines for determining where to locate measure points on analytically rich indicators from sensor observation-derived representations may include at least one member selected from the group consisting of determining: (a) which aspects, characteristics or features of static sensor observation-derived representations may be utilized for accurately or reliably making selected cyber determinations, (b) where sensor observable changes occur over time that may be utilized for accurately or reliably making selected cyber determinations, (c) if aspects, characteristics or features that may be located by measure points will be present in similar sensor observations or sensor observation subjects, (d) if all or most similar sensor observations or sensor observation subjects may be relied upon to have the same observable aspects, characteristics or features upon which to locate measure points, (e) if the standard processes or standard procedures of the disclosed cyber process may utilize selected aspects, characteristics or features of analytically rich indicators from sensor observation-derived representations for accurately or reliably making selected cyber determinations regarding or utilizing sensor observations or sensor observation subjects, or (f) any other determination that would result in locating measure points on sensor observation-derived representations in locations where informational representations or measurements regarding or utilizing the located measure points may be utilized for simply, efficiently or concisely making selected cyber determinations regarding or utilizing sensor observations or sensor observation subjects.

The disclosed cyber process, when making selected cyber determinations regarding the same sensor observation or the same sensor observation subject, may be configured to exclusively utilize the same standard processes or the same standard procedures throughout all operations. This may be done so that the processing of first series observations will result in informational representations or measurements that are the same as the informational representations or measurements that will be derived from the processing of the second series observation of the exact same observation or observation subject. Use of the exact same standard processes or procedures for the processing of first series observations and second series observations of the exact same observation or the exact same observation subject is a key and fundamental part of making cyber determinations utilizing or regarding sensor observations or sensor observation subjects at the highest possible percentages of accuracy. Further, use of the exact same processes or procedures for the processing of the exact same observations or observation subjects is a key and fundamental part of accurately or reliably making selected cyber determinations utilizing or regarding sensor observations or sensor observation subjects at the highest levels of simplicity, efficiency and reliability that may be attained.

The disclosed cyber process may be configured to determine where to specifically locate measure points where they may be utilized to locate sensor-observable changes or tells that reliably occur singly or in a series of sensor observation-derived representations. The disclosed cyber process may be configured to utilize selected tells for accurately or reliably making selected cyber determinations regarding or utilizing sensor observations or sensor observation subjects.

The disclosed cyber process may be configured to determine which aspects, characteristics or features of analytically rich indicators from sensor observation-derived representations to locate with measure points.

The disclosed cyber process may be configured to utilize measure points at only the aspects, characteristics or features of analytically rich indicators from sensor observation-derived representations that are needed for making selected cyber determinations. The disclosed cyber process may also be configured to utilize measure points at every observed aspect, characteristic or feature of one or more observed analytically rich indicators from sensor observation-derived representations.

Sensor-observable changes or tells that may be located on sensor observation-derived representations by measure points may include changes in at least one member selected from the group consisting of: (a) measured distances between measure points, (b) measured angles where two or more lines between measure points either cross or meet each other, (c) measured levels of observed red, green or blue light at one or more pixels at the locations of or in structured areas that are located through utilization of measure points, (d) measured pressure at or in the areas of measure points, (e) measured temperatures at or in the areas of measure points, or (f) any other measurable or reportable aspects, characteristics or features of analytically rich indicators from sensor observation-derived representations that may be used as tells, in which the same measurable sensor-observable changes are consistently or reliably found with the occurrence of specific events, actions, circumstances or combinations thereof.

The disclosed cyber process may be configured to where processes or procedures that are utilized for making cyber determinations regarding where to locate measure points on sensor observation-derived representations may be at least one member selected from a group consisting of a full spectrum of processes or procedures that may be utilized for making cyber determinations regarding where to locate measure points on sensor observation-derived representations.

Measure points that locate selected analytically rich indicators from sensor observation-derived representations may be utilized by the disclosed cyber process for making measurements, whereby the measurements may be stored or utilized by the disclosed cyber process for making selected cyber determinations in real time or at any time thereafter. Examples of measurements regarding observed analytically rich indicators from sensor observation-derived representations that may be utilized for making selected cyber determinations may include at least one member selected from the group consisting of: (a) measured odors, (b) measured chemical compositions, (c) measured temperatures, (d) measured pressures, (e) measured colors, (f) measured levels of colors or spectrums of light, (g) measured brightness, (h) measured distances between measure points, (i) measured angles where lines between measure points cross or meet, (j) measured speeds, (k) camera angles, (l) poses, (m) observation circumstances, (n) lighting circumstances, (o) measured time, or (p) any other measurements regarding or utilizing measure points that locate analytically rich indicators from sensor observation-derived representations that may be utilized for making selected cyber determinations regarding or utilizing sensor observations or sensor observation subjects.

The disclosed cyber process may be configured to perform structured or unstructured analysis of sensor observation-derived representations for locating from raw sensor observation data sets or otherwise, tells that may accurately or reliably be utilized for making or aiding in the making selected cyber determinations regarding or utilizing sensor observations or sensor observation subjects.

After determining which aspects, characteristics or features of analytically rich indicators from sensor observation-derived representations will be located by measure points, the disclosed cyber process may be configured to group measure points into standard target sets of measure points. Grouping of measure points into standard target sets may be done be for at least one purpose selected from the group consisting of: (a) the purpose of including, in standard target sets, only the selected measure points that it may be possible to locate on specific sensor observation-derived representation that were observed under specific observation circumstances; for example, a different standard set of measure points would be utilized for a full frontal image sensor observation-derived representation of a person's face than would be utilized for a side view of the same person's face and head, (b) the purpose of including, in standard target sets, only the measure points that are needed for making selected cyber determinations; for example, a standard target set of measure points that locates centers of pupils and inside or outside corners of sensor observation-derived representations of a person's eyes would be used to make selected cyber determinations regarding the direction, in terms of up, down, left, or right, that a person is looking, (c) the purpose of determining exactly what a person is looking at, (d) the purpose of locating specific occurrences such as selected increments of time that have elapsed, or selected increments of change in temperature that have occurred since the most recent measure point was located on a sensor observation-derived representation of a temperature sensor observation, (e) the purpose of determining which standard target sets of measure points to use to process a second series observation that will be compared to a specific first series observation wherein, in an effort to achieve a highest possible percentage of cyber determination accuracy, the exact same standard target set of measure points that are utilized for a first series observations will be utilized for comparable second series observations, and (f) for other purposes selected from the group consisting of a full spectrum of purposes for which measure points may be selected to be included in standard target sets of measure points.

Determinations regarding which measure points will be included in each different standard target set of measure points may be made by at least one member selected from the group consisting of: (a) people, (b) processes, (c) procedures, and (d) any combinations thereof.

The measure points that are included in standard target sets of measure points may be determined based upon which measure points are needed to make selected cyber determinations.

Standard target sets of measure points may be utilized for adding the structure that is needed to process comparable first series sensor observations and second series sensor observations in the exact same way at any time.

Any number of different standard target sets of measure points may be configured to be utilized for making selected cyber determinations regarding different varying observations of selected aspects, characteristics or features of varying sensor observations or varying sensor observation subjects that occur under different varying observation circumstances.

There are a multitude of sensor observable aspects, characteristics or features of sensor observations or sensor observation subjects. Each standard target set of measure points may be utilized to locate selected specific aspects, characteristics or features of sensor observation-derived representations of the sensor observation or sensor observation subjects.

The points on analytically rich indicators from sensor observation-derived representations upon which selected measure points are located may differ substantially under different observation circumstances. It may therefore be necessary for the disclosed cyber process to be configured to utilize more than one standard target set of measure points for the same observation but under differing observation circumstances, with each different standard target set of measure points being configured to enable the making of cyber determinations regarding or utilizing sensor observations or sensor observation subjects under different observation circumstances.

The disclosed cyber process may be configured to utilize standard processes or standard procedures for determining the measure points that will be utilized as a part of each different target set of measure points.

The disclosed cyber process may be configured to attain the highest possible percentages of accuracy for making cyber determinations regarding or utilizing sensor observations or sensor observation subjects. It does so, in part, by providing and utilizing standard processes or standard procedures that determine which measure points to include in a standard target set of measure points that is utilized for specific observation subjects under specific observation circumstances using specific types of sensors, all for making selected cyber determinations regarding or utilizing sensor observations or sensor observation subjects.

The disclosed cyber process may be configured to utilize standard processes or procedures for determining which measure points will be included in each standard target set of measure points. Each standard target set of measure points is structured to be utilized for making at least one cyber determination under one or more observation circumstances. Consistent use of standard processes or standard procedures for determining which measure points to include in standard target sets of measure points and which specific target sets of measure points to utilize for each specific sensor observation is an indispensable part of attaining the highest possible percentages of accuracy when making cyber determinations regarding or utilizing sensor observations or sensor observation subjects.

The disclosed cyber process may be configured to locate every measure point from a standard target set that can possibly be located. Informational representations or measurements regarding or utilizing aspects, characteristics or features of analytically rich indicators that are located through utilization of measure points may be stored or utilized for making cyber determinations in real time or at any time thereafter. Informational representations regarding measure points from standard target sets that the disclosed cyber process was unable to locate may also be stored or utilized for making selected cyber determinations regarding or utilizing sensor observations or sensor observation subjects.

The cyber process disclosed herein may be configured to achieve its operational goal, at least in part, by utilizing as few target sets of measure points as can possibly be used to accurately or reliably make selected cyber determinations regarding or utilizing sensor observations or sensor observation subjects. The disclosed cyber process may be further configured where each standard target set includes as few measure points as could possibly be used to accurately or reliably make selected cyber determinations regarding or utilizing the sensor observation or sensor observation subjects.

Examples of where measure points from standard target sets of measure points may be located on image-sensor-derived representations of what may be observed from an exterior forward-facing video-formatted image sensor on a vehicle may include at least one member selected from the group consisting of: (a) perimeters of buildings, (b) perimeters of benches, (c) perimeters of other vehicles, (d) perimeters of people, (e) perimeters of trees or foliage, (f) edges of sidewalks, (g) edges of curbs, (h) edges of pavement, or (i) any other aspects, characteristics or features of subjects of the observations that are being made by the exterior forward-facing vehicle-mounted image sensor.

Examples of where measure points from standard target sets of measure points may be located on temperature sensor observation-derived representations regarding a person or any other subject of a temperature sensor observation may include at least one member selected from the group consisting of: (a) the temperature when the sensor observation begins, (b) the point in time when the sensor observation begins, (c) any point in time when there is a one degree change from the measured temperature at the time when the most recent measure point was located on the temperature sensor observation-derived representation, (d) the temperature when the sensor observation ends, (e) the point in time when the sensor observation ends, and (f) any other points on a temperature sensor observation-derived representation where measure points may be accurately or reliably located and used for making cyber determinations regarding or utilizing sensor observations or sensor observation subjects.

The disclosed cyber process may be configured to accurately or reliably locate selected measure points on selected analytically rich indicators from sensor observation-derived representations under a full spectrum of possible sensor observation circumstances.

Attaining highest possible percentages of accuracy when utilizing the disclosed cyber process for making selected cyber determinations requires the use of standard processes or standard procedures for accurately locating each selected measure point on every sensor observation-derived representation. Therefore, the disclosed cyber process may be configured to utilize standard processes or standard procedures that accurately or reliably locate each measure point that may be located from selected standard target sets of measure points on selected aspects, characteristics or features of first series observations or first series observation subjects. The disclosed cyber process may also be configured to locate the exact same standard target set of measure points utilizing the exact same standard processes or standard procedures to process comparable selected aspects, characteristics or features of second series observations or second series observation subjects that have yet-to-be-identified aspects, characteristics or features.

The disclosed cyber process may be configured to utilize standard processes or standard procedures for locating measure points on sensor observation-derived representations. Consistent use of the same standard processes or standard procedures for locating measure points on the first series observations must be used to locate the measure points on second series observations if the highest possible percentages of cyber determination accuracy are to be attained when making cyber determinations regarding or utilizing sensor observations or sensor observation subjects.

The disclosed cyber process may utilize at least one process or procedure for locating measure points on sensor observation-derived representations selected from a group consisting of a full spectrum of processes or procedures that may be utilized for accurately or reliably locating measure points on sensor observation-derived representations.

The disclosed cyber process may be configured to utilize determinations regarding where to locate measure points on sensor observation-derived representations that are made by at least one member selected from the group consisting of: (a) people, (b) processes, (c) procedures, or (d) any combination thereof.

Processes or procedures that may be utilized for accurately or reliably locating measure points on sensor observation-derived representations may be selected from the group consisting of a full spectrum of processes or procedures that may be utilized for accurately or reliably locating selected measure points on selected aspects, characteristics or features of analytically rich indicators from sensor observation-derived representations.

There are many processes or procedures that may be utilized to determine the exact points where selected measure points will be located on sensor observation-derived representations. Determining exactly where to locate selected measure points on sensor observation-derived representation may be made utilizing any process, procedure or people, selected from the group consisting of a full spectrum of processes, procedures, people or combinations thereof, that may be utilized for making determinations regarding where selected measure points will be located on sensor observation-derived representations.

The disclosed cyber process may be configured to utilize a best performing blend of as simple, efficient, or concise as possible processes or procedures for the operations of locating selected measure points on sensor observation-derived representations as simply and efficiently as is possible.

The disclosed cyber process may be configured to achieve any attainable percentage of cyber determination accuracy that may be desired or required for cyber determinations that are made regarding or utilizing sensor observations. The percentage of accuracy of each measure point's placement on sensor observation-derived representations directly affects the percentage of accuracy of cyber determinations that are made utilizing informational representations or measurements regarding or utilizing the located measure points. Many factors come into play when locating measure points on sensor observation-derived representations and the disclosed cyber process may be configured to include standard processes or procedures that may be utilized for accurately or reliably locating selected measure points on sensor observation-derived representations at any attainable selected level of accuracy including 100% accuracy.

Using a video-formatted image sensor observation of a person's face as an example, the disclosed cyber process may be configured to compare the patterns of the measurements of levels of red, green or blue light that were observed at each of the pixels from within a scalable configurable grid. In this example, a scalable configurable grid is used to define a structured area of a sensor observation-derived representation where it is anticipated that the measure point that locates the tip of the person's nose will accurately or reliably be located. Patterns of measurements of observed colors of light may be analyzed utilizing a full spectrum of processes or procedures that are configured to be utilized for predicting or determining where a measure point will be located on the pixel grid of the next sequential video image.

The disclosed cyber process may be configured to accurately or reliably locate selected measure points at precisely the same location during every image processing operation that is made of the person's face.

Measure points may be utilized to accurately or reliably locate structured areas that have been selected to be used for pixel by pixel analysis or comparisons. Measure points may also be utilized to locate the boundaries of scalable configurable grids that may be utilized by the disclosed cyber process.

The cyber process disclosed herein may be configured to utilize pixel by pixel matching of patterns of measurements of observed levels of colored light for determining the points on sequential sensor observation-derived representations, to locate selected measure points. Further, the disclosed cyber process may be configured to use any processes or procedures for accurately locating measure points on any sensor observation-derived representations selected from the group consisting of a full spectrum of processes or procedures that utilize analysis of patterns of measurements of observed levels of colored light for accurately or reliably locating selected measure points on subsequent sequential sensor observation-derived representations.

The disclosed cyber process may be configured to locate measure points on sensor observation-derived representations of people or the sensor observation or other sensor observation subjects at the highest possible percentages of accuracy through use of processes or procedures that are trained, taught or configured to be utilized to accurately or reliably locate selected measure points on sensor observation-derived representations of only one specific person or one specific observation or one specific observation subject. The personalized processes or procedures may be trained, taught or configured for brief use, where the processes or procedures learn, are taught, or are configured to accurately or reliably locate selected measure points on sensor observation-derived representations of only one specific person, observation or observation subject for a brief period, such as in the example of the use of facial recognition for access to a gym locker. The disclosed cyber process may also be configured to accurately locate selected measure points on sensor observation-derived representations of only one specific person, observation or observation subject over extended periods of time; for example, a person may use a properly configured version of the disclosed cyber process that has been configured to utilize personalized processes or procedure for locating selected measure points on sensor observation-derived representations of one specific person that are utilized for making facial image-based cyber determinations regarding the identity of the one specific person.

The disclosed cyber process may be configured to learn, train or configure its processes or procedures for precisely locating standard target sets of facial measure points under any observation circumstances at the precise pixels where they should be located. This in turn enables the disclosed cyber process to be configured to make facial image-based cyber determinations regarding the identity of the one specific person, or any other possible cyber determination regarding or utilizing the person or the person's face at the highest possible percentages of accuracy or reliability.

The disclosed cyber process may be configured to utilize three general categories of processes or procedures for accurately or reliably locating measure points on sensor observation-derived representations of sensor observation subjects:

(a) personalized processes or procedures that are configured to accurately or reliably locate measure points on sensor observation-derived representations of only one specific person or observation subject, (b) group processes or procedures that are configured to accurately or reliably locate measure points on sensor observation-derived representations of specific groups of observation subjects, or (c) generalized processes or procedures that are configured to accurately or reliably locate measure points on sensor observation-derived representations of any selected observation subjects.

When locating measure points on video-formatted image sensor observations of a person's face (or any other observation subject), two basic operations are used. First, the disclosed cyber process may be configured to utilize processes or procedures to initially determine the exact locations to place selected measure points on one or more video image sensor observation-derived representations. Then the disclosed cyber process may be configured to utilize tracking processes or procedures for determining the exact points on the next sequential video sensor observation-derived representation where selected measure points should be located. Should tracking processes be interrupted, then the exact location of measure points may be determined by performing the processes or procedures that initially determine the exact locations to place selected measure points.

The cyber process disclosed herein may also be configured to constantly or intermittently utilize the initial processes or procedures for determining the exact points on each sensor observation-derived representation upon which selected measure points are to be located.

The disclosed cyber process may be configured to utilize summation table analytics (as later disclosed) in conjunction with scalable configurable grids as a part of the processes or procedures that may be utilized for making cyber determinations regarding where to locate selected measure points on subsequent sequential video formatted image sensor observation-derived representations. Further, the cyber process disclosed herein may be configured to utilize smudge analytics (as later disclosed), darkest pixel analytics, lightest pixel analytics or any other method of analytics selected from a group consisting of a full spectrum of methods of analytics for predicting or pre-cognitively determining where to locate selected measure points on subsequent sequential video formatted image sensor observation-derived representations.

The cyber process disclosed herein may be configured to utilize measure points for locating selected incremental changes that occur during sensor observations of aspects, characteristics or features of the physical world such as temperature, pressure, odor, voltage, amperage, sound, viscosity, speed, velocity, moisture, chemical composition, nutritional value or any other sensor observable aspect, characteristic or feature of the physical world. Use of measure points only at specific selected sensor-observed incremental changes in sensor observation-derived measurements may result in a best performing blend of an as simple, concise and efficient as possible means of recording or utilizing informational representations or measurements regarding or utilizing selected analytically rich indicators from sensor observation-derived representations that are accurately or reliably located through utilization of measure points.

Standardization is one key to the disclosed cyber process's ability to achieve best performance and highest possible percentages of cyber determination accuracy. The higher the degree of standardization, the higher the percentage of accuracy that can be achieved when locating selected measure points on sensor observation-derived representations. And the higher the percentage of accuracy that can be attained when locating selected measure points on sensor observation-derived representations, the higher percentage of accuracy that may be attained when making selected cyber determinations regarding or utilizing sensor observations or sensor observation subjects.

The disclosed cyber process may be configured to utilize measure points to locate selected analytically rich indicators from sensor observation-derived representations. The disclosed cyber process may be further configured to assign appropriate standard informational representations or measurements regarding or utilizing the analytically rich indicators that were located through utilization of the measure points. The appropriately assigned informational representations regarding or utilizing selected analytically rich indicators from the sensor observations or sensor observation subjects may then be stored or utilized for making selected cyber determinations regarding or utilizing the sensor observations or sensor observation subjects in real time or at any time thereafter.

Utilization of measure points that locate aspects, characteristics or features of analytically rich indicators from sensor observation-derived representations is not the only process or procedure that the disclosed cyber process may utilize for making selected cyber determinations regarding or utilizing sensor observations or sensor observation subjects. The disclosed cyber process may be configured to make cyber determinations that utilize any process or any procedure or any combination thereof selected from the full spectrum of processes or procedures that may be utilized for at least one member selected from the group consisting of: (a) making cyber determinations regarding or utilizing sensor observations, (b) making measurements regarding or utilizing measure points, (c) assigning appropriate standard informational representations to aspects, characteristics or features of observed analytically rich indicators from sensor observation-derived representations, or (d) utilizing concise informational representations or measurements that were derived from the processing of raw sensor observation data sets for making selected cyber determinations regarding or utilizing sensor observations or sensor observation subjects.

The disclosed cyber process may be configured to utilize measure points from sensor observation-derived representations for making cyber determinations regarding or utilizing sensor observations. Standard informational representations or measurements may be appropriately assigned to aspects, characteristics or features of at least one member selected from the group consisting of: (a) measure points, (b) sensor observations, or (c) subjects of sensor observations.

The disclosed cyber process may be configured to utilize selected measure points on sensor observation-derived representations of a person for providing accurate and reliable cyber determinations regarding the identity of any one specific person.

The cyber process disclosed herein may be configured to attain the highest percentage of accuracy that is possible when assigning appropriate informational representations or measurements regarding or utilizing observed aspects, characteristics or features of analytically rich indicators from sensor observation-derived representations. Doing so is a necessary part of attaining the highest possible percentages of accuracy when making cyber determinations regarding or utilizing sensor observations or sensor observation subjects.

The disclosed cyber process may be configured to utilize appropriately assigned informational representations or measurements regarding observed analytically rich indicators in one or more ways selected from the group consisting of a full spectrum of useful ways that appropriately assigned informational representations or measurements regarding or utilizing analytically rich indicators from sensor observation-derived representations may be utilized.

The disclosed cyber process may be configured to appropriately assign informational representations or measurements regarding or utilizing observed analytically rich indicators that are located through utilization of measure points. The appropriately assigned informational representations or measurements may be any appropriately assigned informational representations or measurements selected from a group consisting of a full spectrum of informational representations or measurements that may be appropriately assigned to selected aspects, characteristics or features of analytically rich indicators from sensor observation-derived representations.

The appropriate informational representations or measurements to assign to observed aspects, characteristics or features of analytically rich indicators from sensor observation-derived representations may be determined by at least one member selected from the group consisting of: (a) people, (b) processes, (c) procedures, or (d) any combination thereof.

The disclosed cyber process may be configured to utilize selected raw or unaltered data from original sensor observations as parts of analytically rich sparse data sets that may be utilized for making selected cyber determinations. The disclosed cyber process may be configured to utilize as informational representations or measurements, all or part of the raw data from sensor observations. The disclosed cyber process may be configured to utilize raw data from sensor observations without the need to make alterations or interpretations so the raw sensor observation data is in a form where the raw sensor observation data may be reliably used for making selected cyber determinations. Use of selected informational representations or measurements that are in their unaltered raw sensor observation data form is a necessary part of making cyber determinations regarding or utilizing sensor observations or sensor observation subjects at the highest possible percentage of accuracy. Examples of informational representations or measurements from video-formatted image sensor observations that are in their raw unprocessed or uninterpreted forms include: (a) a pixel's horizontal line location on an image's pixel grid, (b) a pixel's vertical line location on an image's pixel grid, (c) measurements of the levels of red light that are observed at a specific pixel, (d) measurements of the levels of green light that are observed at a specific pixel, and (e) measurements of the levels of blue light that are observed at a specific pixel.

The horizontal line location or vertical line location of selected pixels on an image's pixel grid or the measurements of observed levels of red, green or blue light represent the only raw unaltered data that may be derived from each pixel of an image sensor observation. Use of these five different informational representations or measurements regarding any one specific pixel from an image sensor observation-derived image are a necessary part of making selected cyber determinations regarding or utilizing sensor observations or subjects of sensor observations at the highest possible percentages of cyber determination accuracy.

The cyber process disclosed herein may be configured to utilize data sets comprised of raw image sensor observation data regarding selected pixels from images. Utilization of data sets that are comprised of raw data from selected pixels from image sensor observations may be the least complex, most concise and most efficient means of choosing, deriving, processing or structuring the data sets that are needed for making selected cyber determinations. Further, data sets comprised of raw image sensor observation data regarding selected pixels from image sensor observations may be universally used by any processes or procedures that are configured to utilize raw image sensor observation data for accurately or reliably making selected cyber determinations regarding or utilizing sensor observations or sensor observation subjects.

The disclosed cyber process may be configured to locate selected measure points on analytically rich indicators from sensor observation-derived representations of sensor observation of time, temperatures, pressures, odors, levels of observed light of any colors or spectra, locations or any other sensor observable aspect, characteristic or feature of sensor observations or sensor observation subjects where selected analytically rich indicators from sensor observation-derived representations may be located through utilization of measure points and then be utilized for accurately or reliably making selected cyber determinations regarding or utilizing sensor observations or sensor observation subjects.

The cyber process disclosed herein may be configured to provide or utilize the best performing usage of informational representations or measurements regarding or utilizing analytically rich indicators from sensor observation-derived representations of sensor observations or sensor observation subjects.

The disclosed cyber process may be configured to assign appropriate informational representations or measurements regarding or utilizing each measure point or combinations thereof. Informational representations or measurements that are assigned to specific measure points or informational representations or measurements that are assigned to standard target sets of measure points may include at least one member selected from the group consisting of: (a) standard informational representations or measurements identifying the specific sensor observation with which the informational representations or measurements were associated, (b) standard informational representations or measurements identifying the specific time specific sensor observations or parts thereof occurred, (c) standard informational representations or measurements regarding the sensors that were utilized for the observations, (d) standard informational representations or measurements regarding the circumstances of sensor observations, (e) standard informational representations or measurements with which standard target sets of measure points each specific utilized measure point is associated, (f) standard informational representations or measurements regarding the processes or procedure that were utilized to locate measure points on selected aspects, characteristics or features of analytically rich indicators from sensor observation-derived representations, (g) standard informational representations or measurements regarding selected aspects, characteristics or features of selected analytically rich indicators from sensor observation-derived representations, (h) standard informational representations or measurements regarding measured location or measured orientation of measure points in regard to other measure points that locate other observable aspects, characteristics or features of the same sensor observation-derived representation, (i) standard informational representations or measurements regarding or utilizing observed analytically rich indicators that are at the exact locations of measure points or are in structured areas that are located through utilization of measure points, (j) standard informational representations or measurements regarding measured location or measured orientation of measure points that are: (i) at the exact locations of, and (ii)

are in the areas of, selected aspects, characteristics or features of sensor observation-derived representations, (k) standard informational representations or measurements regarding measured location or measured orientation of measure points on sensor observation-derived representation, or in regard to other aspects, characteristics or features of sensor observation-derived representations that are located by measure points, and (l) any other informational representations or measurements regarding or utilizing any other aspects, characteristics or features of measure points, sensor observations, sensor observation subjects or sensor observation-derived representations.

The cyber process disclosed herein may be configured to appropriately assign standard informational representations or measurements regarding or utilizing aspects, characteristics or features of analytically rich indicators from sensor observation-derived representations that have been selected from the group consisting of a full spectrum of standard informational representations or measurements that may be appropriately assigned to aspects, characteristics or features of analytically rich indicators from sensor observation-derived representations.

Examples of types of informational representations or measurements that may be appropriately assigned regarding aspects, characteristics or features that are located on sensor observation-derived representations through utilization of measure points may include informational representations or measurements regarding or utilizing at least one member selected from the group consisting of: (a) time, (b) utilized sensors, (c) locations of sensor when the observations were captured, (d) locations of selected measure points on sensor observation-derived representations of the sensor observations or sensor observation subjects, (e) appropriate informational representations or measurements regarding selected aspects, characteristics or features from first series observations, (f) appropriate informational representations or measurements regarding selected aspects, characteristics or features from second series observations, or (g) any other informational representations or measurements regarding or utilizing any other aspects, characteristics or features of sensor observations, sensor observation subjects or sensor observation-derived representations.

Assigned appropriate standard informational representations or measurements regarding at least one member selected from the group consisting of: (a) measure points, (b) sensor observation-derived representations regarding aspects, characteristics or features of analytically rich indicators, (c) sensor observation-derived representations regarding sensor observations, (d) name, or (e) sensor observation-derived representations regarding sensor observation subjects may be stored or utilized for making selected cyber determinations in real time or at any time thereafter.

The disclosed cyber process may be configured to appropriately assign or utilize standard informational representations or measurements that will be best performing blends of as simple, concise and efficient as they could possibly be to assign, process, store, search or use.

The disclosed cyber process may be configured to assign appropriate standard informational representations or measurements regarding any selected sensor observable aspect, characteristic or feature of a person's health selected from a full spectrum of sensor observable aspects of a person's health that may be assigned appropriate informational representations or measurements that may be stored or utilized for making cyber determinations in real time or at any time thereafter.

The cyber process disclosed herein may be configured to make selected cyber determinations regarding or utilizing analytically rich sparse data sets that are comprised of informational representations or measurements that are appropriately assigned to aspects, characteristics or features of analytically rich indicators from sensor observation-derived representations. Use of measure points to locate selected observed aspects, characteristics or features of analytically rich indicators from sensor observation-derived representations is an indispensable part of providing as simple, concise and efficient as possible best performing processes or procedures for making selected cyber determinations regarding or utilizing sensor observations or sensor observation subjects.

Data from the disclosed analytically rich sparse data sets may be derived from the points where selected measure points are located on sensor observation derived representations or data may be derived from within structured areas that are located on sensor observation-derived representations through the utilization of measure points.

The cyber process disclosed herein may be configured to where all processing of sensor observations has been completed when the data that is needed for making selected cyber determinations has been included in the analytically rich sparse data sets. At this point in the operations of the disclosed cyber process, original raw data sets from the sensor observations may be deleted or saved for further processing.

The disclosed cyber process may be configured to utilize analytically rich sparse data sets for making selected cyber determinations regarding or utilizing sensor observations or sensor observation subjects. No other operations of the disclosed cyber process better demonstrate the best performance that can be achieved through use of the disclosed cyber process's operational goal of being a beset performing blend of as simple, as concise and as efficient as possible than the disclosed cyber process's utilization of analytically rich sparse data sets.

Examples of best performance that may be achieved through the disclosed cyber process's utilization of analytically rich sparse data sets include: (a) analytically rich sparse data sets are derived from raw sensor observation data sets; therefore, data from analytically rich sparse data sets may always be relied upon to represent exactly what was sensor observed. Further, informational representations or measures from raw sensor data sets that are selected to be a part of analytically rich sparse data sets are the exact same informational representations or measurements as are included in the original raw sensor observation data sets. Therefore, they may always be relied upon to accurately represent the aspects, characteristics or features that were sensor observed, (b) data from analytically rich sparse data sets provides the best possible performance that may be attained when making cyber determinations based upon comparisons of data sets from second series observations with comparable data sets from first series observations because selected raw sensor observation data may always be relied upon to accurately represent what was observed by sensors, (c) should differences exist between informational representations or measurements from second series observations that are being matched or compared with first series observations that are comparable but do not match exactly, the disclosed cyber process may be configured through its utilization of sparse data sets, to provide the highest possible percentages of simplicity, efficiency, accuracy or reliability by being configured to utilize standard adjusting factors for compensating for differences between second series observations and first series observations, (d) should differences exist between observation circumstances from second series observations that are being matched or compared with first series observations that are comparable but do not match exactly, utilization of sparse data sets enables the use of standard adjusting factors to accurately or reliably compensate for differences between the observation circumstances of second series observations and the observation circumstances of first series observations, (e) analytically rich sparse data sets may be configured to be easy to store, (f) analytically rich sparse data sets may be configured to be interoperably used, (g) analytically rich sparse data sets may be configured to be as concise as possible, (h) analytically rich sparse data sets may be configured to be as efficient as possible, and (i) analytically rich sparse data sets may be configured to be as simple as possible.

Measure points that locate selected analytically rich indicators from sensor observation-derived representations provide the structure that is needed to repeatedly locate specific selected aspect, characteristic or feature from sensor observation-derived representations. Repeatedly locating selected aspects, characteristics or features in at the exact same points on different sensor observation-derived representations and utilizing analytically rich sparse data sets that are derived from raw sensor observation data regarding the analytically rich indicators that have been located on sensor observation-derived representations through utilization of measure points are indispensable operations of making selected cyber determinations regarding or utilizing sensor observations or sensor observation subjects at highest possible percentages of cyber determination accuracy.

Measure points give us the ability to isolate exactly what occurs at one specific selected reliably locatable point or area from a sensor observation-derived representation. Analysis from selected points or areas may be about specific occurrences that happen at any one point in time or occurrences that happen over any periods of time. This is the most extreme method of analyzing many types of sensor observations.

The disclosed cyber process's utilization of analytically rich sparse data sets enables the disclosed process to utilize standard adjusting factors to accurately or reliably compensate for differences between second series observation records and the comparable first series observation records with which they are being matched or compared. The disclosed cyber process may be configured to utilize standard adjusting factors to compensate for differences in: (a) lighting, (b) pose, (c) location, (d) movement of image sensor, (e) movement of subjects of sensor observations, (f) part of the observation subject that was observed, (g) wind conditions, (h) sensors that are used for the observations, or (i) any other aspects, characteristics or features of analytically rich indicators from sensor observations or sensor observation subjects that require adjustments to be made as a part of accurately or reliably making selected cyber determinations.

The cyber process disclosed herein may be configured to include analytically rich sparse data sets. The analytically rich sparse data sets may be configured to be utilized for making selected cyber determinations regarding or utilizing sensor observations or sensor observation subjects. The analytically rich sparse data sets may be configured to include raw data sets or derived data sets, wherein data from raw data sets or data from derived data sets may be processed or utilized for making cyber determinations regarding or utilizing sensor observations or sensor observation subjects.

The cyber process disclosed herein may be configured to have completed its processing of raw sensor observation data sets after selected prime raw sets or selected derived data sets have been completed. At this point in the operations of the disclosed cyber process, raw data sets from the original sensor observations may be discarded. The disclosed cyber process may also be configured to save sensor observations in their raw data form so that the raw sensor observation data sets may be utilized at any time for making selected cyber determinations regarding or utilizing the sensor observations or sensor observation subjects.

The disclosed cyber process may be configured to store informational representations or measurements that have been derived from the exact points from sensor observation-derived representations where measure points are located, or those from structured areas from sensor observation-derived representations that are located through utilization of measure points. The disclosed cyber process may be configured to process selected areas of sensor observation-derived representations in such a manner as to result in data sets of appropriately assigned informational representations or measurements that may be used to reliably make or aid in the making of at least one selected cyber determination regarding or utilizing sensor observations or sensor observation subjects.

Selected raw sensor observation data from points or areas from sensor observation-derived representations may be included in the prime data sets that are a part of the analytically rich sparse data sets. The disclosed cyber process may be configured to provide only the informational representations or measurements that are needed for accurately or reliably making cyber determinations that have been previously selected.

The disclosed cyber process may be configured to record data regarding: (a) measure points, (b) sensors, (c) sensor observations, (d) locations of measure points, or (e) aspects, characteristics or features at the points where or in structured areas where measure points are located on the sensor observation-derived representations.

The disclosed cyber process may utilize any processes or procedures selected from the full spectrum of processes and procedures that may be utilized for storing, accessing or appropriately assigning or utilizing informational representations or measurements regarding or utilizing sensor observation or sensor observation subjects.

The disclosed cyber process may be configured to store sensor observation-derived informational representations or measurements in memory for utilization when making selected cyber determinations in real time or at any time thereafter.

One possible result of employing a strategy of using a best performing blend of as simple, concise and efficient as possible when utilizing sensor observations for making cyber determinations is that a best performing blend may result in utilization of analytically rich sparse data sets of informational representations or measurements regarding or utilizing measure points, sensor observations or sensor observation subjects. Compressing very large raw sensor observation data sets into analytically rich sparse data sets of informational representations or measurements yields many advantages. These advantages include at least one member selected from the group consisting of: (a) concise data sets; in the case of a 1080p video-formatted image sensor observations of a person's face that is used in conjunction with a standard target set of 17 facial measure points, the original raw data set representing the image sensor observation of the face would be compressed from the raw image sensor observation data set of informational representations or measurements regarding more than two-million pixels for each sequential video image down to the same raw standard informational representations or measurements from the raw image sensor observation data for only the 17 pixels where the selected measure points are located on the image sensor-derived representation, (b) reduction in the amount of data that is stored or used for making selected cyber determinations regarding or utilizing sensor observations or sensor observation subjects, (c) reduction in the amount of data that must be processed when making selected cyber determinations regarding or utilizing sensor observations or sensor observation subjects; it is much more efficient to store, process or use informational representations or measurements regarding only the 17 selected measure points than it is to store, process or use more than two million informational representations or measurements that make up the raw sensor observation data set for each of the 30 video-formatted images that are captured and processed per second, (d) certain cyber determinations that cannot be made by prior art, but can be made by the disclosed cyber process through its utilization of data from analytically rich sparse data sets, and (e) any other advantages that compressing very large raw sensor observation data sets into analytically rich sparse data sets of selected informational representations or measurements regarding or utilizing sensor observations or sensor observation subjects may enable.

The disclosed cyber process may be configured to structure storage or access to data sets regarding sensor observations or sensor observation subjects so that storage of or access to data sets operations of the disclosed cyber process are configured to be a best performing blend of as simple, concise and efficient as possible in all aspects of the disclosed cyber process's data storage or data access operations.

The disclosed cyber process may be configured to create or utilize analytically rich sparse data sets for all areas of its operation where data sets are needed or utilized. Further, the disclosed cyber process may be configured to create or utilize the smallest possible number and the smallest possible size of analytically rich sparse data sets for utilization in making selected cyber determinations regarding or utilizing sensor observations or sensor observation subjects.

The disclosed cyber process may be configured to utilize the least possible numbers of intermediate cyber determinations for making subsequent dependent intermediate cyber determinations or selected final cyber determinations.

The disclosed cyber process may be configured to store data or data sets utilizing any processes or procedures selected from the full spectrum of processes or procedures that may be utilized for storing data or data sets that may be utilized for making selected cyber determinations regarding or utilizing sensor observations or sensor observation subjects.

The disclosed cyber process may be configured to store data or data sets utilizing any media selected from the full spectrum of types or variations of storage media that may be utilized for storing data or data sets that may be utilized for making selected cyber determinations regarding or utilizing sensor observations or sensor observation subjects.

The disclosed cyber process may be configured to store data or data sets for any duration of time selected from the full spectrum of durations of time that data or data sets that are utilized for making selected cyber determinations regarding or utilizing sensor observations or sensor observation subjects may be stored.

The disclosed cyber process may be configured to standardize all aspects of all storage operations or storage resources the process utilizes. Use of standardization of all aspects of all storage operations or storage resources that are utilized by the disclosed cyber process enables the disclosed cyber process to operate at the highest possible percentages of accuracy, reliability, efficiency or simplicity.

The disclosed cyber process may be configured to include as a part of its sparse data sets informational representations or measurements regarding what may be observed in an area that is bounded by three or more measure points that locate selected aspects, characteristics or features from sensor observation-derived representations.

The disclosed cyber process may be configured to utilize data sets that are best performing blends of as simple, concise and efficient as they could possibly be in all areas of use or operations. In the case of temperature sensor observations, data sets may consist of the time and the temperature that was noted each time there is a two degree change in temperature since the the previous measure point was located on the temperature sensor observation-derived representation. Using this procedure eliminates the need for having data in the set that has no value for making selected cyber determinations. When using sensor observations that result in very large data sets, such as 1080p video-formatted image sensor observations, the raw data sets will be extremely large. The raw data sets will include the horizontal line locations (X) and vertical line locations (Y) on the image's pixel grid, as well as measurements of the observed levels of red, green or blue light at each of the over two million pixels that makes up each of the 1080p formatted video images—video-formatted images that are captured at rate of 30 images each second.

The disclosed analytically rich sparse data sets may be configured so that raw data from raw sensor observation data sets may be utilized as informational representations or measurements regarding the sensor observation or sensor observation subjects, that may be utilized for making selected cyber determinations regarding or utilizing sensor observations or sensor observation subjects. As an example, using the X and Y line locations for two selected measure points, it will make it possible to determine the precise measured distances between the two measure points. As a further example, measurements may be made regarding the angle where two or more lines between measure points cross or meet. Measured distances or measured angles may be utilized for making selected cyber determinations regarding or utilizing a multitude of aspects, characteristics or features of sensor observations or sensor observation subjects.

Changes in measurements from sequential video-formatted image to sequential video-formatted image may also be utilized for making a multitude of cyber determinations regarding or utilizing sensor observations or subjects of sensor observations. One example would be movement of a person's face in relationship to the fixed camera from a vehicle or a stationary computer. Changes in angles and distances may be utilized for making cyber determinations by utilizing image sensor video-formatted facial observations, to determine precisely where a person is looking. To do so only requires the use of four measure points that locate selected analytically rich indicators from image sensor-derived representations of a person's face. One measure point is selected to be located at a sensor observation-derived representation of the center of one pupil and one measure point is selected to be located on a sensor observation-derived representation of the inner corner of the same eye. These two measure points may be utilized to determine if the person is looking to the left, straight ahead or the right, and also if the person is looking up, straight outward, or looking down. A third measure point is selected to be located on a sensor observation-derived representation of the tip of the person's nose, and the fourth on a sensor observation-derived representation of the center of his or her left or right jawline. Distances between the third and fourth measure points may be utilized to determine if the head is turned to the left, not turned at all, or turned to the right. Further, the difference between the horizontal line location where the measure point at the tip of the nose is located and horizontal line location where the measure point at the center of the jawline is located may be utilized to determine if the head is tilted up, not tilted at all or is tilted down. Utilizing data regarding only the four pixels that were located by the four selected measure points from over two million pixels of the original raw video-formatted image sensor observation, it will be possible to determine precisely where a person is looking.

Cyber processes make determinations regarding or utilizing sensor observations or sensor observation subjects by comparing sensor observation-derived representations of yet-to-be-determined aspects, characteristics or features of sensor observations or sensor observation subjects with sensor observation-derived representations of known aspects, characteristics or features of sensor observations or sensor observation subjects.

Through the utilization of cyber resources and predetermined criteria, the disclosed cyber process may be configured to make cyber determinations by comparing one specific yet-to-be-identified subject of a sensor observation with at least one specific comparable known subject of a sensor observation. The disclosed cyber process may be configured to utilize predetermined criteria for every aspect of the operations of the cyber process where criteria are used.

The disclosed cyber process's analytically rich sparse data sets may be utilized for making selected cyber determinations that are: (a) as concise, simple or efficient as possible, (b) accurate or reliable, or (c) configured to be interoperably utilized by any process, system or device.

The cyber process disclosed herein may be configured to make selected cyber determinations utilizing observations that were made by multiple sensors at one or more points in time, or over one or more periods in time. Further, the disclosed cyber process may be configured to make selected cyber determinations utilizing observations from multiple types of sensors.

Extreme analysis may be utilized for analyzing or comparing the most minute sensor-observable changes or nuances that occur. Extreme analysis is any analysis or comparisons that utilize in any way informational representations or measurements from the raw data sets of analytically rich sparse data sets. In the case of video-formatted image sensor observations, raw data sets would include X and Y line locations, and measured levels of red, green or blue light that were observed at each selected pixel.

The disclosed cyber process may be configured so that most, if not all, intermediate cyber determinations and some, if not all, final cyber determinations may be made utilizing only raw data from analytically rich sparse data sets.

Prior art processes or procedures are complex and processing-intensive because prior art does not utilize extreme analysis for making selected cyber determinations regarding or utilizing sensor observations or sensor observation subjects.

Extreme analysis may be utilized for analyzing the most minute aspects, characteristics or features of sensor observations or sensor observation subjects.

The disclosed cyber process may be configured to match or compare informational representations or measurements regarding yet-to-be-determined aspects, characteristics, or features of second series observations or second series observation subjects with comparable informational representations or measurements regarding known aspects, characteristics or features of first series observations or first series observation subjects. The disclosed cyber process may also be configured to make adjustments for differences between second series and first series observation circumstances. The adjustments may be selected from a group consisting of a full spectrum of adjustments that may be utilized when comparing second series observation data with first series observation data that is not an exact match, with the comparison being performed to make selected cyber determinations regarding or utilizing sensor observations or sensor observation subjects.

Use of sparse data sets simplifies many operations of the disclosed cyber process and enhances the accuracy of adjustments that are made for differences between the subjects or circumstances of second series observations and the subjects or circumstances of the first series observations with which they are to be compared.

Use of analytically rich sparse data sets simplifies and enhances the accuracy of tracking processes or procedures and the cyber predictions or cyber determinations that may be made regarding future changes that may occur to any aspect, characteristic or feature from sensor observation-derived representations. Predictions or determinations that may be made by tracking processes or procedures include the positions where selected measure points will be selected in subsequent sequential video-formatted images.

The cyber process disclosed herein may be configured to utilize adjusting factors for compensating for differences between second series observation circumstances or subjects and first series observation circumstances or subjects. Observation circumstances that may differ between second series observations and first series observations may include: (a) lighting, (b) poses, (c) the portions of observation subjects that were observed, (d) image sensors utilized, (e) image sensors' settings, (f) image sensors' locations, (g) image sensors' orientations, (h) wind speeds, (i) wind directions, (j) temperatures, (k) movements of subjects, (l) movements of image sensors, and (m) any other observation circumstance that would require the use of adjusting factors for accurately or reliably comparing or matching second series observation records with first series observation records.

Data sets that are derived from utilization of measure points may be used to identify where observable changes consistently or reliably occur concurrent with a specific event, action or other selected occurrence. Using health-related sensor observations of a person as an example, the disclosed cyber process may be configured to utilize odor sensor observations of a person for determining an observed presence of a specific odor that reliably indicates an abnormal cancer cell count exists in the person's blood stream. Use of a test for the presence of this specific odor, a reliable indicator of the existence of an abnormal cancer cell count at its earliest sensor-detectable onset, may be the key to ending cancer-related illness.

The disclosed cyber process may be configured to provide cyber determinations regarding or utilizing sensor observations or sensor observation subjects such as those provided by prior art machine learning processes. However, the disclosed cyber process may do so by utilizing measure points or analytically rich sparse data sets that are configured to accurately or reliably make selected cyber determinations regarding or utilizing sensor observations or sensor observation subjects under a broad range of observation circumstances. The disclosed cyber process may be configured to make cyber determinations that have not been made or cannot be made by prior art machine learning processes. Further, the disclosed cyber process may be configured to make structured or unstructured machine learning cyber determinations more concisely, efficiently and accurately than cyber determinations that are made using prior art machine learning processes or procedures.

The disclosed cyber process may be configured to utilize machine learning processes, procedures or resources that are best performing blends of as concise, efficient and simple as they may possibly be. The disclosed cyber process may be configured so that cyber determinations that are made utilizing the disclosed cyber process, including cyber determinations that were made as a part of structured or unstructured machine learning processes or procedures, are made at the highest attainable percentages of accuracy or reliability.

The disclosed cyber process may be configured to utilize at least one process or procedure selected from a group consisting of a full spectrum of structured or unstructured machine learning processes or procedures that may be utilized for making selected cyber determinations regarding or utilizing sensor observations or sensor observation subjects.

Prior art cyber processes use unstructured machine learning processes or procedures for providing computer vision or other cyber services. It is not possible to diagnose or repair prior art machine learning processes or procedures should any part of their operations fail to perform as intended. The inability to diagnose or repair prior art machine learning processes or procedures may be an insignificant problem when processing data files to facilitate marketing insight. However, it may be very dangerous to use prior art unstructured machine learning processes or procedures that cannot be diagnosed or repaired for mission critical purposes such as determining identity for access control, delivering accurate or reliable health care information, or many of the autonomous operations of vehicles or other autonomous devices.

Processes or procedures of the disclosed cyber process may be configured to be utilized as processes or procedures of unstructured machine learning processes.

The disclosed cyber process may be configured to make cyber determinations regarding or utilizing sensor observations or sensor observation subjects such as those that are made by prior art machine learning processes or procedures. However, the disclosed cyber process may be configured or operate differently than prior art processes or procedures, yet make the same type of cyber determinations that are made by prior art machine learning processes or procedures. The disclosed cyber process does so by utilizing structured machine learning processes or procedures that utilize measure points that locate selected aspects, characteristics or features of analytically rich indicators from sensor observation-derived representations, or analytically rich sparse data sets that are configured or structured for consistently making accurate reliable machine learning cyber determinations under same, similar or differing sensor observation circumstances. Additionally, the structured machine learning processes or procedures of the disclosed cyber process may be configured so that they may easily be diagnosed or repaired should they fail to perform as intended.

The cyber process disclosed herein may be configured to be utilized for providing structured machine learning cyber determinations regarding or utilizing sensor observations or sensor observation subjects, wherein measure points that locate selected aspects, characteristics or features of analytically rich indicators from sensor observation-derived representations may be utilized to establish or maintain the structure that is needed for consistently locating, with measure points, the exact same aspects, characteristics or features from sensor observation-derived representations. The processes or procedures of the disclosed cyber process may also be configured to be utilized by structured or unstructured machine learning processes for: (a) grouping measure points into standard target sets of measure points, (b) locating selected measure points on sensor observation-derived representations, (c) assigning appropriate informational representations or measurements to selected aspects, characteristics or features of sensor observation-derived representations that are located through utilization of measure points, (d) storing informational representations or measurements in the structured environments of analytically rich sparse data sets, and (e) utilizing informational representations or measurements from analytically rich sparse data sets for making structured or unstructured machine learning cyber determinations regarding or utilizing sensor observations or sensor observation subjects.

The disclosed cyber process may be configured to utilize at least one standard target set of measure points that may be configured to provide structure for the disclosed cyber process's structured machine learning processes or procedures that are utilized for making cyber determinations regarding or utilizing sensor observations or sensor observation subjects. The disclosed cyber process's structured machine learning processes or procedures may be configured to utilize measure points to accurately and consistently locate, identify or report on aspects, characteristics or features regarding sensor observation-derived representations that may from time to time need to be updated with the most recent informational representations or measurements regarding at least one member selected from a group consisting of: (a) measure points, (b) selected aspects, characteristics or features of sensor observations, (c) selected aspects, characteristics or features of sensor observation subjects, and (d) any other aspects, characteristics or features that may be utilized as a part of the operations of structured or unstructured machine learning processes or procedures that are utilized for making cyber determinations regarding or utilizing sensor observations or sensor observation subjects.

Consistent use of measure points as a part of the disclosed cyber process's structured machine learning processes or procedures enables the attainment of the highest possible percentages of accuracy when making machine learning cyber determinations regarding or utilizing sensor observations or sensor observation subjects.

The disclosed cyber process may be configured to attain the highest possible percentages of simplicity, efficiency, accuracy or reliability through its use of selected measure points, standard target sets of measure points, analytically rich sparse data sets or its standard utilization of the standard processes or standard procedures that are needed for making selected structured or unstructured cyber machine learning cyber determinations regarding or utilizing sensor observations or sensor observation subjects at the highest possible percentages of simplicity, efficiency, accuracy or reliability.

The cyber process disclosed herein may be configured to utilize structured machine learning processes or procedures for making selected cyber determinations regarding or utilizing sensor observations or sensor observation subjects. These structured machine learning processes or procedures may utilize some or all of a standard target set of seventeen facial measure points to intermittently or continuously make cyber determinations that occur to one or more aspects, characteristics or features from the sensor observation-derived representations of the person's face.

Measure points may be utilized to locate aspects, characteristics or features of analytically rich indicators from sensor observation-derived representations. In some instances, informational representations or measurements regarding aspects, characteristics or features from sensor observations or sensor observation-derived representations may need to be intermittently or constantly updated with the most recent informational representations or measurements regarding at least one member selected from the group consisting of: (a) measure points, (b) aspects, characteristics or features of sensor observations, (c) aspects, characteristics or features of sensor observation subjects, (d) aspects, characteristics or features from sensor observation-derived representations, or (e) any other aspects, characteristics or features of the structured machine learning processes or procedures that are utilized for making cyber determinations regarding or utilizing sensor observations or sensor observation subjects at the highest possible percentages of simplicity, efficiency, accuracy or reliability.

The disclosed cyber process may be configured to utilize measure points that locate selected aspects, characteristics or features from sensor observation-derived representations, or analytically rich sparse data sets for providing elements of the structure that is needed for machine learning processes to make structured learning-based cyber determinations regarding or utilizing sensor observations or sensor observation subjects at the highest attainable percentages of simplicity, efficiency, accuracy or reliability.

The disclosed cyber process may be configured to make machine learning cyber determinations regarding or utilizing sensor observations or sensor observation subjects that utilize the: (a) standard target sets of measure points, (b) standard informational representations, (c) standard measurements, (d) standard definitions, (e) standard processes, and (f) standard procedures that are needed for making machine learning cyber determinations regarding or utilizing sensor observations or sensor observation subjects at the highest attainable percentages of accuracy.

The disclosed cyber process may be configured to utilize at least one member selected from the group consisting of: (a) unstructured machine learning processes, (b) unstructured machine learning procedures, (c) structured machine learning processes, (d) structured machine learning procedures, (e) standard unstructured machine learning processes, (f) standard unstructured machine learning procedures, (g) standard structured machine learning processes, (h) standard structured machine learning procedures, or (i) any combination thereof for making selected cyber determinations regarding or utilizing sensor observations or sensor observation subjects.

As an example of structured machine learning processes that are utilized for making cyber determinations regarding or utilizing sensor observations or sensor observation subjects, a person who has very light-colored eyebrows uses an eyebrow pencil several times a day to give his or her eyebrows a more distinct visual presence. There are slight changes to the locations of the eyebrows each time the eyebrow pencil is reapplied. The disclosed cyber process may be configured to make appropriate changes to selected data from the data sets regarding the locations of the measure points that locate the perimeters of the person's eyebrows every time the person reapplies the eyebrow pencil.

The disclosed cyber process may be configured to provide or utilize regularly- or irregularly-shaped scalable configurable grids.

Scalable configurable grids may be utilized for making initial cyber determinations, intermediate cyber determinations or final cyber determinations.

The disclosed cyber process may be configured to be utilized for making cyber determinations regarding or utilizing sensor observations or sensor observation subjects, cyber determinations that are not possible to make utilizing only the raw sensor data from the specific points where measure points are located on image sensor observation-derived representations. When it is not possible to make selected cyber determinations utilizing measure points that each locate only one specific point from a sensor observation-derived representation, the disclosed cyber process may be configured to analyze pixels from within the structures of scalable configurable grids for making selected cyber determinations regarding or utilizing raw image sensor observation data from the group of pixels that are located inside of a scalable configurable grid.

Scalable configurable grids may be square, rectangular, round, oval or irregularly-shaped groups of pixels from image sensor observations.

Measure points are utilized to locate, on analytically rich indicators from image sensor observation derived representations, the boundaries of scalable configurable grids, in which structured analysis may be conducted on all or part of the pixels from within the boundaries of the scalable configurable grids.

Two or more pixels may be present within each scalable configurable grid.

Scalable configurable grids are configured to where they utilize, scale to or conform with an image's XY pixel grid.

The disclosed cyber process may be configured to utilize an image's XY pixel grid to locate measure points that form the boundaries of scalable configurable grids. For example, using an image's XY pixel grid, measure points may be located at 10 or 50 or 100-pixel distances apart on both the X and the Y axes of the pixel grid to form groups of pixels in scaled-down versions of the original pixel grid.

Each scalable configurable grid-defined group of pixels may be a subject of analysis. Analysis results may be used in whole or in part for making selected cyber determinations regarding or utilizing sensor observations or sensor observation subjects. Combinations of adjoining scalable configurable grid-defined groups of pixels may be combined in which the combined groups may be utilized as subjects of analysis.

The disclosed cyber process may be configured to utilize measure points to locate corners or other features of scalable configurable grids.

Scalable configurable grids may be configured to provide the high levels of structure that are needed for repeated analysis of the exact same specific selected areas of pixels from each comparable image sensor observation-derived representation that is selected to be utilized for making cyber determinations regarding or utilizing sensor observations or sensor observation subjects.

The disclosed cyber process may be configured to provide the highest possible percentages of simplicity, efficiency, accuracy or reliability for making selected cyber determinations regarding or utilizing sensor observations or sensor observation subjects. It may do so, in part, by only performing analysis of the specific pixels or areas of pixels from image sensor observation-derived representations that are needed for making selected cyber determinations regarding or utilizing sensor observations or sensor observation subjects. Therefore, the disclosed cyber process will not perform analysis of the areas of pixels from image sensor observation-derived representations that will not be used for making selected cyber determinations regarding or utilizing sensor observations or sensor observation subjects.

Additionally, analysis of what was observed from selected groups of pixels from within scalable configurable grids may be performed at increasing or decreasing levels of detail as needed for making selected cyber determinations regarding or utilizing sensor observations or sensor observation subjects. Similarities or differences between informational representations or measurements from differently scaled scalable configurable grids may be utilized for making initial cyber determinations, intermediate cyber determinations or final cyber determinations.

The disclosed cyber process may be configured to utilize the processes or procedures of a scalable configurable grid for making cyber determinations regarding or utilizing sensor observations or sensor observation subjects; the disclosed cyber process may do so while using only a small fraction of the processing resources that are needed for prior art to make the same final cyber determination utilizing processing of every pixel from every image that was captured.

The cyber process disclosed herein may be configured to utilize scalable configurable grids in conjunction with the operations of summation table analysis or smudge analysis for predicting or determining where selected measure points will be located on the next sequential images from video-formatted image sensor observations.

The disclosed cyber process may be configured to utilize any processes or procedures selected from the full spectrum of processes or procedures that may be utilized for making cyber determinations regarding or utilizing groups of pixels that are located within the structures of scalable configurable grids.

Summation table processes or procedures may be utilized in conjunction with scalable configurable grids for predicting or making cyber determinations of where measure points will be located on subsequent sequential images from video-formatted image sensor observations. Summation tables may be configured to utilize scalable configurable grids as the structure that accurately or reliably locates the exact same group of pixels on every comparable image sensor observation-derived representation. Summation table analysis may be configured to utilize the totals or sums from each column or each row of measurements of red, green or blue light that were observed at each pixel from within a scalable configurable grid.

In addition, the sum of the combination of all red measurements, all green measurements and all blue measurements from each column or each row may be determined. Any combination of sums from columns or rows from within scalable configurable grids may be utilized for any purpose selected from the full spectrum of purposes for which sums of measurements of observed levels of colors of light from columns or rows of pixels from within scalable configurable grids may be utilized. One such utilization would be to locate a person's face from a video-formatted image.

The disclosed cyber process may be configured to utilize summation table analysis to determine how many pixels or parts thereof selected measure points have moved up, down, left or right from their locations on a previous sequential video image's pixel grid, and then locate selected measure points accordingly. Further, these same cyber determinations may be made utilizing pixels from the scalable configurable grid that are the darkest or brightest or have the highest red values, lowest red values, highest green values, lowest green values, highest blue values or the lowest blue values.

The cyber process disclosed herein may be configured to include the utilization of summation tables for locating selected aspects, characteristics or features from sensor observation-derived representations. Prior art facial recognition processes dedicate the largest percentage of their processing time to finding faces. In the use case scenario of one specific person being a known user of a computer, smartphone, tablet or vehicle, the disclosed cyber process may be configured to compare scalable configurable grid analysis of sensor observation-derived representations of the person's face from second series observations with first series observation records from scalable configurable grid analysis of face of the person who the one specific yet-to-be-identified person claims to be. Utilization of the summation table analysis processes or procedures of the disclosed cyber process for finding faces from video-formatted image sensor observation-derived representations is far more computationally efficient than utilizing prior art processes or procedures for completing the same task.

Utilizing informational representations or measurements from summation table analysis of any one specific known person for finding that specific person's face from video-formatted image sensor observation-derived representations should result in increases of operational efficiencies that may be hundreds or millions of times more operationally efficient than prior art. Further, the same summation table-derived data sets may be used as initial cyber tests of any one specific person's identity when he or she is trying to gain properly identified access to cyber resources of any type. Should summation table analysis-derived informational representations or measurements regarding a specific yet-to-be-identified person's face not be a match to informational representations or measurements from first series observation data sets for the person whose identity has been claimed, then it may be determined that the observed yet-to-be-identified person is not the one specific person they claim to be.

Scalable configurable grids may be any possible size, the smallest being scalable grids that are comprised of four measure points that form the structure to locate or select only two adjoining pixels and the largest being four measure points that locate the four outside corners of square or rectangular pixel grids from raw image sensor observations.

The disclosed cyber process may be configured to utilize scalable configurable grids for providing reproducible structure for standard analysis of selected areas of sensor observation-derived representations—structured areas that may be accurately or reliably located on comparable sensor observation-derived representations through the utilization of selected measure points.

The disclosed cyber processes may be configured to include the processes or procedures that are needed for performing smudge analysis for image sensor observations. In such analysis, smudges are variations in color values of pixels in the areas of measure points with the variations in color values being different color values than those that would have been observed when the sensors and subjects did not move and were not under changing lighting circumstances or other changing observation circumstances.

The cyber process disclosed herein may be configured to accurately or reliably indicate that the center of a measure point will be located one-half of a pixel up and one-third of a pixel to the right on the next sequential image. This may be determined through the disclosed cyber process's utilization of processes or procedures for performing smudge analysis. The cyber process disclosed herein may be configured to perform analysis of patterns of smudges from image sensor observation-derived representations in which analysis of measured levels of observed red, green or blue light, or any other colors of light selected from the full spectrum of colors of light, may be utilized to accurately or reliably: (a) indicate the presence of remnants that remain from light of any color of light selected from the full spectrum of sensor-observable colors of light that were present prior to the exact point in time that the specific image was captured, and (b) utilize light from adjoining areas that reflected or refracted upon specific pixels or specific areas of pixels. The disclosed cyber process may be configured to utilize analysis of observed presences of remnants of light or reflected or refracted light for making cyber determinations selected from a group consisting of a full spectrum of cyber determinations that utilize smudge analysis of remnants of light or reflected or refracted light for making cyber determinations regarding or utilizing sensor observations or sensor observation subjects.

When viewing a piece of black electric tape on a piece of white paper, one might assume that the color of the pixels at the precise edge where the black tape and the white paper adjoin would be black on the tape side and white on the paper side. However, the sensor that is used to capture the image of the tape and paper does not observe it that way. The light from the black and the light from the white impose on each other where black and white adjoin. The imposing of colored light from one pixel to another is due, at least in part, to the reflective or refractive properties of light. The highest level of the imposition is where the black and the white meet as evidenced by the fact that the color values for the black are lightest and the color values for the white are darkest at the point where the two colors meet. If the image sensor and the paper and tape are stationary while the image is being captured, then a clean graduation of, or mixing of color where black meets white should exist. Should there be no movement of the sensor or the tape and paper, then analysis of the place where tape and paper adjoin will result in the same graduated change of color from each sequential image. Should there be irregular movement of the image sensor or the tape and paper when the sensor observation is captured, then a smudge or smudges in the graduated colors or an elongation of graduated colors may be reliably observed. The disclosed smudge or smudges may be used for any purpose selected from a group consisting of a full spectrum of purposes for which smudges from sensor observation-derived representations may be utilized. One such utilization would be for predicting the directions and distances of movement that will occur from video image to sequential video image.

Another utilization of smudge analysis would be to determine the distance and the direction of movement of the locations of selected measure points from video image to sequential video image when movement of locations of measure points may be less than one pixel in distance. The amount that any of the colors of light from one pixel infringes on the colors of light from adjoining pixels may, through the operations of smudge analysis, be utilized by the disclosed cyber process for making precise determinations regarding the distance or direction of movement, in fractions of a pixel, of selected measure points from video image to sequential video image.

Additionally, should there be rapid eye movement patterns that are reliable indicators of a specific person's imminent intent to do harm, these patterns may not difficult to recognize using highly sophisticated five hundred image per second video sensor observations. However, through use of smudge analysis, thirty frames per second video-formatted image sensor observations that are commonly available using video-formatted image sensors from cell phones, computers, tablets, or other devices may also be utilized for making cyber determinations that a specific person has rapid eye movement patterns that reliably indicate the specific person has an imminent intent to do harm. Should a rapid eye movement pattern exist that is a reliable indicator that one specific person has an imminent intent to do harm, then the processes or procedures of the disclosed cyber process could be anonymously utilized to determine if any person walking down the street, entering a school, house of worship, airport, sporting event or driving a vehicle has an imminent intent to do harm. The person that intends to enter a school, house of worship, transportation hub or who is just walking down the street that has an imminent intent to do harm may be identified as having that intent through use the disclosed cyber process's processes or procedures for performing smudge analysis of the area of one measure point that locates the point on an image sensor observation-derived representation where the iris and white of a person's eye adjoin.

Should sensor observation circumstances not allow the use of smudge analysis, the disclosed cyber process may be configured to use summation tables or any other process or procedure, utilizing any sensor, selected from the full spectrum of processes or procedures or sensors that may be utilized for making cyber determinations that any one specific person has an imminent intent to do harm.

The informational representations or measurements regarding the seventeen pixels make up a sparse data set regarding the original sensor observation. To utilize such sparse sets of informational representations or measurements for making cyber determinations at the highest possible percentages of accuracy, it is necessary to perform every step in the operations of making selected cyber determinations regarding or utilizing the seventeen selected pixels at the highest percentage of accuracy possible. Therefore, it is necessary to use the standard processes or standard procedures for every operation of the disclosed cyber process's operations for all operations of processing sensor observations, assigning appropriate informational representations or measurements, data storage or making selected cyber determinations regarding or utilizing sensor observations or sensor observation subjects. Also included are standard processes or standard procedures that are utilized to ensure that the exact same processes or procedures that were utilized for creating first series observation records will be utilized for making second series observation record that the first series observation records will be matched or compared with.

Within the full spectrum of cyber determinations regarding or utilizing a person as a subject of sensor observations are a multitude of cyber determinations regarding a person including determinations regarding a person's: (a) identity, (b) hair color, (c) moles, (d) wrinkles in skin, (e) freckles, (f) geometry at joints, (g) scars, (h) height, (i) eye color, (j) pulse rate, (k) blood pressure, (l) blood sugar level, or (m)

any other aspect, characteristic or feature of a person that may be sensor observed and assigned appropriate concise informational representations or measurements that may be utilized for making selected cyber determinations regarding or utilizing sensor observations or sensor observation subjects.

In the past, I have worked on my designs and inventions utilizing the operational goal of having best performing blends of as simple, concise and efficient as could possibly be in all areas of operation of the devices, processes or procedures I am working with. Most recently, I have applied my operational goal to the task of utilizing sensor observations for making cyber determinations regarding or utilizing sensor observations or sensor observation subjects. In doing so, I found that the use of analytically rich sparse data sets regarding sensor observations or sensor observation subjects is a very powerful tool for accurately or reliably making a full spectrum of cyber determinations regarding or utilizing aspects, characteristics or features of sensor observation, or sensor observation subjects.

As an example, the disclosed cyber process may be configured to use a 1080p video-formatted image sensor observation of a person's face. The disclosed cyber process may then be configured to accurately or reliably locate seventeen measure points at selected points on each sequential video-formatted image sensor observation-derived representation of the person's face.

Selected locations for the seventeen measure points include the corners of the eyes, the centers of the pupils, the bottoms of the upper eyelids, the tops of the lower eyelids, the tip of the nose, the center of the left and right jawlines, the corners of the mouth, the top center of the upper lip and the bottom center of the lower lip.

Raw sensor observation data sets typically include X and Y line locations on the image's pixel grid as well as the measurements of observed levels of red, green or blue light at each pixel from the sensor-observed image. The disclosed cyber process will utilize X and Y locations on the pixel grid as well as measurements of the observed levels of red, green or blue light at each of the seventeen pixels where selected measure points are located. Using a data set regarding only the seventeen pixels where measure points are located instead of the data set of over two million pixels from the original raw sensor observation data set, it will be possible to make a multitude of accurate or reliable cyber determinations regarding a person who is a subject of a sensor observation.

Using a standard target set of seventeen measure points for a frontal observation of a person's face, the original standard informational representations regarding each of the two-million pixels from each 1080p video-formatted image may be reduced to the same standard informational representations per pixel, but only seventeen of the over two-million original pixels will be utilized and appropriate standard informational representations or measurement may be assigned regarding the seventeen pixels where the selected measure points are located.

Examples of where measure points from standard target sets of measure points may be located on image sensor-derived representations of a person may include at least one sensor observation-derived representation of at least one member selected from the group consisting of: (a) corners of eyes, (b) centers of pupils, (c) bottom centers of upper eyelids, (d) top centers of lower eyelids, (e) tip of nose, (f) corners of mouth, (g) top center of upper lip, (h) bottom center of lower lip, (i) along jaw lines, (j) tip of chin, (k) perimeters of eyebrows, (l) axis points at joints, (m) tips of fingers, (n) pulse points, (o) moles, (p) scars, (q) marks, (r) tattoos, (s) sensor-observable irregularities of skin, (t) sweat glands, or (u) any other aspects, characteristics or features of image sensor observation-derived representations of a person where measure points may be located. Informational representations or measurements regarding the sensor observation or sensor observation subject may be included as a part of analytically rich sparse data sets that may be utilized for making selected cyber determinations regarding or utilizing the sensor observation or sensor observation subjects.

Information regarding the selected seventeen pixels from each of the sequential video images may be used to make cyber determinations regarding the identity of any one specific person through utilization of visual characteristics, physical characteristics, behavioral characteristics or physiological characteristics of the one specific person who is a subject of a video-formatted image sensor observation. Informational representations or measurements regarding or utilizing the seventeen pixels may also be used for making cyber determinations selected from the full spectrum of cyber determinations that may be made regarding or utilizing sensor observations or sensor observation subjects.

Far more cyber determinations may be made about a specific person through utilization of the raw sensor observation data from the seventeen pixels that are located by measure points than may be made by prior art processes or procedures that utilize data sets that include the same raw sensor observation data regarding the over two million pixels from each sequential image of a 1080p video-formatted image sensor observation.

The disclosed cyber process may be configured to utilize standard target sets of measure points that are configured to be utilized for image sensor observations of a person that are made under varying observation circumstances—varying observation circumstances which may include at least one member selected from the group consisting of: (a) standard target sets of measure points that are configured to be utilized for frontal observations of a person's face, (b) standard target sets of measure points that are configured to be utilized for observations of the left side of a person's face, (c) standard target sets of measure points that are configured to be utilized for observations of the right side of a person's face, (d) standard target sets of measure points that are comprised of one single measure point that locates the tip of the index finger on a person's left hand, (e) standard target sets of measure points that locate all observable finger tips on a person's left hand, (f) standard target sets of measure points that locate all observable finger tips on a person's right hand, (g) standard target sets of measure points that locate axis points at observable joints of a person's left hand, (h) standard target sets of measure points that locate axis points at observable joints of a person's right hand, and (i) any other standard target sets of measure points that may be located on image sensor observation-derived representations of a person selected from a full spectrum of locations where measure points or target sets of measure points may be located on sensor observation-derived representations of a person for the purpose of making selected cyber determinations regarding or utilizing sensor observations or sensor observation subjects.

In the future, use of informational representations or measurements regarding sensor observations of any one specific person will prove to be an indispensable part of providing the best possible health care. It is my hope that further research will yield an overabundance of instances where sensor-observable changes will occur regarding one or more aspects, characteristics or features of a person that may be utilized for making useful cyber determinations regarding the state of any aspect, characteristic or feature of a person's health so that selected cyber determinations may be accurately or reliably made regarding any sensor-observable aspects characteristics, or features of a person's state of health.

The cyber process disclosed herein may be configured to make any cyber determinations selected from a full spectrum of cyber determinations that may be made regarding or utilizing people as subjects of sensor observations. Further, the disclosed cyber process may also be configured to make any cyber determinations selected from a full spectrum of cyber determinations that may be made regarding or utilizing any observation subjects that are not people that have been selected from a full spectrum of observation subjects that are not people.

Among the many benefits that may be derived from utilization of the disclosed cyber processes is the disclosed cyber process' ability to make cyber determinations regarding the probability that exists of one specific yet-to-be-identified person being the same person as one specific known person. At one end of a full spectrum of sensor observation-derived cyber determinations of identity of one specific person is a cyber determination that one specific yet-to-be-identified person absolutely is the same person as one specific known person, and at the other end of the spectrum is a cyber determination that the one specific yet-to-be-identified person absolutely is not the same person as one specific known person.

The disclosed cyber process may be configured to utilize a unique combination of visual, physiological, behavioral, physical, or biological aspects, characteristics or features of one specific person that has been observed over one or more periods of time, or at one or more points for accurately or reliably making selected cyber determinations regarding the identity of the one specific person.

The cyber process disclosed herein may be configured to be utilized for determining the exact identity of any one specific yet-to-be-identified person, even when there is no knowledge of who the one specific yet-to-be-identified person might be other than the informational representations or measurements that were derived from second series observations of the yet-to-be-identified person. As an example, the cyber determining process may determine who one specific yet-to-be-identified person is by utilizing selected criteria that call for the most unique combination of a person's observed aspects, characteristics or features to be utilized for searching available databases of first series observation records of known people. This search may continue until either one specific known person is found who is absolutely the same person as the one specific yet-to-be-identified person, or there are no further first series observation records of comparable known people from which to search and compare.

Should a determination regarding identity, based upon conclusions from comparing all available useful informational representations or measurements regarding one specific yet-to-be-identified person not result in making a selected determination of identity, then the disclosed cyber process may be configured to utilize at least one additional sensor observation of the one specific yet-to-be-identified person to add to the second series observation records of the one specific yet-to-be-identified person.

The disclosed cyber process may be configured to select a portion of a first series observation record of one specific known person to be repeated by the one specific yet-to-be-identified person for inclusion in the one specific yet-to-be-identified person's second series The cyber process disclosed herein may be configured to utilize standard processes or standard procedures for making selected cyber determinations regarding or utilizing sensor observations that were made utilizing a windshield-mounted forward-facing 1080p video-formatted image sensor. The disclosed cyber process may be configured to utilize changes that occur in informational representations or measurements that are derived from the processing of sequential video images for making selected cyber determinations regarding or utilizing: (a) the exact location of the vehicle, (b) the speed that the vehicle is traveling, (c) the vehicle's location on the roadway in regard to lanes, traffic, other vehicles, pedestrians, curbs or markings, (d) where to stop, and (e) any other cyber determinations that may be selected to be made using a windshield-mounted forward-facing 1080p video-formatted image sensor observation.

Should there be aspects, characteristics or features from sensor observation-derived representations of observations of people that are reliable indicators that any one specific person has an imminent intent to do harm, then the disclosed cyber process may be configured to utilize measure points at, or in the areas of specific analytically rich indicators that may be utilized for making this specific selected cyber determination.

As an example of how the disclosed cyber process may be configured to make cyber determinations that a specific person has an imminent intent to do harm: should it be found to be common to all people that specific image sensor-observable rapid eye movement patterns are accurate or reliable indicators that a person has an imminent intent to do harm, then image sensors that capture 1080p video-formatted images of a person's eyes at a rate of 500 sequential images each second may be utilized, in conjunction with a properly configured version of the disclosed cyber process and other necessary resources, to locate a standard target set of only two measure points. One measure point locates the center of a representation of a pupil on a sensor observation-derived representation, and a second measure point locates a representation of the inside or outside corner of the same eye on the same sensor observation-derived representation. The disclosed cyber process may be configured to utilize the horizontal and vertical line locations on an image's pixel grid of the two measure points for accurately or reliably making cyber determinations regarding whether one specific person has rapid eye movement patterns that reliably indicate the person has an imminent intent to do harm.

Further, the rapid eye movement patterns that may be possible to utilize to indicate a specific person has an imminent intent to do harm may also be detected using the same 1080p video, but video that is captured at the rate of only 30 sequential images per second. The disclosed cyber process may be configured to utilize smudge analysis in conjunction with scalable configurable grids wherein one measure point locates a point where the white of an eye and the iris meet on a sensor observation-derived representation. The disclosed cyber process may perform analysis of patterns of, variations in, or smudges in observed levels of red, green or blue light at the area of the sensor observation-derived representation where the measure point is located. Raw sensor observation data regarding measurements of observed levels of red, green or blue light, from each pixel within a 41 pixel square with the selected measure point at its center, may be utilized for making selected cyber determinations as to whether any one specific person has an imminent intent to do harm.

Either of the previous configurations of the disclosed cyber process could be utilized at: (a) schools, (b) houses of worship, (c) airports and other transportation hubs, (d) movie theatres, (e) parks, (f) sports arenas, (g) battlefields or (h) any other place where it would be desirable to accurately or reliably determine if any one specific person has an imminent intent to do harm.

The disclosed cyber process may utilize observations from image sensors that have pan, tilt, or zoom adjustments wherein the disclosed cyber process may be configured to selectively operate the sensor's pan, tilt or zoom controls to locate the face and then the eyes of each person who is within the operational range of the image sensor.

The cyber process disclosed herein may be configured to achieve its operational goal of providing a best performing blend of as simple, concise and efficient as possible for all its operational processes or procedures. A best performing blend may occur when processes or procedures that are utilized by the disclosed cyber process operate at the highest possible degrees of simplicity and efficiency, and all operations and resources are as concise as they can possibly be. The disclosed cyber process may be configured to utilize a standard target set of measure points that is comprised of only one measure point. The disclosed cyber process may further be configured to utilize the one measure point to perform the functions of a scalable configurable universal full spectrum image sensor observation-based human-to-machine interface. As an example, a person using a laptop computer, that has a video-formatted image sensor located at the top of its image display screen, is running a properly configured version of the disclosed cyber process. The laptop computer's image sensor captures 1080p video-formatted images at a rate of 30 images per second. The version of the disclosed cyber process that the laptop computer is running is configured to locate the exact horizontal line location and the exact vertical line location, on the image sensor observation-derived representation's pixel grid, of the single measure point that locates the single pixel at the sensor observation-derived representation of the center of the tip of the person's index finger. This is performed for each sequential video image at a rate of 30 video images per second. Updates are made regarding the XY locations on the image sensor-derived representation of the single measure point that locates the center of the tip of the representation of the person's index finger. The laptop computer then utilizes the reported location of the measure point to determine the corresponding location on the laptop's image display screen upon which, for example, to locate a cursor (or to accomplish any other function selected from a full spectrum of human fingertip-to-machine interface functions that may be performed).

Image sensor observed changes in locations of the center of the tip of the person's index finger may be determined by the disclosed cyber process through the changes of location of the measure point that locates the image sensor observation-derived representation of the center of the person's fingertip. Should there be movement from one sequential image to the next of the representation of the person's fingertip across the XY pixel grid of the image sensor-derived representation, then the location of the measure point is updated, and the disclosed cyber process may move the cursor to the appropriate updated location on the image display screen.

The disclosed cyber process may be configured to enable a person to utilize a video-formatted image sensor to move a cursor or to make a selection at the cursor location on an image display screen in much the same way selections are made on touch screens, but without the need for finger-to-touch screen contact. Should a person wish to make a selection at the current cursor location of the on the image display screen, the person doing so by moving his or her finger closer to and then farther away from the image sensor.

Sensor-observable changes in the measurements of observed levels of red, green or blue light at the pixel where the single measure point is located may be used to indicate that the person moves his or her fingertip closer to or farther from the computer's image sensor. The changes in measurements of levels of red, green or blue light that were observed at the measure point-located pixel may be utilized to make cyber determinations regarding the person's wish to make a selection from where the cursor is located on the computer's image display screen.

In addition, any sensor-observable changes that occur with the movement of a person may be utilized for moving cursors or making selections, where a single measure point may be located at the tip of a sensor observation-derived representation of a nose or at the centers of pupils of people with disabilities or any other people. Combinations of any of a person's sensor-observable movements across an image sensor's XY pixel grid or toward and away from an image sensor may enable a person to utilize a properly configured version of the disclosed cyber process to communicate the person's intention to interact with computers or other cyber resources.

Examples of prior art human-to-machine interface devices whose full interface functions may be replicated through the disclosed cyber process's utilization of one measure point may include at least one member selected from a list consisting of: (a) mouse interface devices, (b) trackball interface devices, (c) touch screen interface devices, (d) stylus interface devices, (e) keyboard interface devices or (f) any other human-to-machine interface devices whose functions may be replicated through utilization of one measure point.

The concise, efficient and simple single fingertip-located measure point technology may also be utilized to accurately authenticate the identity of any one specific person. One example is to have a person sign his or her name in the air in a correctly configured relationship to a video-formatted image sensor. Many factors may be utilized to compare a specific yet-to-be-identified person's signature to the signature of any one specific known person who the yet-to be identified person claims to be. Aspects include the pattern of the signature, behavioral characteristics of movement including movement toward and away from the image sensor, cadence, speed or timing. Utilizing XYZ location-matching or comparison of second series observation records of signatures made in the air with first series observation records of signatures made in the air may be used for making selected cyber determinations regarding claimed identity at the highest possible percentages of accuracy that may be attained. This utilization of the movement of only one fingertip-located measure point may be used to eliminate payment fraud as simply, concisely and efficiently as possible.

The heretofore elusive wave of one's hand or finger in the air as a means of human-to-machine interface may, when first introduced as a widely practiced technology, may be configured to have the highest degree of data compression that could ever exist: compression at a ratio of N to one, where N is the total number of raw data sets for individual pixels from each image of image sensor observations and one is the raw data set for the one single pixel from the point on the image sensor derived representation where the measure point locates the tip of a person's finger. In the case of 1080p formatted video sensor observation, the ratio of data compression will be over two million to one.

Use of this technology is not limited to one fingertip nor is it limited to fingertips. It may also be configured to use any or all fingertips, the tip of a nose, elbow, the gaze of the eyes or any other sensor-observable aspect, characteristic or feature of a person that may be used to communicate a person's intention to interact with computers or other cyber resources. This utilization of the disclosed cyber process may also be configured to offset some or all a person's disabilities when he or she interacts with cyber resources.

The disclosed cyber process may be configured to be used as a part of a human-to-machine interface that may work in conjunction with any cyber technology or technological device that requires the use of a human-to-machine interface.

The disclosed cyber process may be configured to utilize any observable aspect, characteristic or feature of a person that may be utilized for communicating the person's specific intention to interact with selected cyber resources.

The disclosed cyber process may be configured to utilize measure points to make cyber determinations regarding or utilizing the measured location or measured orientation of aspects, characteristics or features of selected analytically rich indicators from sensor observation-derived representations, on sensor observation-derived representations of sensor observations or sensor observation subjects.

Selected cyber determinations regarding measured locations or measured orientations of aspects, characteristics or features of analytically rich indicators from sensor observation-derived representations on sensor observation-derived representations of sensor observations or sensor observation subjects may be made by the disclosed cyber process through utilization of measure points that locate selected aspects, characteristics or features of analytically rich indicators from sensor observation-derived representations of sensor observations or sensor observation subjects.

Examples of cyber determinations regarding the measured location or measured orientation of aspects, characteristics or features of selected analytically rich indicators from sensor observation-derived representations may include: (a) measured location of a sensor observation-derived representation of a scar on a sensor observation-derived representation of a person's face, (b) measured orientation of a sensor observation-derived representation of a scar on a sensor observation-derived representation of a person's face, (c) measured location of a sensor observation-derived representation of a mark on a sensor observation-derived representation of a person's leg, (d) measured orientation of a sensor observation-derived representation of a mark on a sensor observation-derived representation of a person's leg, (e) measured location of a sensor observation-derived representation of a tattoo on a sensor observation-derived representation of a person's arm, (f) measured orientation of a sensor observation-derived representation of a tattoo on a sensor observation-derived representation of a person's arm, (g) measured location of a sensor observation-derived representation of fingerprint features on a sensor observation-derived representation of a person's fingers, (h) measured orientation of a sensor observation-derived representation of fingerprint features on a sensor observation-derived representation of a person's fingers, or (i) the measured location or measured orientation of any other aspect, characteristic or feature of selected analytically rich indicators from sensor observation-derived representations or representations of aspects, characteristics or features from sensor observation-derived representations of sensor observations or sensor observation subjects.

The disclosed cyber process may be configured to make cyber determinations regarding measured location or measured orientation of aspects, characteristics or features of analytically rich indicators from sensor observation-derived representations that are selected from a full spectrum of cyber determinations that may be made regarding the measured location or measured orientation of selected aspects, characteristics or features of analytically rich indicators from sensor observation-derived representations that are located on sensor observation-derived representations of sensor observations or sensor observation subjects.

In one scenario, a "known person" owns a portable computer. A properly configured version of the disclosed cyber process is configured to be utilized as an integral resource of the known person's portable computer. The disclosed cyber process is utilized, in part, for providing determinations of identity that may be utilized to exclusively grant only the known person access to further use of his or her portable computer's resources. The portable computer may utilize, for any purpose, the known person's personally configured version of the disclosed cyber process. In addition, the portable computer includes a microphone and a video-formatted image sensor that has adjustable pan, tilt and zoom functions that the disclosed cyber process may operate.

The disclosed cyber process utilizes, for comparison, observations of the known person that originate from what may be a vast collection of observation data sets that make up the known person's first series observation records. The first series observation records of the known person are exclusively made up of observations that include the known person as a subject of the observation. The known person's first series observation records are comprised of informational representations or measurements that make up the cyberspace identity of the known person.

A cycle of utilization of the disclosed cyber process is initiated by a yet-to-be-identified person requesting use of the known person's portable computer.

In the instance of this cycle of the utilization of the disclosed cyber process, the disclosed cyber process using predetermined criteria utilizes the computer's image sensor to capture video-formatted images of the yet-to-be-identified person. To provide an observation that would be the most likely to aid in making the selected cyber determination of identity, the disclosed cyber process using predetermined criteria operates the zoom function of the image sensor to closely frame an image of only the face of the yet-to-be-identified person.

As a part of either series of observations utilizing cyber resources and predetermined criteria the disclosed cyber process may be configured to locate a standard target set of measure points at specific selected points on the image sensor observation-derived representations of the person's face. To make cyber determinations that the yet-to-be-identified person and the owner of the computer are the same person, the disclosed cyber process may be configured to utilize the X or Y locations on the image's pixel grid or measurements of the observed levels of red, green or blue light from each of the pixels where selected measure points are located.

The disclosed cyber process may be configured to assign appropriate informational representations or measurements from a standard set of informational representations or measurements to selected observed aspects, characteristics or features of sensor observations or sensor observation subjects.

Utilization of one, and only one, standard set of informational representations or measurements is an important part of accurately, reliably and consistently making cyber determinations regarding or utilizing sensor observations or sensor observation subjects that utilize any available cyber resources from any place on the planet. The disclosed cyber process may be configured to provide on a worldwide basis extremely consistent and accurate assignments of standard informational representations or measurements to any recognized aspect, characteristic, feature or operation of any sensor observation or any sensor observation subject.

Appropriate informational representations or measurements that accurately or reliably represent the selected aspects, characteristics or features of analytically rich indicators from sensor observation-derived representations of the yet-to-be-identified person's face are assigned and then included in the yet-to-be-identified person's second series observation records for utilization in this cycle of the operation of the disclosed cyber process. In addition, standard informational representations or measurements may be accurately and consistently assigned utilizing the standard processes or procedures of the disclosed cyber process. Utilization of standard informational representations or measurement that are assigned to selected aspects, characteristics or features of sensor observations or sensor observation subjects enables interoperable or universal use of the informational representations or measurements across the entire technologically interconnected cyber environment where the disclosed cyber process is utilized.

The disclosed cyber process may be configured to utilize predetermined criteria for matching the yet-to-be-identified person's second series observation records with at least one comparable first series observation record of the person who is the owner of the computer.

In the instance of this cycle of the utilization of the disclosed cyber process, predetermined criteria call for selecting and then utilizing for comparison at least one comparable observation record from the first series observation records of the person who is the owner of the computer. Further, the at least one selected observation record may be selected because it is the most likely of all available observation records to aid in accurately making the cyber determination that the yet-to-be-identified person and the person who is the owner of the computer either is or is not the same person.

In the instance of this cycle of the utilization of the disclosed cyber process, predetermined criteria may utilize parameters such as time, date, temperature, light sources, light levels, the portion of the yet-to-be-identified person that was observed and the clarity of observation for matching the second series observation records of the yet-to-be-identified person with at least one comparable first series observation record of the person who is the owner of the computer.

The disclosed cyber process may be configured to make final determinations regarding many aspects, characteristics or features of the sensor observations or sensor observation subjects during operations of assigning appropriate informational representations or measurements. For example, a final determination may be made that a person who was a subject of a sensor observation had red hair, hazel eyes, a particular geometry and ratio of movement between joints in a finger while opening or closing, or any other visual, physical, behavioral, physiological or biological characteristic.

Further, when utilizing an observation with more than one person as a subject of the observation, the disclosed cyber process may exclude from further determinations any person who is a subject of the observation who has been determined to not fit certain criteria. For instance, in keeping with the previous example, the disclosed cyber process may exclude from further processing any person who has been determined to have hair that is not red or eyes that are not hazel. Also, based upon predetermined criteria, one specific yet-to-be-identified person may be determined to absolutely not be the same person as one specific known person if it is determined that the yet-to-be-identified person did not have red hair or hazel eyes.

Utilizing cyber resources and predetermined criteria, matched observation records of the yet-to-be-identified person and the person who is the owner of the computer are compared by the disclosed cyber process. Any predetermined criteria may be utilized by the disclosed cyber process for any aspect of comparing observations.

Utilizing necessary cyber resources and predetermined criteria, conclusions from comparing sensor observation records, along with any useful information, may be utilized by the cyber process for providing selected cyber determinations. Any predetermined criteria may be utilized by the disclosed cyber process for any aspect of the disclosed cyber process's operations.

In this instance, the disclosed cyber process compares second series observation records to first series observation records wherein both first series and second series observation records are comprised of informational representations or measurements regarding only the pixels where selected measure points are located or pixels in structured areas that are located through utilization of measure points. The disclosed cyber process may be configured to make adjustments, as a part of comparing operations, for differences in observation circumstances or other differences between first series observations and second series observations.

Comparison of second series observation records to first series observation records provides an overabundance of visual, behavioral, physiological and biological characteristics that may be utilized for accurately or reliably making the selected cyber determination of identity. Far more exist than are needed for making the determination, with essentially 100% accuracy, that the yet-to-be-identified person and the person who is the owner of the laptop computer absolutely are the same person.

Once the selected cyber determinations have been made, the disclosed cyber process may be configured to report the determinations utilizing cyber resources and any predetermined criteria for any aspect of reporting.

In the instance of this cycle of the utilization of the disclosed cyber process, the determination that the yet-to-be-identified person and the owner of the laptop computer absolutely are the same person is reported to a history that the disclosed cyber process maintains and also to programming running on the laptop computer. Having received the report from the operations of the disclosed cyber process that the yet-to-be-identified person absolutely is the same person as the owner of the laptop computer, the laptop computer then grants its owner exclusive access to use of its resources. Further, should the laptop computer be configured to constantly test identity as a condition for continued access to its resources, the disclosed cyber process may be configured to make cyber determinations regarding the owner of the computer at a rate of 30 or more times every second that the owner of the laptop computer is using its resources. History or any other aspects of the operations of the cyber process disclosed herein may be stored in volatile or non-volatile memory, e.g., in one or more storage modules that are utilized by one or more computers.

In order to best demonstrate a few selected further utilizations of the processes or procedures disclosed herein, it is helpful to consider the future, which may be illustrated with reference to the Single-Point-of-Access Cyber System or Point-of-Cyber-Access Cyber System. This is advantageous in that the Single-Point-of-Access Cyber System and the Point-of-Cyber-Access Cyber System enable technologically interconnected cyber environments or cyber ecosystems that may be configured to enable the fullest and best utilization of the disclosed cyber process.

To begin, the Single-Point-of-Access Cyber System or the Point-of-Cyber-Access Cyber System architectures provide each person with one remotely accessible point of cyber access computer. Each person may utilize any mobile or stationary remote terminal-type of device that is called a cyber portal to gain secure and private access to his or her own remotely located point of cyber access computer.

Each person's own remotely located point of cyber access computer may utilize the cyber process disclosed herein for making selected cyber determinations of identity of a person with a high degree of accuracy, up to and including 100% accuracy. In this example, when 100% accuracy has been achieved, the yet-to-be-identified person will be determined to be absolutely the same person as the proprietary user of the point of cyber access computer, a cyber determination which must occur before the previously yet-to-be-identified person is granted access to the personal and private resources of his or her own remotely located point of cyber access computer.

Enabled by the cyber determination of identity resources of the disclosed cyber process, the Single-Point-of-Access Cyber System may be utilized to provide a technologically interconnected world with a cyber environment or cyber ecosystem that provides for the highest possible levels of cyber security, cyber safety and cyber privacy that may be attained.

A cycle of utilization of the disclosed cyber process is initiated by a yet-to-be-identified person who utilizes any cyber portal to contact his or her own personal remotely located point of cyber access computer, and request access to the personal or private resources of his or her own point of cyber access computer.

Each person's point of cyber access computer is configured so that only one specific person, the point of cyber access computer's proprietary user, may gain access to its personal and private resources, and only after that person has, with up to 100% accuracy, been determined to be the proprietary user of that specific point of cyber access computer. In this instance, the point of cyber access computer is configured to require constant authentication of identity during the entire time that its proprietary user is utilizing the resources of his or her own point of cyber access computer. The disclosed cyber process component of the point of cyber access computer may be configured to make constant cyber determination regarding the identity of its proprietary user, which it may be configured to make through it use of the video-formatted image sensor component of the cyber portal that is being utilized by a person whose identity has yet to be determined.

The cyber portal, utilizing the resources of its video-formatted image sensor, captures observations of the yet-to-be-identified person in which the raw data file from the image sensor observation of the yet-to-be-identified person is communicated, through utilization of communications systems, to the remotely located point of cyber access computer. The point of cyber access computer, utilizing the resources of the disclosed cyber process and its processes or procedures that are specifically trained, taught or configured to be used for, by or with the one specific person who is the proprietary user of this one specific point of cyber access computer, utilizes the raw video sensor observation data set for making selected cyber determinations regarding the identity of the person who is utilizing the remotely located cyber portal.

The disclosed cyber process for making cyber determinations regarding or utilizing sensor observations or sensor observation subjects utilizing predetermined criteria and necessary cyber resources, may control operations of pan, tilt or zoom functions of the video-formatted image sensor of the cyber portal to capture the optimum second series observations of the yet-to-be-identified person.

The disclosed cyber process may be configured to utilize measure points from a standard target set of measure points to accurately or reliably locate specific selected points on analytically rich indicators from image sensor observation-derived representations of the yet-to-be-identified person's face. Informational representations or measurements regarding the XY line locations on the image's pixel grids and measurements of the observed levels of red, green or blue light at the pixels where the selected measure points are located will be matched and compared with comparable informational representations or measurements from first series observation records of the proprietary user of the point of cyber access computer.

The disclosed cyber process may be configured to utilize standard adjusting factors for accurately or reliably making cyber determinations when there are differences in observation circumstances or other circumstances between first series observations and second series observations that are being compared.

In this instance, the disclosed cyber process accurately or reliably determines that the yet-to-be-identified person requesting access absolutely is the proprietary user of this one specific point of cyber access computer and the proprietary user is thereby granted exclusive access to the personal and private resources of his or her own remotely located point of cyber access computer.

It is best to utilize environment-wide a set of cyber determinations of identity criteria that provide a person with secure, safe and private access to his or her own remote or local computer or cyber resources. To achieve this secure, safe and private cyber environment or cyber ecosystem, it is desirable to utilize criteria that require an essentially 100% accurate cyber determination of identity of a person be made before granting that person access to his or her own computer or cyber resources. It is further recommended that criteria be utilized that require constant cyber determinations of identity of the same person to be made while that person is utilizing his or her own computer or cyber resources in any way.

In light of the foregoing, the Single-Point-of-Access Cyber System or Point-of-Cyber-Access Cyber System not only requires that a person be accurately determined to be the proprietary user of his or her point of cyber access computer before he or she may gain access to its personal or private resources, but the Single-Point-of-Access Cyber System or Point-of-Cyber-Access Cyber System also requires the person utilizing his or her point of cyber access computer be constantly determined to be its proprietary user while that person is using his or her own personal point of cyber access computer in any way.

The disclosed cyber process-enabled, secure, safe and private technologically interconnected cyber environment or cyber ecosystem of the Single-Point-of-Access Cyber System or the Point-of-Cyber-Access Cyber System may be utilized to provide the planet with vast new cyber resources. Among those resources will preferably be devices that utilize sensors for regularly monitoring selected aspects of a person's health.

The preferably voice-operated point of cyber access computer may be fully utilized through use of a cyber portal that is similar in size and worn similarly to a wristwatch. Although a cyber portal with an image display screen of such a small size may require intermittent use of a larger image display screen, a wristwatch-configured cyber portal may nonetheless provide the greatest all-around utility of any cyber portal configuration: in part because a wristwatch-configured cyber portal that includes one or more health sensors may be utilized in conjunction with the disclosed cyber process to securely and privately monitor and report to one's point of cyber access computer any possible health observations (both internally and externally).

A person's own personal point of cyber access computer may then utilize those health observations for providing the person (perhaps through use of his or her wristwatch-configured cyber portal) reports of any health information of which the person may want or need to be made aware.

Through utilization of the security, safety and privacy that is enabled by use of cyber determinations of identity of a person that are made by the disclosed cyber process and the resources of the Single-Point-of-Access Cyber System or the Point-of-Cyber-Access Cyber System, it may be possible to securely and privately provide all or part of a person's own personal and private health information to health care providers of choice so that those health care providers may be enabled to provide the person with the best of all possible health care outcomes.

Additionally, it may be possible for a person to anonymously provide all or part of his or her health information to selected others for health-related research.

Utilizing a wristwatch-configured cyber portal/health monitoring device that is working in conjunction with the disclosed cyber determining process, each person may enjoy the benefits of secure and private uninterrupted observations of any number of measures of his or her health. Moreover, using the same wristwatch-configured cyber portal/health monitoring device, a person may also enjoy the benefits of utilization of any of the resources of the person's own remotely located point of cyber access computer.

Looking to the present again, and more particularly cybersecurity's present need for an easy to use, versatile cyber process that provides essentially 100% accurate cyber determinations regarding any one specific person's identity, prior art cybersecurity or cyber identity determination processes clearly fail to meet present needs for constantly making cyber determinations of identity that are essentially 100% accurate. This is so, in part, because prior art processes for making cyber determinations regarding the identity of any one specific person do not go so far as to identify the person by means of utilizing unique visual, biological, physical, behavioral or physiological characteristics of a person that cannot be replicated by any others. The cyber process of the present disclosure may be configured to provide cyber determinations of identity of any one specific person by utilizing sensor observation-derived representations of unique visual, biological, physical, behavioral or physiological characteristics of a person. These characteristics are preferably of a type that can never be replicated by any other person or device.

The disclosed cyber process, as utilized for providing essentially 100% accurate cyber determinations regarding the identity of any one specific person, may be configured to utilize as many unique visual, biological, physical, behavioral or physiological characteristics of a person as are necessary to achieve an attainable selected accuracy goal for making cyber determinations of identity. Many examples of characteristics of a person have previously been addressed. However, when internal and external sensor observations (which may include biological or physiological sensor observations) of a person are utilized, there are a very large number of possible unique combinations of aspects, characteristics or features of any one specific person that may be utilized by the disclosed cyber process for making cyber determinations of identity regarding any one specific person at the highest possible percentages of cyber determination accuracy that may be attained. With every unique visual, biological, physical, behavioral or physiological characteristic of a person that has been sensor observed also exists a means for accurately making cyber determinations of identity regarding that one specific person.

We live in a technologically interconnected world where vast cyber resources presently exist. Within this technologically interconnected world, we utilize cyber resources from a full spectrum of available cyber resources. This full spectrum of available cyber resources is ever widening and over time our technologically interconnected world appears to be destined to provide every possible cyber resource that humanity could ever want or need. When that time comes, the entire body of cyber resources will include—and will rely heavily upon—a scalable configurable universal full spectrum cyber process (such as the scalable configurable universal full spectrum cyber process disclosed herein) that may be configured to utilize measure points that locate analytically rich indicators from sensor observation-derived representations or analytically rich sparse data sets for making not only essentially 100% accurate cyber determinations regarding the identity of any one specific person, but also every other cyber determination regarding or utilizing sensor observations or sensor observation subjects that our world could ever want or need.

One skilled in the art will appreciate that some of the methodologies disclosed herein may be implemented utilizing one or more software programs. Such software programs may take the form of suitable programming instructions disposed in a tangible, non-transient medium which, when implemented by one or more computer processors, perform part or all of the methodologies described herein.

While the disclosed cyber process has been defined in terms of its preferred and alternative embodiments, those of ordinary skill in the art will understand that numerous other embodiments and applications of the disclosed cyber process will become apparent. Such other embodiments and applications shall be included within the scope and meaning of the disclosure as defined by the appended claims. Moreover, it is to be understood that the above description of the present disclosure is illustrative and is not intended to be limiting. It will thus be appreciated that various additions, substitutions and modifications may be made to the above described embodiments without departing from the scope of the present disclosure. Accordingly, the scope of the present disclosure should be construed in reference to the appended claims.

What is claimed is:

1. A cyber process, comprising:

providing a set of resources which includes (a) at least one computing device, (b) criteria selected from a group consisting of a full spectrum of criteria that may be utilized by said cyber process, (c) selected information, and (d) selected necessary programming, wherein said at least one utilized computing device includes a tangible, non-transient memory device and an input/output device; and using the set of resources and at least one analytically rich sparse data set to make at least one selected cyber determination regarding or utilizing at least one sensor observation or at least one sensor observation subject;

wherein said analytically rich sparse data set includes processed data, wherein said processed data includes at least one selected informational representation or at least one measurement that has been derived from processing of at least one first series sensor observation or at least one second series sensor observation, and wherein said processed data may be utilized for making said at least one selected cyber determination in real time or at one or more times thereafter, and wherein said cyber determination may be selected from a group consisting of a full spectrum of cyber determinations that may be made regarding or utilizing sensor observations or sensor observation subjects;

wherein said cyber process is scalable, in regard to included cyber process resources, to fall at any one point in a range of from a minimum to a maximum, wherein at the minimum said cyber process may be scaled to include only the cyber process resources that are needed for providing for least complex, in regard to included necessary cyber process resources, of all cyber processes that are utilized for making cyber determinations regarding or utilizing sensor observations or sensor observation subjects, and wherein at the maximum said cyber process may be scaled to include all of the cyber process resources that are needed for making every cyber determination from a full spectrum of cyber determinations regarding or utilizing sensor observations or sensor observation subjects;

wherein said cyber process is configurable and may be configured in at least one way;

wherein said at least one cyber determination may be selected from a group consisting of a full spectrum of cyber determinations that may be made regarding or utilizing sensor observations or sensor observation subjects;

wherein said at least one cyber determination is utilized for at least one purpose selected from a group consisting of a full spectrum of purposes for which cyber determinations regarding or utilizing sensor observations or sensor observation subjects may be utilized;

wherein said cyber process may be configured to provide at least one member selected from a group consisting of (a) single cyber determinations regarding or utilizing sensor observations or sensor observation subjects, (b) intermittently provided cyber determinations regarding or utilizing sensor observations or sensor observation subjects, and (c) constantly provided cyber determinations regarding or utilizing sensor observations or sensor observation subjects;

wherein said selected information may be derived from one or more points in time, or over one or more periods of time;

wherein said selected information may be selected from a group consisting of a full spectrum of information that may be utilized by said cyber process, and wherein said full spectrum of information may include information that was derived from at least one sensor observation;

wherein said at least one sensor observation is made by at least one type of sensor selected from a group consisting of a full spectrum of types of sensors, and may be processed to provide at least one informational representation or at least one measurement regarding or utilizing at least one selected aspect, characteristic or feature of at least one analytically rich indicator from at least one sensor observation-derived representation;

wherein said at least one aspect of at least one analytically rich indicator from said at least one sensor observation-derived representation is selected from a group consisting of a full spectrum of sensor observable aspects of analytically rich indicators from sensor observation-derived representations;

wherein said at least one cyber determination regarding said at least one analytically rich indicator from at least one sensor observation-derived representation is selected from a group consisting of a full spectrum of cyber determinations regarding or utilizing sensor observations or sensor observation subjects;

wherein said at least one sensor observation or sensor observation subject is selected from a group consisting of a full spectrum of sensor observations or sensor observation subjects;

wherein said at least one aspect, characteristic or feature of said at least one sensor observation or at least one sensor observation subject is selected from a group consisting of a full spectrum of sensor observable aspects, characteristics or features of sensor observations or sensor observation subjects; and wherein said cyber process further comprises utilizing, in any sequence, at least one part of at least one operation selected from the group consisting of (a) first series observation operations, wherein said cyber process is configured to utilize at least one first series sensor observation, wherein said at least one first series sensor observation or at least one subject of said at least one first series sensor observation has at least one previously determined aspect, said cyber process recognizing said at least one previously determined aspect regarding said at least one first series sensor observation or said at least one subject of said at least one first series observation, said cyber process assigning at least one appropriate informational representation or measurement regarding at least one recognized aspect of said at least one sensor observation or said at least one sensor observation subject, said at least one assigned informational representation or measurement being utilizable by said cyber process for making at least one selected cyber determination regarding or utilizing sensor observations or sensor observation subjects, said cyber process including at least one assigned informational representation or measurement from said at least one first series observation in at least one first series observation record, (b) second series observation operations, wherein said cyber process is configured to utilize at least one second series sensor observation, wherein said at least one second series sensor observation or said at least one subject of said at least one second series observation has at least one yet-to-be-determined aspect, said cyber process recognizing said at least one yet-to-be-determined aspect regarding said at least one second series sensor observation or said at least one subject of said at least one second series sensor observation, said cyber process assigning at least one appropriate informational representation or measurement regarding said at least one yet-to-be-determined aspect of said at least one sensor observation or said at least one sensor observation subject, said at least one assigned informational representation or measurement being utilizable by said cyber process for making at least one selected cyber determination regarding or utilizing sensor observations or sensor observation subjects, said cyber process including at least one assigned informational representation or measurement from said at least one second series observation in at least one second series observation record, (c) measure point operations, wherein said cyber process utilizes at least one measure point to locate at least one selected aspect of at least one analytically rich indicator from at least one sensor observation-derived representation of the at least one sensor observation or at least one sensor observation subject, wherein said cyber process assigns at least one informational representation or at least one measurement regarding at least one selected aspect of said analytically rich indicator, wherein said at least one informational representation or said at least one measurement may be stored or utilized for making at least one selected cyber determination regarding or utilizing said at least one sensor observation or said at least one sensor observation subject, (d) analytically rich sparse data set operations, wherein said cyber process utilizes at least one analytically rich sparse data set that is comprised of at least one raw data set or at least one derived data set, wherein said at least one raw data set from said at least one analytically rich sparse data set is comprised of at least one informational representation or at least one measurement selected from raw sensor observation data from at least one raw sensor observation data set, and said at least one derived data set from said at least one analytically rich sparse data set is comprised of at least one informational representation or at least one measurement that was derived from the processing of all or part of at least one raw sensor observation data set, wherein at least one informational representation or at least one measurement from said at least one raw data set or from said at least one derived data set of said at least one analytically rich sparse data set may be utilized by said cyber process for making at least one selected cyber determination regarding or utilizing at least one sensor observation or at least one sensor observation subject, (e) matching operations, wherein said cyber process matches at least one informational representation or measurement from at least one second series observation record with at least one comparable informational representation or measurement from at least one first series observation record, (f) comparing operations, wherein said cyber process compares at least one informational representation or measurement from at least one second series observation record with at least one informational representation or measurement from at least one first series observation record, whereby said cyber process provides at least one cyber conclusion or makes at least one cyber determination from the comparison, (g) determining operations, wherein said cyber process utilizes said at least one conclusion from said at least one comparing operation, or said information, for making said at least one cyber determination regarding or utilizing said at least one sensor observation or said at least one sensor observation subject, and (h) reporting operations, wherein said cyber process makes at least one report regarding at least one aspect of at least one part of at least one cycle of operations of said cyber process.

2. The cyber process of claim 1, wherein said cyber process is further configured to achieve at least one selected attainable level of accuracy goal for at least one cyber determination, and wherein said at least one attainable level of accuracy goal falls in a range extending from 0% accuracy up to, and including, 100% accuracy.

3. The cyber process of claim 1, wherein said cyber process is further configured to provide for any possible level of participation by at least one person who is at least one subject of at least one sensor observation-derived cyber identity determination test, and wherein said any possible level of participation ranges from said at least one person being observable by at least one sensor but not consciously engaged in said at least one sensor observation-derived cyber identity determination test, to said at least one person being an observable, active and consciously engaged participant in said at least one sensor observation-derived cyber identity determination test.

4. The cyber process of claim 1, wherein said cyber process is further configured to utilize at least one sensor observation for making at least one selected cyber determination regarding or utilizing said at least one sensor observation or at least one sensor observation subject, wherein said at least one sensor observation is made (a) at one or more points in time, or (b) over at least one period of time.

5. The cyber process of claim 4, wherein said at least one sensor observation includes at least one sensor observation of at least one change that occurs to at least one sensor observable aspect of at least one observation subject over said at least one period of time.

6. The cyber process of claim 5, wherein said at least one subject of at least one sensor observation includes at least one person being said at least one observation subject, and wherein said at least one change that occurs to said at least one observation subject is at least one sensor observable change of at least one feature of said at least one person.

7. The cyber process of claim 6, wherein said at least one feature of said at least one person is selected from the group consisting of a (a) head, (b) face, (c) mouth, (d) eyes, (e) eyebrows, (f) nose, (g) arms, (h) hands, (i) fingers, (j) legs, (k) feet, (l) neck, (m) torso, (n) skin, (o) heart, (p) stomach, (q) intestines, (r) liver, (s) kidneys, (t) lungs, (u) breath, (v) vascular system, (w) brain, (x) spinal cord, (y) neural system, (z) neural activity, (aa) skeleton, (bb) blood, (cc) odor, (dd) voice, and (ee) direction of movement.

8. The cyber process of claim 1, wherein said at least one cyber determination includes an indicated measure of probability that exists of one specific yet-to-be-identified person being the same person as one specific known person, wherein said at least one cyber determination ranges from making at least one cyber determination that said one specific, yet-to-be-identified person absolutely is not said one specific known person, through making at least one cyber determination of any intermediate indicated measure of probability that exists of said one specific, yet-to-be-identified person is said one specific known person, to making at least one cyber determination that said one specific, yet-to-be-identified person absolutely is said one specific known person.

9. The cyber process of claim 1, wherein said cyber process is further configured to include repeating operations wherein said cyber process selects at least one part of at least one first series observation of one specific known person for repetition by one specific, yet-to-be-identified person, wherein said one specific yet-to-be-identified person performs said at least one repetition, wherein said cyber process assigns appropriate informational representations or measurements regarding or utilizing at least one member selected from the group consisting of (a) said at least one observation, (b) said at least one repetition, and (c) at least one aspect of said one specific yet-to-be-identified person while said yet-to-be-identified person is performing said repetition, wherein said at least one second series observation record of said at least one repetition includes at least one informational representation or at least one measurement that was appropriately assigned by said cyber process, and wherein said cyber process utilizes said at least one second series observation record of said at least one repetition for making at least one selected cyber determination regarding or utilizing the at least one sensor observation or said yet-to-be-identified person.

10. The cyber process of claim 1, wherein said cyber process is further configured for utilizing information, informational representations or measurements that are derived from at least one source other than at least one first series observation record, or at least one second series observation record.

11. The cyber process of claim 1, wherein said cyber process is further configured to utilize at least one computing device, selected criteria, selected information, selected processes or procedures, and any other necessary resource, all of which being structured or utilized for the purpose of accurately granting or denying at least one person, or at least one cyber device, access to at least one member selected from the group consisting of: (a) at least one part of said cyber process, (b) at least one cyber resource that is being utilized by said cyber process, or (c) at least one resource that is utilizing said cyber process.

12. The cyber process of claim 1, wherein said cyber process is further configured to manipulate the operations of cyber process utilized resources, or the cyber process itself, wherein manipulating provides said cyber process with selection of possible utilizations, wherein said manipulating is utilized for at least one purpose, wherein said at least one purpose for utilizing said manipulating includes aiding in making at least one selected cyber determination regarding or utilizing said at least one sensor observation or said at least one sensor observation subject.

13. The cyber process of claim 1, wherein said cyber process is further configured to include cyber process history, wherein said cyber process history includes at least one cyber process history record.

14. The cyber process of claim 1, wherein at least one observation record that was derived from at least one source other than at least one first series observation operation may be included as at least one first series observation record, or at least one observation record that was derived from at least one source other than at least one second series observation operation may be included as at least one second series observation record.

15. The cyber process of claim 1, wherein said cyber process is further configured to where all or part of the operations of said cyber process may be performed in any useable order or sequence.

16. The cyber process of claim 1, wherein said cyber process is further configured to utilize at least one standard informational representation or measurement to represent at least one specific aspect of at least one operation of said cyber process.

17. The cyber process of claim 1, wherein said cyber process is configured to utilize at least one measure point to locate at least one selected aspect of at least one analytically rich indicator from at least one sensor observation derived representation for making at least one selected cyber determination regarding or utilizing at least one sensor observation or at least one sensor observation subject, wherein the selection of said at least one aspect of said at least one analytically rich indicator that will be located by said at least one measure point may be made by at least one member selected from the group consisting of (a) at least one person, (b) at least one process, (c) at least one procedure, or (d) any combination thereof, wherein said at least one process or said at least one procedure being selected from a group consisting of a full spectrum of processes or procedures that may be utilized for selecting aspects of analytically rich indicators from sensor observation-derived representations that will be located through utilization of measure points.

18. The cyber process of claim 17, wherein said cyber process further utilizes said at least one measure point for at least one purpose selected from a group consisting of a full spectrum of purposes for which measure points that locate selected aspects of analytically rich indicators from sensor observation-derived representations may be utilized;
wherein said full spectrum of purposes for which said measure points may be utilized includes utilization of at least one measure point for making at least one measurement;
wherein the at least one measurement that may be made through utilization of said at least one measure point may be selected from the group consisting of a full spectrum of measurements that may be made through utilization of measure points that locate selected aspects of analytically rich indictors from sensor observation-derived representations;
wherein said full spectrum of measurements that may be made through utilization of said at least one measure point may include at least one measurement selected from the group consisting of (a) measured distances between two or more measure points, (b) measured angles where two or more lines between measure points meet or intersect, (c) measured location of at least one measure point or aspect, (d) measured orientation of at least one measure point or aspect, (e) measured relationships between two or more measure points or aspects, (f) measured time at one or more measure points, (g) measured pressure at one or more measure points, (h) measured temperature at one or more measure points, (i) measured color at one or more measure points, (j) measured grey scale level at one or more measure points, (k) measured odor at one or more measure points, (l) measured presence at one or more measure points, (m) measured sound at one or more measure points, (n) measured electric energy at one or more measure points, and (o) measures of sensor observable measurable aspects of analytically rich indicators from sensor observation-derived representations that may be located through utilization of measure points.

19. The cyber process of claim 1, wherein said full spectrum of subjects of sensor observations may include at least one person as at least one subject of at least one sensor observation;
   wherein at least one aspect of said at least one person may include at least one aspect selected from a group consisting of a full spectrum of sensor observable aspects, of people who are subjects of sensor observations;
   wherein at least one measure point may be utilized to locate at least one selected aspect of at least one analytically rich indicator from at least one sensor observation-derived representation of at least one person who is at least one subject of at least one sensor observation;
   wherein said at least one analytically rich indicator is selected from a group consisting of a full spectrum of analytically rich indicators from sensor observation-derived representations;
   wherein said at least one measure point may be utilized for at least one purpose selected from a group consisting of a full spectrum of purposes for which measure points that locate selected aspects of analytically rich indicators from sensor observation-derived representations may be utilized;
   wherein said full spectrum of analytically rich indicators from sensor observation-derived representations that may be located by measure points may include at least one analytically rich indicator from at least one sensor observation-derived representation of at least one person selected from group consisting of (a) scars, (b) marks, (c) tattoos, (d) fingerprint features, (e) axis points at joints, (f) tip of nose, (g) corners of eyes, (h) centers of pupils, (i) corners of mouth, (j) tips of fingers, (k) sweat glands, and (l) analytically rich indicators from sensor observation-derived representations of people.

20. The cyber process of claim 1, wherein the full spectrum of cyber determinations regarding or utilizing sensor observations or sensor observation subjects for which said measure points may be utilized includes cyber determinations regarding or utilizing at least one measured location or at least one measured orientation of at least one sensor observation-derived representation of at least one aspect of a person on at least one sensor observation-derived representation of the person;
   wherein said at least sensor observation-derived representation of said at least one aspect of said at least one person may be selected from a group consisting of a full spectrum of sensor observation-derived representations of aspect of people who are subjects of sensor observations;
   wherein at least one measured location of or at least one measured orientation of said at representation of least one aspect of one person on said at least one sensor observation-derived representation of the at least one person may include, for example, the measured location of or the measured orientation of (a) at least one sensor-observation derived representation of at least one fingerprint feature on at least one sensor-observation derived representation of one finger of one person, (b) at least one sensor-observation derived representation of at least one tattoo on at least one sensor-observation derived representation of at least one arm of one person, (c) at least one sensor-observation derived representation at least one scar on at least one sensor-observation derived representation of least one leg of one person, (d) at least one sensor-observation derived representation of at least one mark on at least one sensor-observation derived representation of the neck of one person, (e) at least one sensor-observation derived representation of at least one sweat gland on at least one sensor-observation derived representation of the nose of one person, (f) at least one sensor-observation derived representation of at least one pulse point on at least one sensor-observation derived representation of the face of one person, (g) at least one sensor-observation derived representation of at least one peak on a peak and valley graph representation of the sounds of at least one person's voice, and (h) sensor observation-derived representations of aspects of a person selected from a full spectrum of sensor observation-derived representations of aspects of a person that are located on, or oriented on, sensor observation-derived representations of people who are subjects of sensor observations.

21. The cyber process of claim 1, wherein said cyber process is further configured to utilize at least one measure point to locate at least one aspect of at least one analytically rich indicator from at least one sensor observation-derived representation, said at least one aspect of said at least one analytically rich indicator being the sensor observation-derived representation of a tip of at least one finger of at least one person;
   wherein said at least one measure point that locates said at least one sensor-observation derived representation of at least one fingertip on said at least one sensor observation-derived representation may be utilized for at least one purpose selected from a group consisting of a full spectrum of purposes for which measure points that locate sensor observation-derived representations of fingertips on sensor observation-derived representations may be utilized;
   wherein said full spectrum of purposes for which measure points that locate sensor observation-derived representations of tips of a person's fingers may be utilized includes utilization of said measure points as at least one component of at least one fingertip to cyber device interface for at least one cyber device;
   wherein said at least one cyber device is selected from a group consisting of a full spectrum of cyber devices that may utilize said at least one reference point as at least one component of at least one human fingertip to cyber device interface.

22. The cyber process of claim 1, wherein said cyber process is further configured to utilize at least one measure point to locate at least one sensor-observation derived representation of at least one aspect of at least one analytically rich indicator from at least one sensor observation-derived representation of at least one face of at least one person who is at least one subject of at least one sensor observation;
   wherein said at least one measure point may be utilized for at least one purpose selected from a group consisting of a full spectrum of purposes for which measure points that locate sensor observation-derived representations of aspects of analytically rich indicators from sensor observation-derived representations of faces of people may be utilized;
   wherein said full spectrum of purposes for which measure points that locate sensor observation-derived representations of aspects of analytically rich indicators from sensor observation-derived representations of faces of people may be utilized may include utilizing at least one measure point for at least one purpose selected from a group consisting of: (a) determining an identity of at least one yet-to-be-identified person, (b) authenticating a claimed identity of at least one yet-to-be-identified person, (c) determining a facial affect of at least one person, (d) determining a facial expression of at least one person, (e) determining a gaze of at least one eye of at least one person, (f) determining sensor (camera) angle, (g) determining sensor observation lighting circumstances, (h) determining a pose of at least one person, (i) determining a portion of at least one face that is being observed by at least one sensor, (j) determining at least one measure of a state of mental or physical health of at least one person, (k) determining a pulse of at least one person, (l) determining a blood pressure of at least one person, (m) determining at least one relationship between at least one sensor and at least one measure point that is located on at least one sensor observation-derived representation of at least one face of at least one person, and (n) purposes for which measure points that locate sensor observation-derived representations of selected aspects of analytically rich indicators from sensor observation-derived representations of faces of people may be utilized.

23. The cyber process of claim 1, wherein said cyber process is further configured to enable said at least one measure point that locates at least one selected sensor observation-derived representation of at least one aspect of at least one analytically rich indicator from at least one sensor observation-derived representation of at least one person to be utilized as at least one component of at least one human to cyber device interface;

wherein said at least one human-to-cyber device interface, utilizing said at least one measure point, may be utilized for at least one purpose selected from a group consisting of a full spectrum of purposes for which human to cyber device interfaces that utilize measure points that locate selected sensor observation-derived representations of aspects analytically rich indicators from sensor observation-derived representations of people may be utilized.

24. The cyber process of claim 1, wherein said cyber process is further configured to utilize at least one measure point that locates at least one sensor observation-derived representation of at least one axis point from at least one sensor observation-derived representation of at least one joint of at least one person;

wherein at least one measure point that locates said at least one axis point may be utilized for at least one purpose selected from a group consisting of a full spectrum of purposes for which sensor observation-derived representation of measure points that locate axis points from sensor observation-derived representations of joints of people may be utilized;

said full spectrum of purposes for which sensor observation-derived representation of measure points that locate axis points from sensor observation-derived representations of joints of people may be utilized includes making at least one cyber determination regarding at least one sensor observation-derived representation of at least one aspect of a geometry of a person at said at least one sensor observation-derived representation of at least one joint where said at least one axis point is located, or making at least one cyber determination regarding at least one relationship between said at least one measure point that locates said at least one sensor observation-derived representation of said at least one axis point and at least one sensor observation-derived representation of at least one other measure point or aspect of at least one analytically rich indicator from at least one sensor observation-derived representation.

25. The cyber process of claim 1, wherein said cyber process is further configured to utilize at least one member selected from the group consisting of (a) selected processes, (b) selected procedures, and (c) said cyber process itself, for making selected cyber determinations regarding a location to locate at least one selected measure point on at least one sensor observation-derived representation of at least one sensor observation or at least one sensor observation subject, wherein said processes, said procedures or said cyber process itself may be structured to make at least one cyber determination selected from a group consisting of (i) determining a point to locate at least one selected measure point on at least one sensor observation-derived representation of only one specific sensor observation or only one specific sensor observation subject, (ii) determining a point to locate at least one selected measure point on at least one sensor observation-derived representation of at least one sensor observation or at least one sensor observation subject that is at least one member of at least one specific group of sensor observations or sensor observation subjects, (iii) determining a point to locate at least one selected measure point on at least one sensor observation-derived representation of at least one non-specific sensor observation or at least one non-specific sensor observation subject, or (iv) determining a point to locate at least one selected measure point on at least one sensor observation-derived representation of at least one sensor observation or at least one sensor observation subject based upon any other circumstances selected from a group consisting of a full spectrum of circumstances for which processes, procedures or the cyber process itself may be structured for making cyber determinations regarding the point to locate selected measure points on sensor observation-derived representations of sensor observations or sensor observation subjects.

26. The cyber process of claim 1, wherein said cyber process is further configured for making at least one cyber determination regarding at least one aspect of a geometry of at least one sensor observation-derived representation of at least one joint of at least one person;

wherein said at least one aspect of the geometry of said at least one sensor observation-derived representation of at least one joint of at least one person may be utilized for at least one purpose selected from a group consisting of a full spectrum of purposes for which aspects of the geometry of sensor observation-derived representations of joints of people may be utilized.

27. A scalable configurable universal full spectrum cyber process, comprising:

deriving information from at least one point in time or over at least one period of time from a spectrum of information that may include at least one observed feature of at least one subject of at least one sensor observation, thereby obtaining derived information, wherein said at least one sensor observation is a type of sensor observation selected from the group consisting of (a) visual sensor observations, (b) audible sensor observations, (c) thermal sensor observations, (d) olfactory sensor observations, and (e) tactile sensor observations;

wherein said cyber process makes at least one selected cyber determination through the utilization of (a) at least one computing device, (b) criteria that may be utilized by said cyber process, (c) said information, and (d) any necessary programming or resources, wherein said cyber process provides at least one cyber determination type selected from the group consisting of (i) single cyber determinations, (ii) intermittently provided cyber determinations, and (iii) constantly provided cyber determinations;

wherein said at least one cyber determination is utilized for at least one purpose; and wherein said cyber process further comprises utilizing at least one part of at least one operation selected from the group consisting of (a) first series observation operations utilizing at least one sensor observation, wherein said at least one sensor observation or at least one subject of said at least one sensor observation has at least one previously determined aspect, said cyber process recognizing said at least one aspect, said at least one recognized aspect being utilizable by said cyber process for making at least one selected cyber determination, said cyber process assigning appropriate informational representations or measurements representing at least one known aspect of said at least one observation or said at least one observation subject, said cyber process including at least one of said informational representations or measurements in at least one first series observation record, (b) second series observation operations utilizing at least one sensor observation, wherein said at least one sensor observation or at least one subject of said at least one sensor observation has at least one yet-to-be-determined aspect, said cyber process recognizing said at least one yet-to-be-determined aspect, said cyber process assigning appropriate informational representations or measurements regarding said at least one yet-to-be-determined aspect of said at least one sensor observation or said at least one observation subject, wherein said cyber process including at least one of said informational representations or measurements in at least one second series observation record, (c) measure point operations, wherein said cyber process utilizes at least one measure point to locate at least one selected aspect of at least one analytically rich indicator from at least one sensor observation-derived representation of the at least one sensor observation or at least one sensor observation subject, wherein said cyber process assigns at least one appropriate informational representation or at least one measurement regarding said at least one selected aspect of said analytically rich indicator, wherein said at least one informational representation or said at least one measurement is stored or utilized for making at least one selected cyber determination regarding or utilizing said at least one sensor observation or said at least one sensor observation subject, (d) analytically rich sparse data set operations, wherein said cyber process utilizes at least one analytically rich sparse data set that includes at least one raw data set or at least one derived data set, wherein said at least one raw data set from said at least one analytically rich sparse data set is comprised of at least one informational representation or at least one measurement selected from at least one raw sensor observation data set, and wherein said at least one derived data set from said at least one analytically rich sparse data set is comprised of at least one informational representation or at least one measurement that was derived from processing of all or part of at least one raw sensor observation data set, wherein at least one informational representation or at least one measurement from said at least one raw data set or from said at least one derived data set of said at least one analytically rich sparse data set may be utilized by said cyber process for making at least one selected cyber determination regarding or utilizing at least one sensor observation or at least one sensor observation subject, (e) matching operations, wherein said matching operations include matching at least one second series observation record of at least one informational representation or measurements regarding the at least one second series sensor observation or at least one subject from the at least one second series observation with at least one comparable informational representation or measurement regarding at least one comparable sensor observation or sensor observation subject from at least one first series observation record, (f) comparing operations, wherein said comparing operations include comparing informational representation or measurements from at least one second series observation record with informational representation or measurements from at least one comparable first series observation record, and providing at least one conclusion from the comparison, (g) determining operations, wherein said cyber process utilizes said at least one conclusion from said at least one comparing operation or information for making said at least one selected cyber determination, and (h) reporting operations, wherein said reporting operations include providing at least one report regarding at least one aspect of at least one part of at least one cycle of utilization of said cyber process.

* * * * *